United States Patent [19]
Fukushima et al.

[11] Patent Number: 5,579,370
[45] Date of Patent: Nov. 26, 1996

[54] PORTABLE TELEPHONE SYSTEM

[75] Inventors: Yutaka Fukushima; Tetsuo Takemura, both of Yokohama; Shinichi Iwaki, Kamakura; Mitsuyoshi Hashida, Yokohama; Masao Wanami, Yokohama; Isao Shimbo, Yokohama; Mitsuhiro Wada, Yokohama; Hirofumi Udaki, Yokohama; Yoshihiro Kondo, Yokohama; Yoshinobu Yamamoto, Fujisawa; Arata Nakagoshi, Kokubunji; Kouichi Ohta, Yokohama; Hiroshi Kuwahara, Kodaira; Yumiko Watanabe, Tokyo, all of Japan

[73] Assignees: Hitachi, Ltd.; Kokusai Electric Co., Ltd., both of Tokyo, Japan

[21] Appl. No.: 941,963

[22] Filed: Sep. 8, 1992

[30] Foreign Application Priority Data

Oct. 7, 1991  [JP]  Japan .................................. 3-259488

[51] Int. Cl.$^6$ ......................... H04M 11/04; H04M 11/00
[52] U.S. Cl. .............................. 379/34; 379/59; 455/33.1
[58] Field of Search .................................. 379/56–60, 49, 379/16, 84, 34; 375/11; 455/33.1, 33.2, 33.4

[56]  References Cited

U.S. PATENT DOCUMENTS

| | | | |
|---|---|---|---|
| 4,021,624 | 5/1977 | Kelly et al. | 379/16 |
| 4,592,048 | 5/1986 | Beckner et al. | 370/60 |
| 4,748,655 | 3/1988 | Thrower et al. | 379/57 |
| 4,843,622 | 6/1989 | Yotsutani et al. | 379/59 |
| 4,878,726 | 11/1989 | Fatehi | 350/96.15 |
| 4,937,855 | 6/1990 | McNab et al. | 379/103 |
| 4,958,367 | 9/1990 | Freer et al. | 379/84 |
| 5,016,269 | 5/1991 | Rogers | 379/59 |
| 5,091,918 | 2/1992 | Wales | 375/11 |
| 5,166,972 | 11/1992 | Smith | 379/49 |
| 5,185,739 | 2/1993 | Spear | 379/59 |
| 5,257,406 | 10/1993 | Ito | 455/56.1 |

FOREIGN PATENT DOCUMENTS

| | | |
|---|---|---|
| 0143224 | 6/1985 | European Pat. Off. . |
| 0368673 | 5/1990 | European Pat. Off. . |
| 0391597 | 10/1990 | European Pat. Off. . |

OTHER PUBLICATIONS

*Advanced Personal Communication*, Nikkei Communications, Feb. 18, 1991, pp. 52–72.

*Primary Examiner*—Stephen Chin
*Assistant Examiner*—Kevin Kim
*Attorney, Agent, or Firm*—Antonelli, Terry, Stout & Kraus

[57]  ABSTRACT

Duplicate optical fibers connect between a base station controller and a radio base station for each route. The duplicate optical fiber is connected to each of the radio base stations for each route through a star coupler. The radio base stations are arranged in each of areas so that the radio base stations for different routes are arranged adjacent to each other.

15 Claims, 45 Drawing Sheets

NOTE (1) NUMBER ON RIGHT SHOULDER REPRESENTS ROUND NUMBERS IN CASE OF EXPANSION THROUGHOUT IN THE WHOLE COUNTRY
(2) DYNAMIC/STATIC AT RIGHTHAND OF RELATION RECORD REPRESENTS OCCURRENCE FORM
(3) →: SINGLE OCCURRENCE
— —: MULTIPLE OCCURRENCE

FIG. 5A
FIG. 5B
FIG. 5C
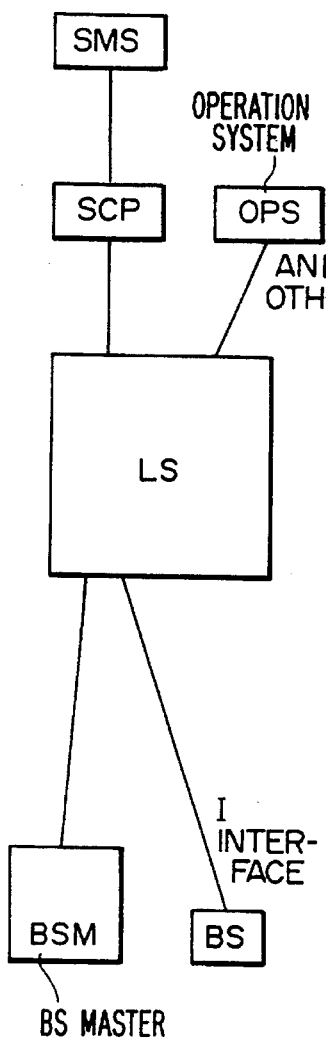
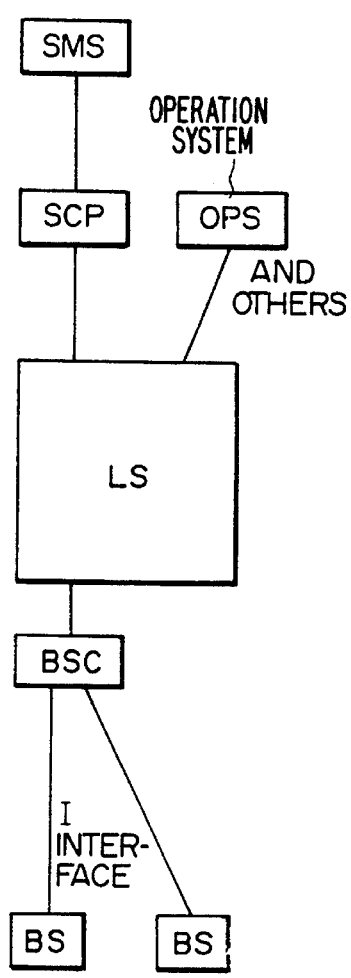
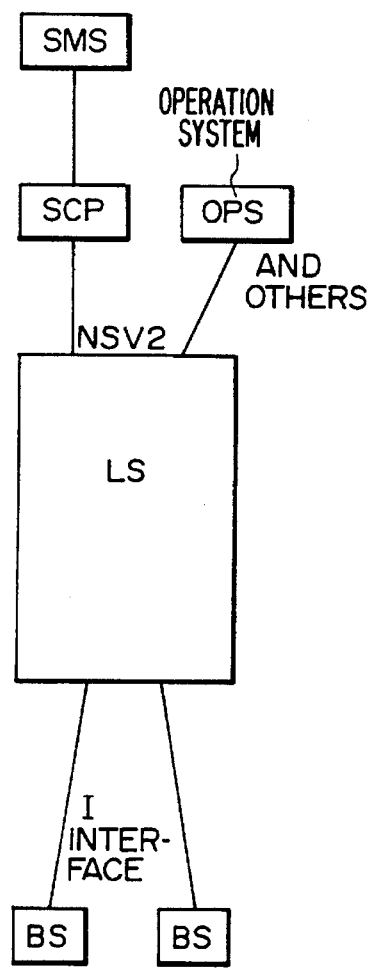

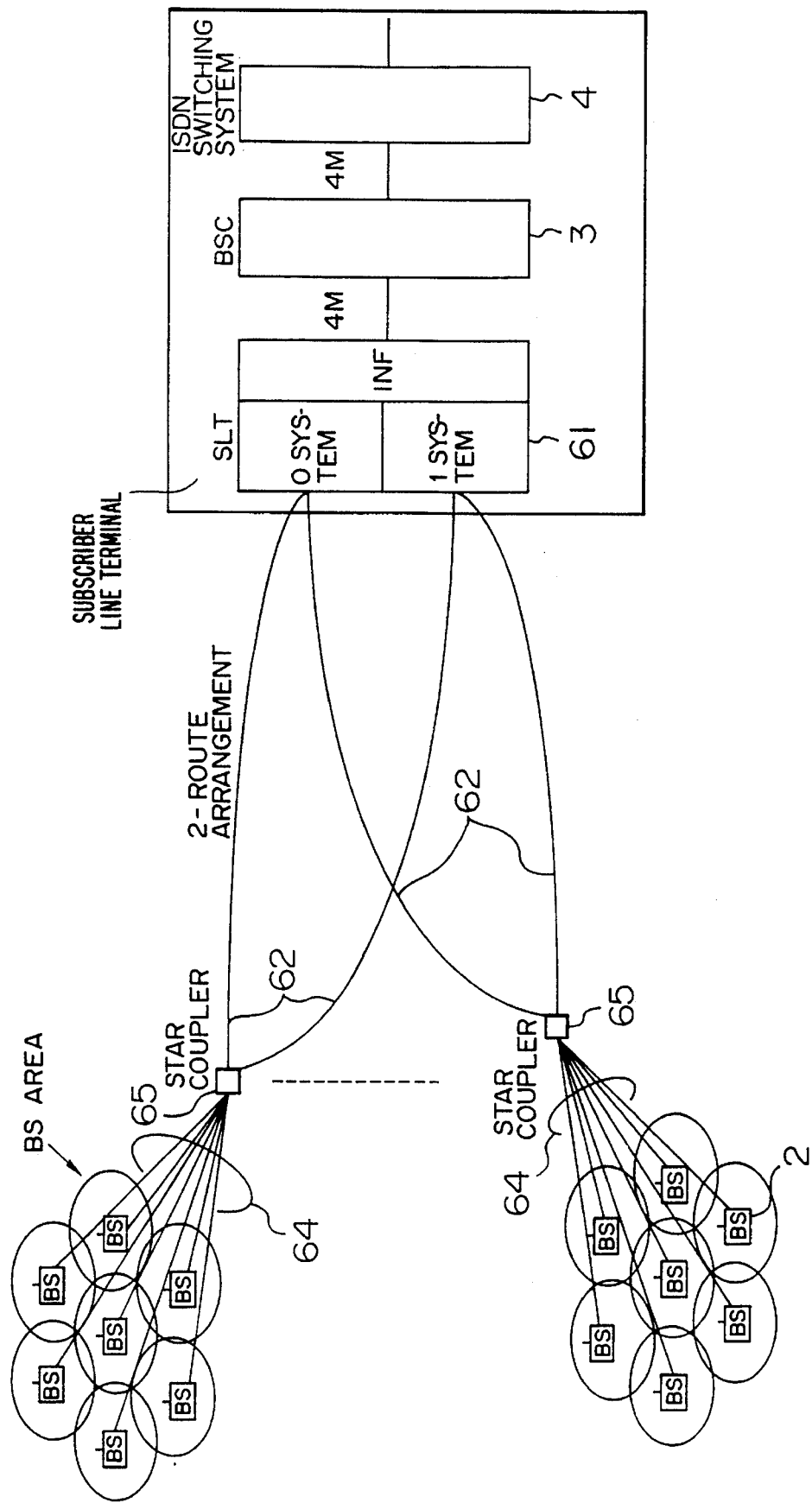

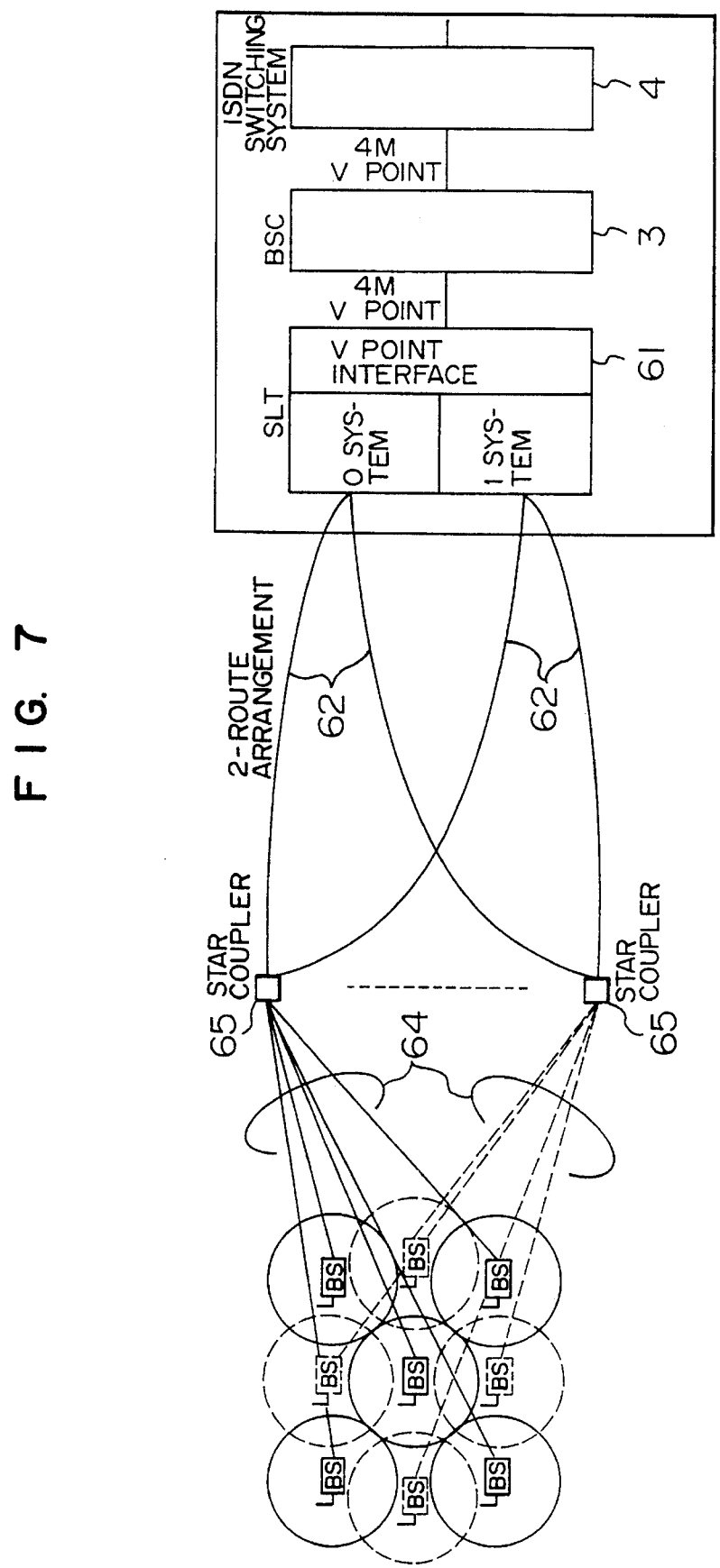

TRAFFIC INFORMATION
①
COMMAND AND
MESSAGE INFORMATION
②
TEST ACCESS
INFORMATION
③

TRAFFIC INFORMATION
④
COMMAND AND
MESSAGE INFORMATION
④
TEST ACCESS
INFORMATION
⑤

ATTACHED ON REAR SURFACE OF TELEPHONE BOX

ATTACHED ON UPPER SURFACE OF TELEPHONE BOX

SCENE 2: IN TRAIN

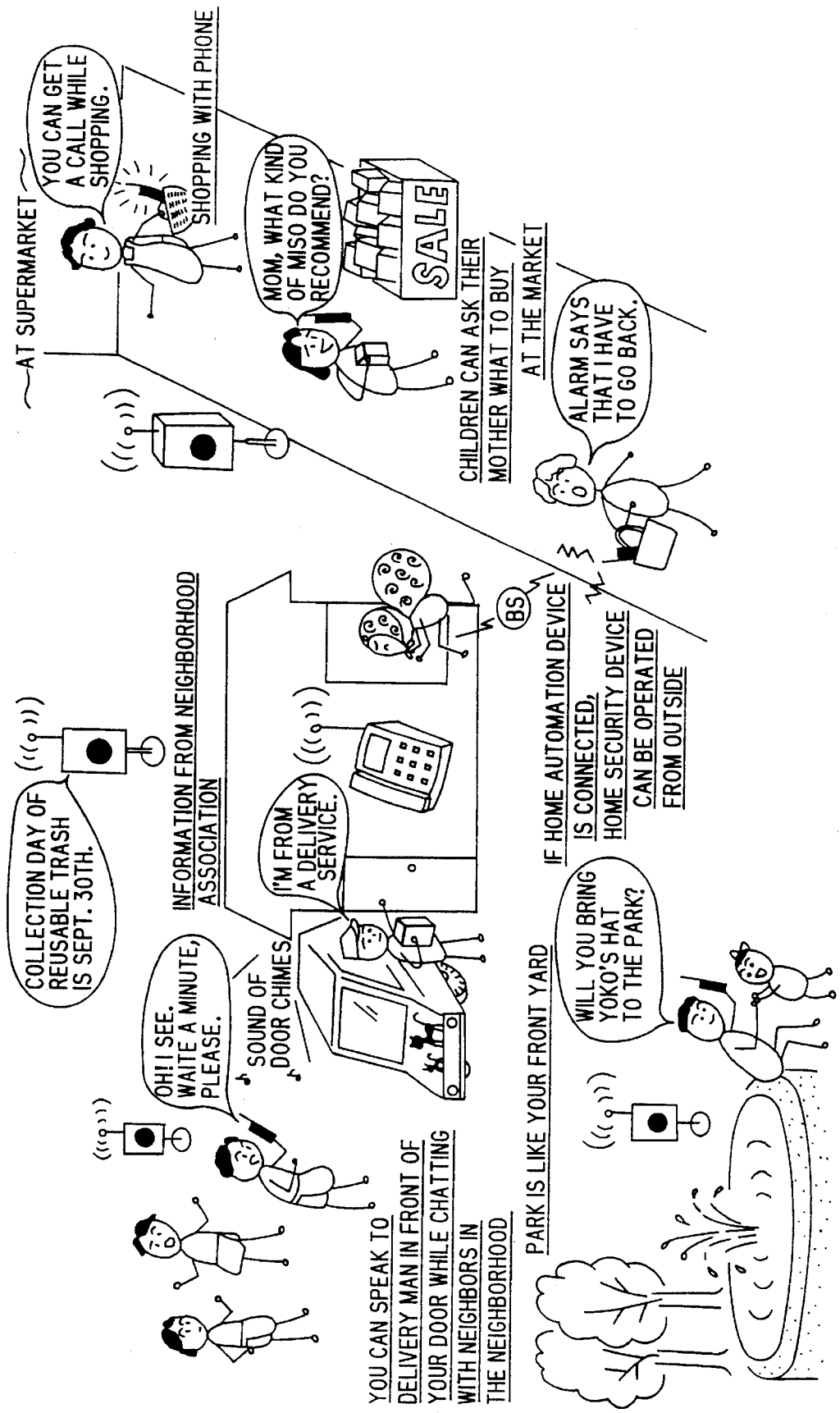

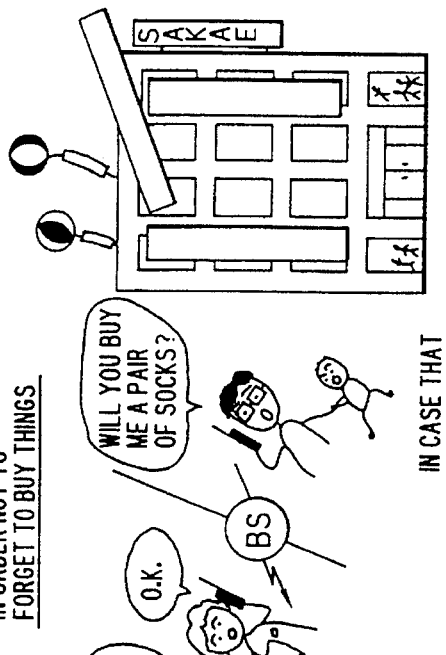
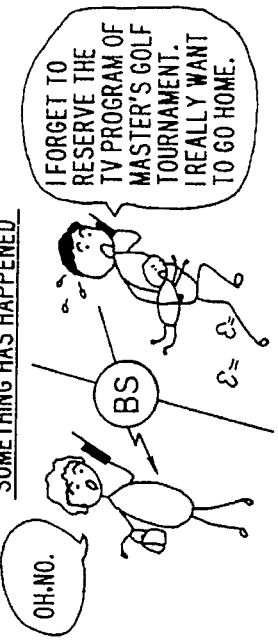
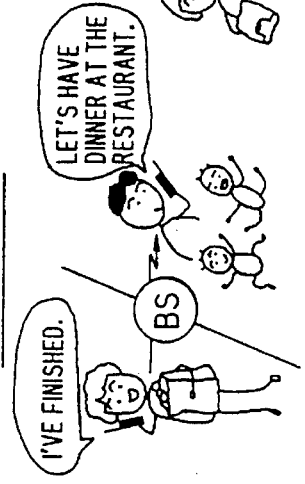
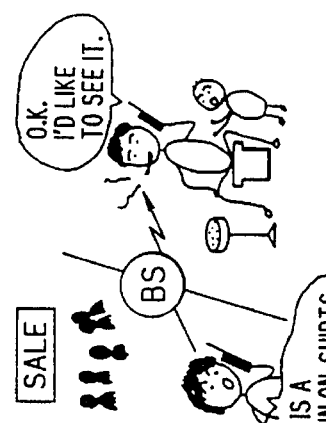
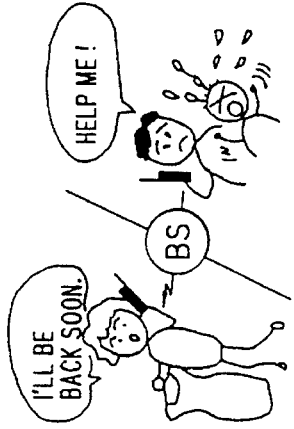
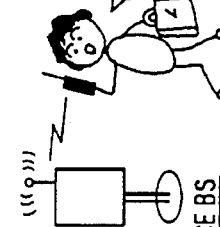

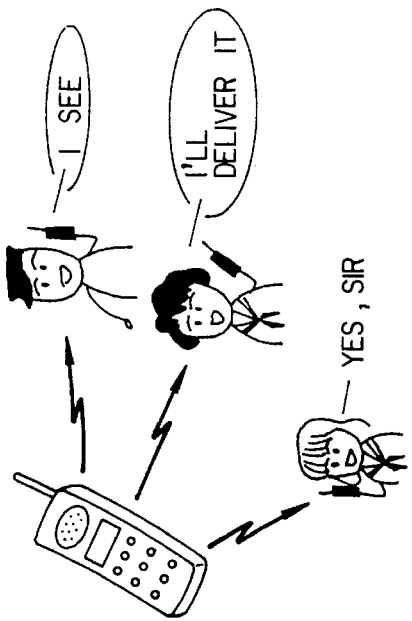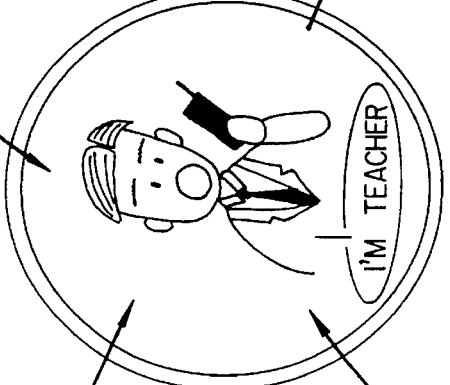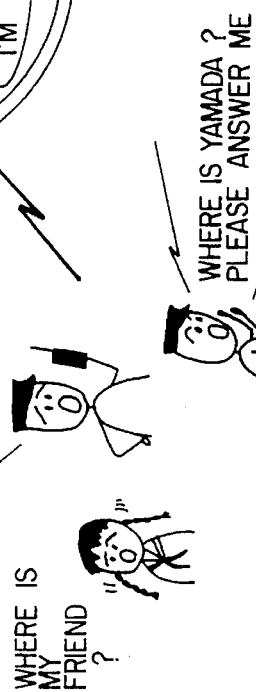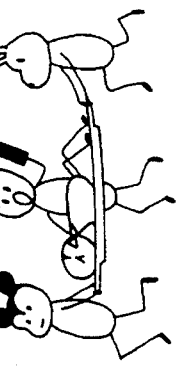
FIG. 46

FIG. 48A
| QUESTION I : |
| --- |
| BUSY SIGN IS INDICATED WHEN YOU MAKE A PHONE |
| IS NEXT BS OCCUPIED ALSO ? |
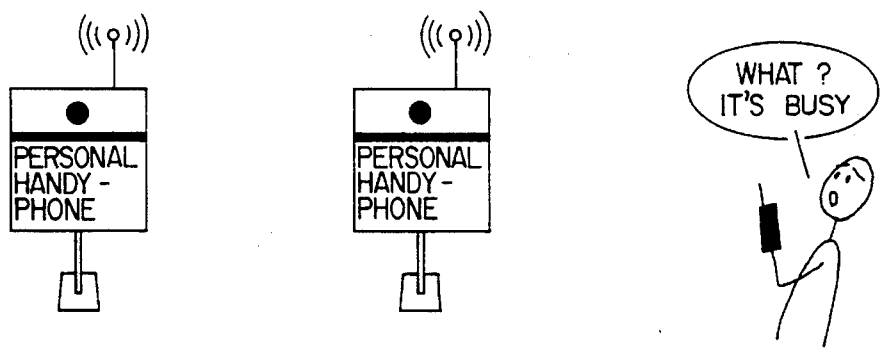
| FEATURE I : |
| --- |
| USED LINE STATE IS INDICATED FOR EACH BS. EVEN IF NEAREST BS IS BUSY, |
| IT IS INFORMED THAT NEXT BS IS AVAILABLE BY MOVING A LITTLE BIT. |
| NO LIGHT SIGN SHOWS OUT OF ORDER | ALL RED LAMPS SHOW FULL | GREEN LAMP SHOWS THERE IS AN EMPTY |
| --- | --- | --- |
|  |  |  |

FIG. 48B
| QUESTION 2 : |
| --- |
| A LARGE CROWD GATHERS AROUND HERE, SO I ALWAYS SEE BUSY SIGNAL. WHEN CAN I MAKE A PHONE CALL ? |
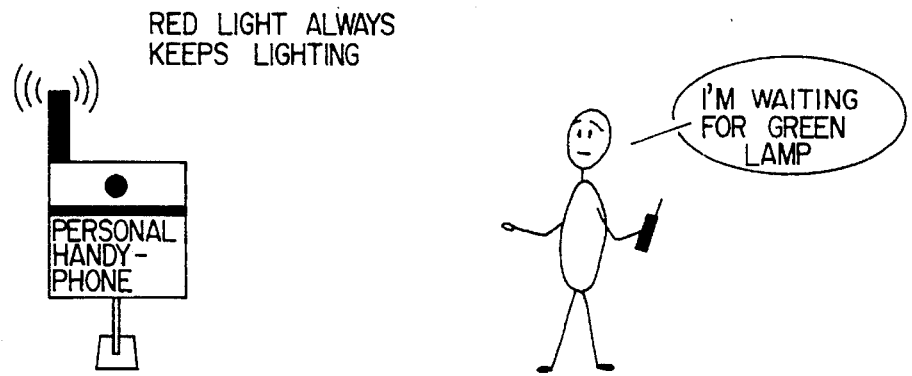
| FEATURE 2 : |
| --- |
| WHEN BS IS OCCUPIED, ORDER OF CALLING IS REGISTER. A SYSTEM THAT THE TERMINAL GETS A SIGNAL BY TURNS IS ESTABLISHED. |
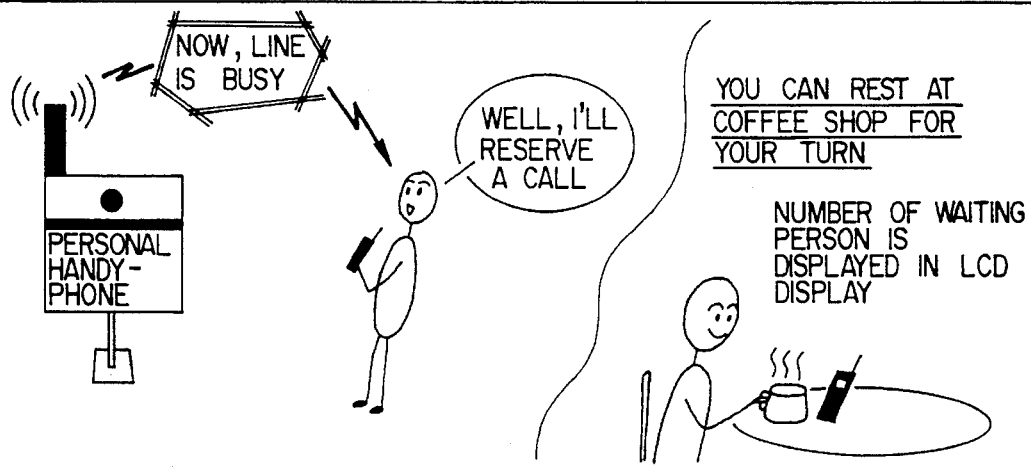

PORTABLE TELEPHONE SYSTEM

BACKGROUND OF THE INVENTION

The present invention relates to a portable telephone system utilizing portable telephones each connected to a subscriber line of a public switching network through radio transmission path.

A basic idea of a portable telephone system is described in a feature article, "ADVANCED PERSONAL COMMUNICATION", Nikkei Communications, Feb. 18, 1991, pp. 52–72.

SUMMARY OF THE INVENTION

It is an object of the present invention to provide an excellent portable telephone system in view of such an idea.

In order to achieve the above object, a representative example of the portable telephone system provided by the present invention is as follows.

The present invention provides the portable telephone system including a switching system, a plurality of radio base stations installed in a plurality of areas and connected to the switching system through duplicated optical fiber transmission paths, and portable telephones connected to the radio base station through radio transmission paths to thereby improve reliability of the system.

Further, similarly, in order to improve the reliability of the system, there is provided a portable telephone system including a switching system, a plurality of radio base stations for n-th route, each station installed in an area, and connected through n-th (where n is a natural number satisfying $k \neq n \cap m \geq n \geq 1$) duplicate optical fiber transmission paths different from k-th (where k is a natural number satisfying $k \neq n \cap m \geq n \geq 1$) duplicate optical fiber transmission paths, of k-th to m-th (where m is a natural number satisfying $m \geq 2$) routes, and portable telephones connected to the radio base station through radio transmission paths, the radio base station for n-th route being arranged in an area adjacent to radio base stations of a route different from the n-th route.

There is provided a portable telephone system including a plurality of radio base stations, each station installed in an area, a portable telephone switching system connected to the radio base stations through radio transmission paths, a service control point (SCP) for managing position information of a portable telephone, and a switching system connected to the radio base station through transmission paths for switching a call of the portable telephone through the radio base station in accordance with position information of the portable telephone managed in the network service point.

The portable telephone registers its own position information in the network service point in accordance with the reception state of radio waves from the radio base stations collected for a predetermined term, to thereby avoid occurrence of excessive position registration by a high-speed moving body.

There is provided a portable telephone system including an integrated services digital network (ISDN) switching system, a plurality of radio base stations connected to the ISDN switching system through an I interface and installed in each area, and portable telephones connected to the radio base station through radio transmission paths by ping-pong transmission.

The radio base stations each include ping-pong transmission means for performing ping-pong transmission between the portable telephone and the radio base stations in synchronism with a multi-frame system, prescribed in CCITT recommendation I.430, on the I interface, to thereby omit physical lines for synchronization.

There is provided a portable telephone system including a switching system, a plurality of radio base stations connected to the switching system through a transmission path and installed in each area, portable telephones connected to the radio base station through radio transmission paths, and test means connected to the switching system to designate relay between the switching system and the radio transmission path for test calling a specific radio base station through the switching system, to thereby distinguish a failure point upon occurrence of failure.

There is provided a portable telephone system including a switching system, a plurality of radio base stations connected to the switching system through transmission paths and being installed in each area, portable telephones connected to the radio base station by means of a part of a plurality of channels on radio transmission paths, and arrangement management means connected on-line to the switching system to designate a function used in the radio base stations, to thereby flexibly control the arrangement in accordance with transmission traffic.

Further, the present invention provides various portable telephone systems in order to realize better services.

For example, according to the portable telephone system including a switching system, a plurality of radio base stations for n-th route installed in each area and connected through n-th (where n is a natural number satisfying $k \neq n \cap m \geq n \geq 1$) duplicate optical fiber transmission paths different from k-th (where k is a natural number satisfying $k \neq n \cap m \geq n \geq 1$) duplicate optical fiber transmission paths, of k-th to m-th (where m is a natural number satisfying $m \geq 2$) routes, and portable telephones connected to the radio base station through radio transmission paths, the radio base station for n-th route being arranged in an area adjacent to a radio base station of a route different from the n-th route, a distance between the switching system and the radio base station is long but since transmission is made by the duplicate optical fiber transmission paths, the reliability of transmission is improved. Further, even if failure occurs within one route, the portable telephone system for other route can be utilized by an adjacent area.

BRIEF DESCRIPTION OF THE DRAWINGS

FIGS. 5A to 5C are block diagrams illustrating a physical arrangement of a first radio access function portion and a second radio access function portion;

FIG. 6 is a block diagram illustrating a network between BS and BSC using optical fibers;

FIG. 7 is a block diagram illustrating a network between BS and BSC using optical fibers;

FIG. 44 is a schematic diagram illustrating services provided by the portable telephone system to a user;

FIG. 45 is a schematic diagram illustrating services provided by the portable telephone system to a user;

FIG. 46 is a schematic diagram illustrating services provided by the portable telephone system to a user;

FIGS. 48A and 48B are schematic diagrams illustrating services provided by the portable telephone system to a user.

DESCRIPTION OF THE PREFERRED EMBODIMENTS

Embodiments of the portable telephone system according to the present invention are now described.

1. The whole configuration of the portable telephone system according to the embodiment is now described.

Figure 1:
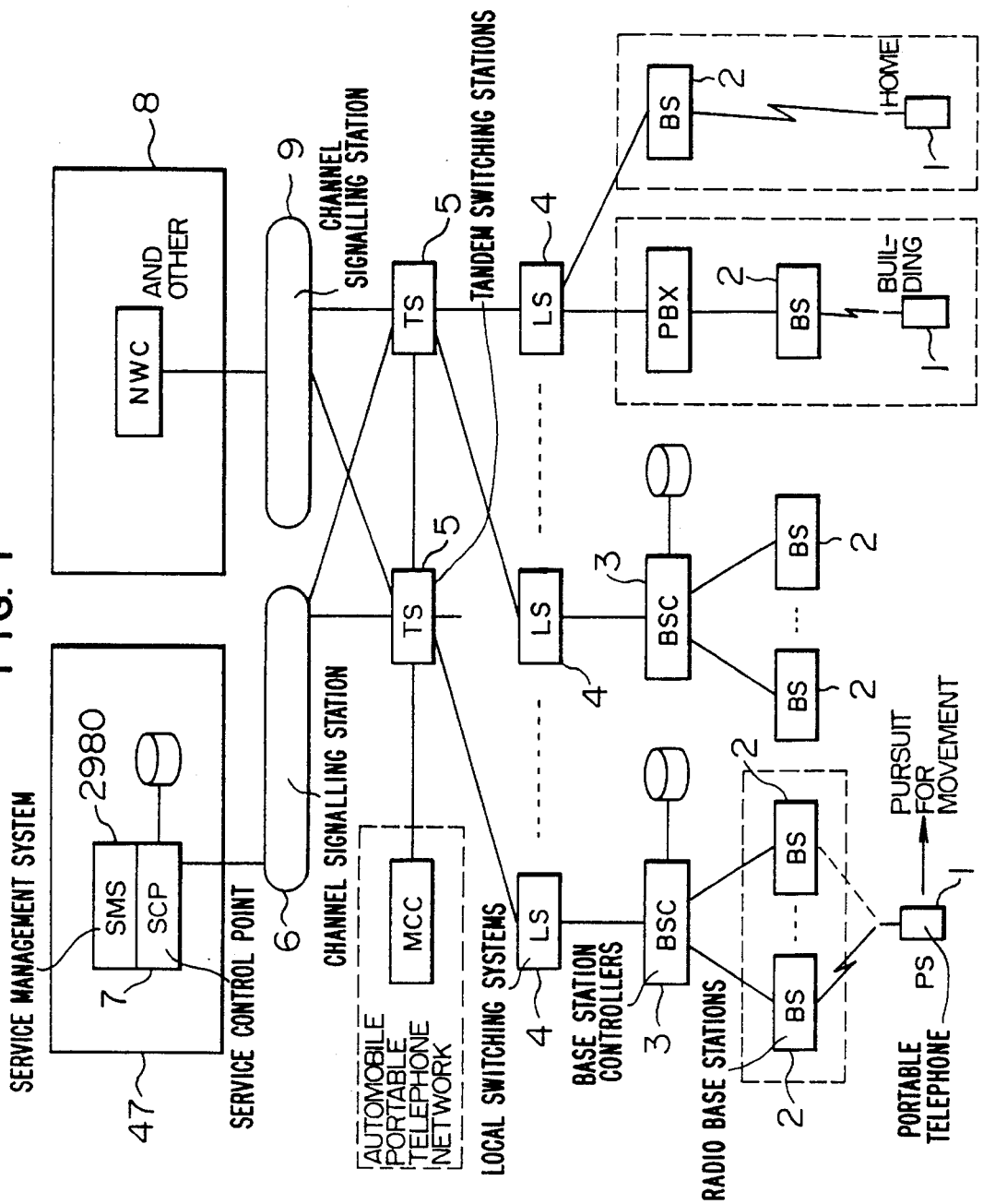
FIG. 1 is a block diagram schematically illustrating a physical structure of the whole portable telephone system.

FIG. 1 is a schematic diagram illustrating the whole physical configuration of the portable telephone system according to the embodiment.

In FIG. 1, numeral 1 denotes portable telephones (hereinafter referred to as "PS"), 2 radio base stations (hereinafter referred to as "BS"), 3 base station controllers (hereinafter referred to as "BSC"), 4 local switching systems (hereinafter referred to as "LS"), 5 tandem switching systems, 6 and 9 channel signalling networks, 7 a service control point (hereinafter referred to as "SCP"), and 8 a network center. In FIG. 1, SMS represents a service management system.

In such a system, each of the BS's 2 serves to communicate with the PS's 1 existing within a predetermined area. The PS 1 and the BS 2 are connected by a radio signal. Each of the PS's 1 registers its own position in the SCP 7 through the BS 2. The PS 1 places a call by means of the BS 2 positioned nearest the PS 1 by radio. When the BS 2 receives the call from the PS 1, the BS 2 transmits the call to the LS 4 through the BSC 3. The LS 4 informs the SCP 7 of a position of the called PS and obtains route information from the SCP 7 to the called PS to thereby route the call to the called PS.

A general idea of communication in the portable telephone system according to the embodiment is now described with reference to FIG. 2.

Figure 2:
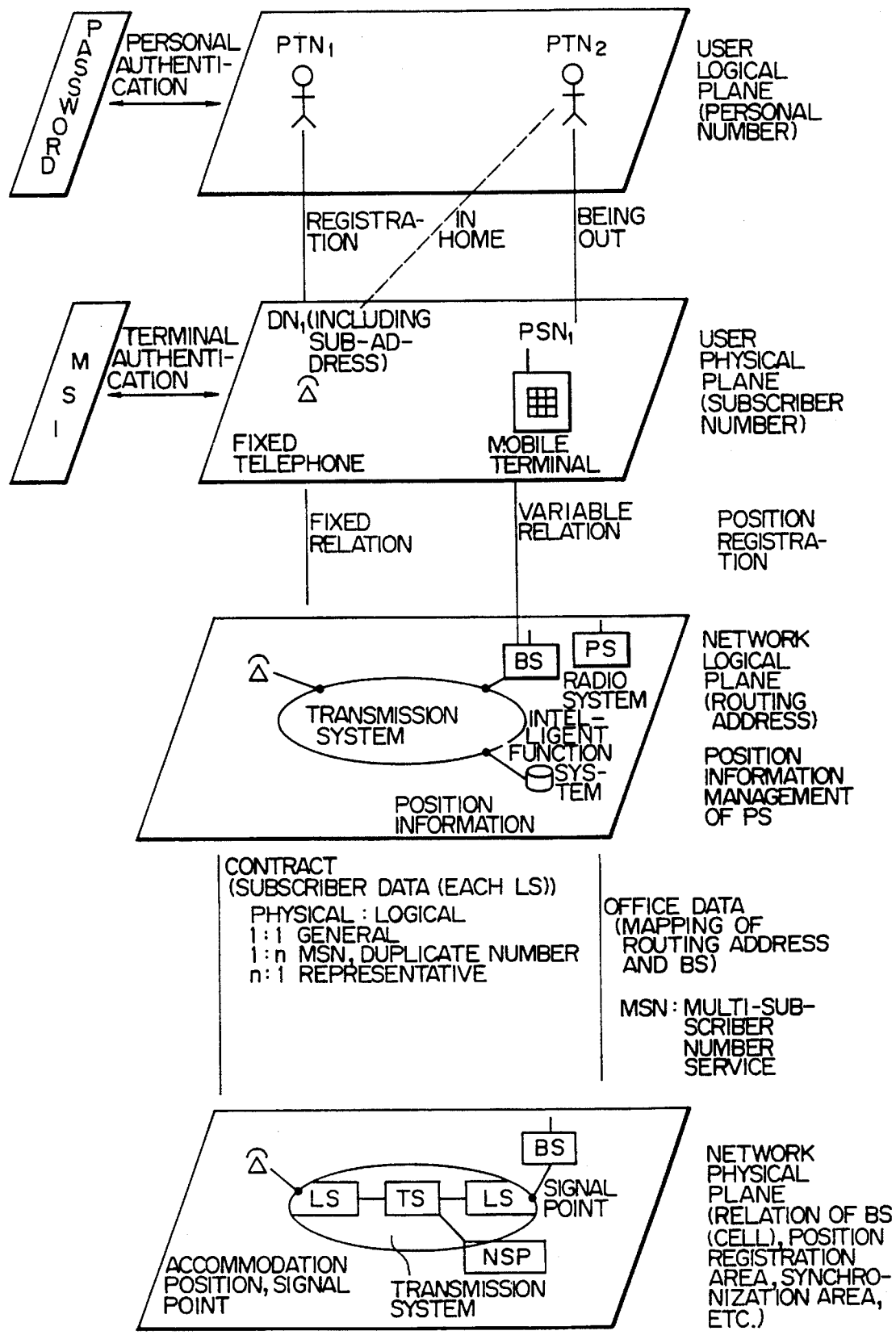
FIG. 2 is a schematic diagram illustrating an idea of communication in the portable telephone system.

As shown in FIG. 2, the portable telephone system according to the embodiment has the following distinctive features as compared with a conventional network accommodating fixed wire terminals.

① Registration of Position

Position information of a moving PS terminal (a point to be called when there is an incoming call to a terminal), that is, an access point to radio access function within the network is registered and controlled in response to movement of the terminal.

The access point is hereinafter referred to as "NRA (Network Routing Address)". As a unit of the NRA registered and controlled as the position information, there are a first system in which the BS 2 is used as a unit and a second system in which a group of BS's 2 is used as a unit, while the BS group unit of the second system is used in the embodiment in consideration of traffic of the position registration. A function is provided whereby a plurality of BS's are called simultaneously.

② Authentication of Terminal

In the portable telephone system, since the PS 1 is moved, authentication by a machine number (MSI) capable of specifying a terminal uniquely is required in addition to a subscriber number (PSN) of the radio terminal. In the embodiment, a function for authenticating the terminal is provided in the network.

③ Management of Correspondence between Individual and Terminal

In order to communicate with a called person regardless of a location of the called person, it is desirable to assign a personal number or a personal telecommunication number (PTN) to each individual and communicate with the called person by means of the personal telecommunication number. To this end, in the embodiment, the subscriber number (PSN) of the terminal corresponds to the PTN of the individual and the correspondence therebetween is managed. A system in which a plurality of PTN's are assigned to an individual is considered.

④ Authentication of Individual

In order to realize the management ③ of the correspondence between the individual and the terminal, it is necessary, for security, to verify whether the calling person or the called person is the individual corresponding to the terminal or not.

Figure 3:
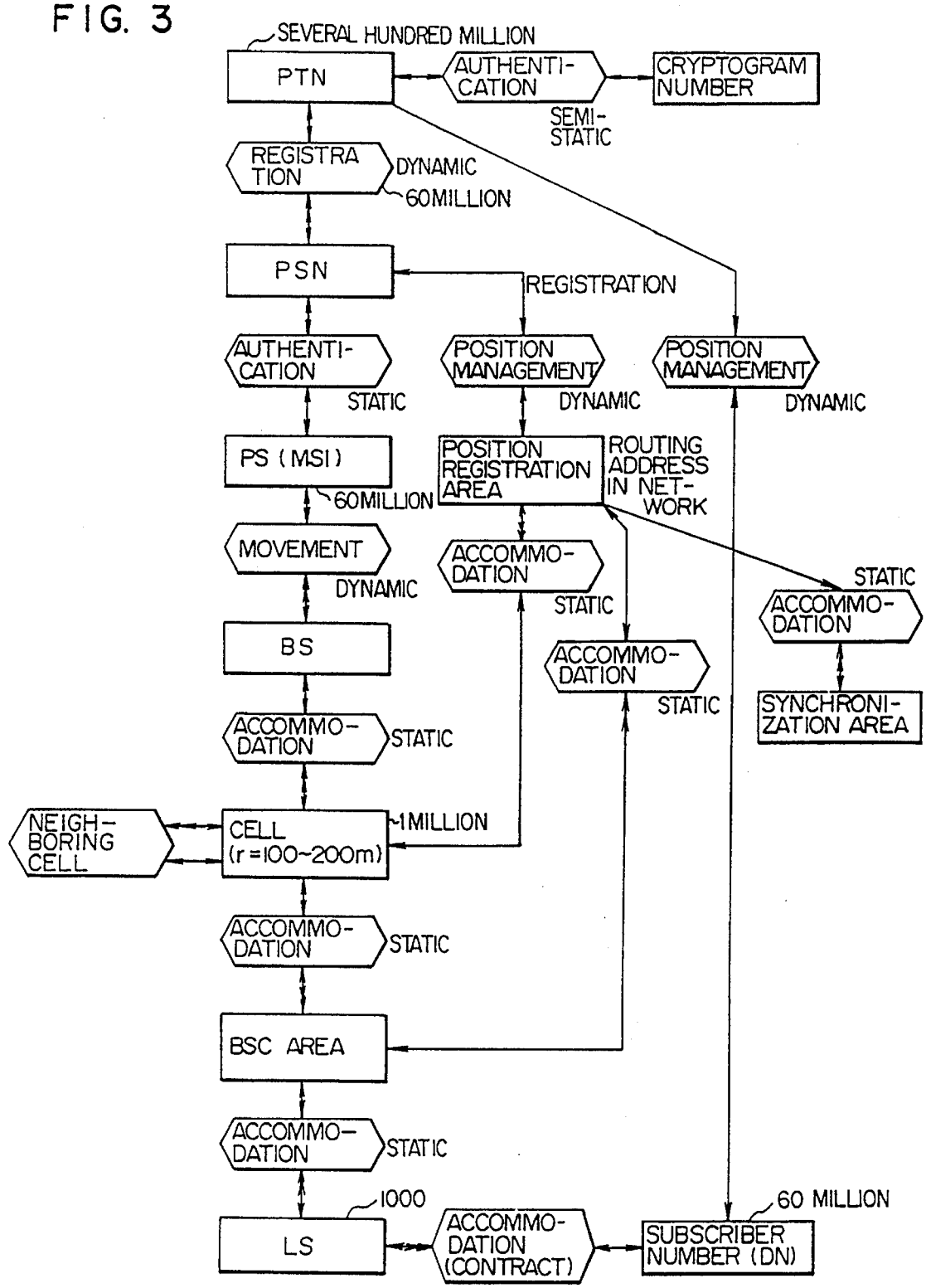
FIG. 3 is a schematic diagram illustrating an ER model of the portable telephone system.

Entities necessary for the above functions and the relation among the entities are shown as an ER model in FIG. 3.

A configuration of the network of the portable telephone system is now described.

Figure 4:
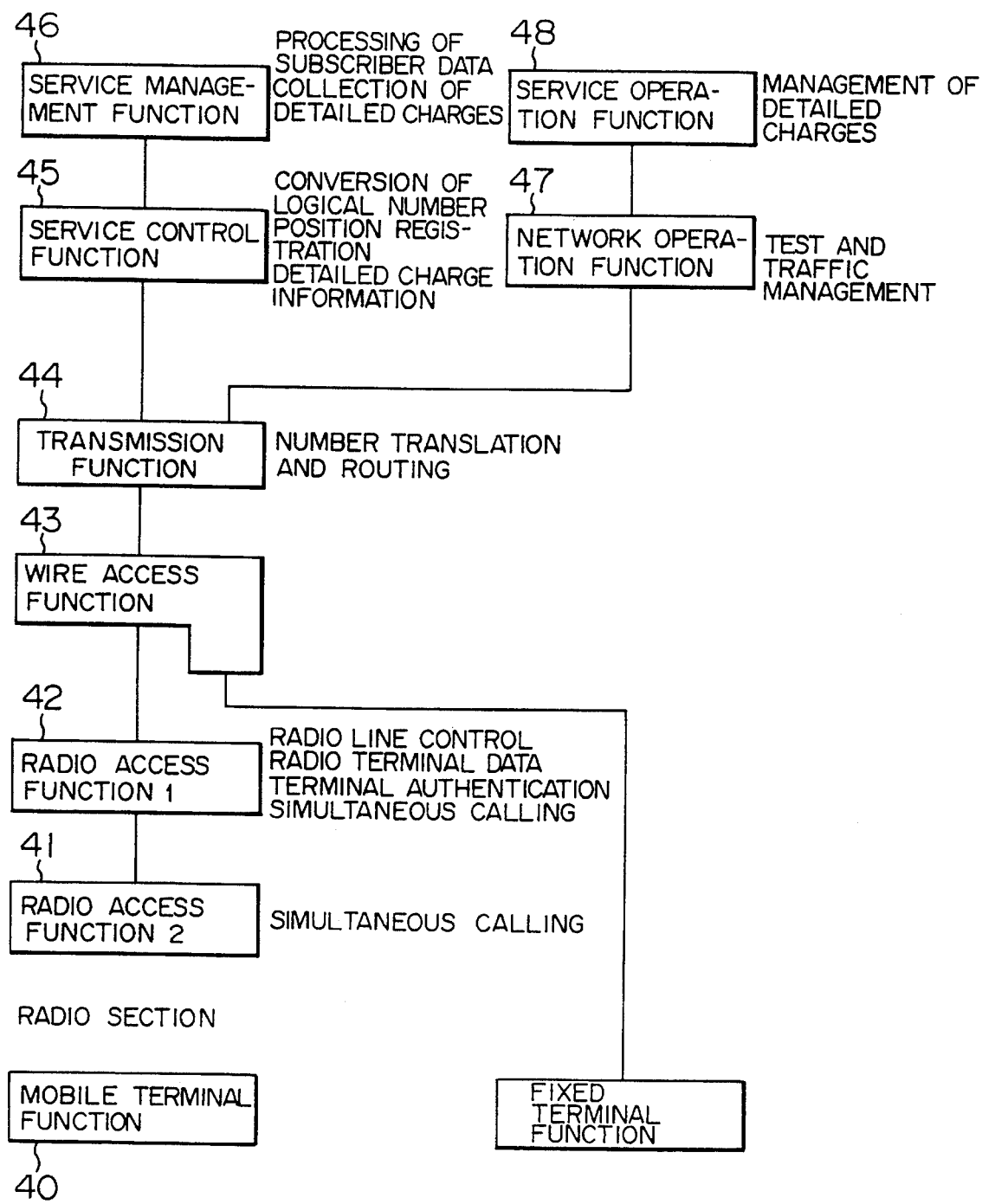
FIG. 4 is a schematic diagram illustrating a logical configuration of a network of the portable telephone network.

A logical configuration of the network is shown in FIG. 4.

This configuration includes a first radio access function portion 42 and a second radio access function portion 41 in addition to function portions (a wire access function portion 43, a transmission function portion 44, a service control function portion 45, a service management function portion 46, a network operation function portion 47 and a service operation function portion 48) of the conventional network accommodating fixed wire terminals. In the embodiment, the function portions 42 and 41 are provided subsequently to the wire access function portion 43 provided hitherto. This considers the affinity with the existing network. Further, the function is added or modified to function portions other than the first and second radio access function portions.

Functions of the function portions different from the conventional network are now described.

First of all, the second radio access function portion 41 is described.

The second radio access function portion 41 has the following functions.

① Simultaneous Calling

The PS is called up upon an arrival of an incoming call by using a PCH (simultaneous calling channel) of a radio section.

The first radio access function portion 42 is now described.

The first radio access function portion 42 has the following functions.

① Control of Radio Line

Management of idle and busy state of radio channel.

② Data Management of Radio Terminal

Data management of a radio terminal such as stop of calling operation.

③ Authentication of Terminal

Management of correspondence between the PSN and the MSI and implementation of the authentication procedure to the terminal.

④ Simultaneous Calling

Simultaneous calling upon arrival of an incoming call of radio termination function in a position registration area.

Added or modified functions to the transmission function portion 44 is now described.

① Number Translation Routing

Identification of the PSN number and routing to an access to service control and called radio access.

Added or modified functions to the service control function portion 45 are now described.

① Conversion of Logical Number

Conversion from PSN to a routing address.

② Management of Position Information

Modification of the routing address by the position registration signal.

③ Details of Charges

Preparation of raw information (calling and called address, metering index, connection time, etc.) for details of charges.

Added or modified functions to the service control function portion 46 are now described.

① Processing of Subscriber Data

Management of data (screening or the like) relative to the subscriber such as control of customers.

② Details of Charges

Preparation of details of charges on the basis of information from service control and transfer thereof to the service operation.

Added or modified functions to the service operation function portion 48 are now described.

① Management of Charges

② Service Order

Added or modified functions to the network operation function portion 48 are now described.

① Test

Test of radio access and radio termination function, and connection and disconnection test with a wire system.

② Traffic

Measurement of traffic such as outgoing and incoming calls, registration of calling and called positions and the like.

The foregoing description has described the logical configuration of the network.

When such a logical network is mapped on the physical network, three types of arrangements of the first radio access function portion 42 and the second access function portion 41 are considered as shown in FIGS. 5A to 5C.

FIGS. 5A to 5C show an extracted connection relation of BS2, LS4 and SCP in each of the arrangements. In FIGS. 5A to 5C, OPS represents an operation system.

FIG. 5A shows an arrangement a in which one BS is selected as a BS master (BSM) from a group of BS's and the BS master has the function of controlling BS's. In this arrangement, since the BS's 3 and the LS's 4 are connected directly when the existing LS's are used, there is a case where it is necessary to provide to the LS4 the function of data rate or speed conversion and change-over of channel in communication when interface of BS 3 is different from that of the LS 4.

FIG. 5B shows an arrangement b in which the BS controller (BSC) for controlling BS is externally provided to LS 4. According to this arrangement, since interface of BS 3 and LS 4 can be matched by BSC 3, the existing LS can be used as it is.

FIG. 5C shows an arrangement c in which the radio access function is merged into the LS switching system. According to this arrangement, the existing LS cannot be used as it is, while there is merit in less duplication of facilities.

The portable telephone system according to the present invention is now described by taking the arrangement b in which the existing LS can be used as it is as an example. Further, an ISDN switching system is assumed for the existing LS 4 used in the arrangement b.

The whole configuration of the portable telephone system shown in FIG. 1 shows the arrangement b. Physical mapping positions of the functions shown in FIG. 4 in the arrangement b are shown in Table 1.

③ Coping with temporarily increased traffic due to events (for example, large exhibition, sports meeting, concert and the like).

In order to cope with the above points, it is desirable that increase of BS's, provision of a movable network or disposition of BS's having large capacity is attained and the network in which a necessary number of CH's are assigned in accordance with necessity in each of BS's by remote control is structured. Thus, in the embodiment, the network between BS 2 and BSC 3 is structured by the network (hereinafter referred to as "FTTZ (Fiber To The Zone)" using optical fiber which is easy to construct the network.

There is a report (Nikkei Communications, Aug. 27, 1990) that the subscriber network using the optical fiber is commercially realized from the viewpoint of price by two telephone lines of the current metallic system or one ISDN line (2B+D), and it is expected that the network is economically advantageous.

FIG. 6 shows a configuration of the FTTZ.

As shown in FIG. 6, the FTTZ provided by the embodiment includes an SLT (Subscriber Line Terminal) 61 connected between the BSC 3 and optical fibers 62 and having O/I conversion and I/O conversion function, and the transmission paths of the BSC 3 are led to the BS areas through two optical fibers (duplicate structure is attained for high reliability of the system). An optical branch device (star coupler) 65 is disposed in the BS area or in the vicinity

TABLE 1

| Function | PS | BS | BSC | LS | NSP | NSSP | Charge Center |
|---|---|---|---|---|---|---|---|
| Control of Radio Line | O | (Release Control) O | (Switching Control) O | | | | |
| Radio Terminal Data | | | O | | O | | |
| Authentication of Terminal | | | O | | O | | |
| Simultaneous Calling | | (Radio section) O | (Plural BS's) O | | | | |
| Number Translation/ Routing | | | | O | | | |
| Logical Number Conversion | | | | | O | | |
| Sending of Position Registration Signal | O | | | | | | |
| Position Information Management | | | | | O | | |
| Sending of Detailed Charges | | | | (Upon Fixed Incoming) O | (Upon P Incoming) O | Charge Center O | |
| Management of Detailed Charges | | | | | | | O |
| Subscriber Data Processing | | | | | O | (Customer Control) O | |
| Switch Function | | O | O | O | | | |

2. Configuration of Network between BS and LS

The configuration of the network between BS and BSC is now described.

It is considered that an existing metallic configuration network is used as a basis for the network configuration between BS 2 and BSC 3, while in this case it is difficult to cope with the following points.

① Greatly increased demand for portable telephones.

② Existence of locally heavy traffic areas such as stations, the vicinity of bus terminals, business quarters and the like.

thereof to branch signals from the optical fiber 62 and each of the BS's is connected to the optical branch device through a single optical fiber 64. Further, each of the BS's includes an optical transmission line termination device or optical network unit (ONU) for terminating the optical fiber and interfacing with the BS.

As described above, with the duplicate structure of the optical fibers 62 which must be built a long distance, when one of the optical fibers fails, the other optical fiber can be used to continue communication.

The optical fiber having a large capacity can be used to structure a flexible system as compared with metallic cable. That is, by changing the allocation of time slots on the optical fibers 62 and the multiplicity of frequency in accordance with increase and movement of BS, the disposition of a large-capacity BS and allocation of the number of channels for each BS, flexible system can be structured.

In the embodiment, the FTTZ supports the service 2B+D and 23B+D (named the narrow band service) of I.430 and I.431 of the CCITT recommendation.

In the structure of the FTTZ shown in FIG. 6, it is not sufficient that the star coupler 65 is not duplicated.

As shown in FIG. 7, it is desirable that the adjacent BS cell (area covered by each BS) is connected to the optical coupler and devices of another route, so as to prevent the whole area from failing due to a partial failure.

Thus, even if the star coupler 65 fails, communication in substantially all areas can be ensured through the adjacent BS's.

The ONU for terminating the optical fiber and interfacing BS is now described.

The ONU is an optical network termination unit which is disposed between the BS 2 and the optical fiber 64 and provides the ISDN (2B+D, 23B+D) service by T point interface of I.430 prescribed in CCITT.

As shown in FIG. 6, a plurality of signals to the ONU are time-division multiplied in the optical signals from the SLT 61 to the ONU. The ONU 1 selects a signal in the designated time slot from the received optical signals and outputs the selected signal to the BS 2 as an electric signal. On the other hand, the ONU 1 stores the signal from the BS 2 in the designated time slot and sends it to the SLT 61 as an optical signal.

Figure 8A:
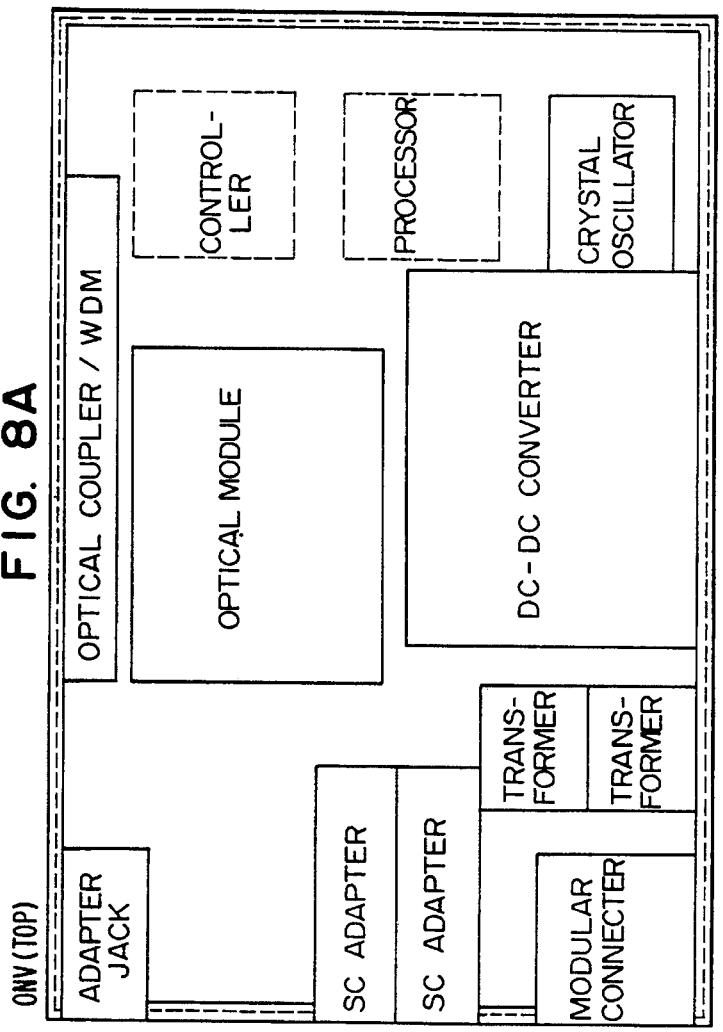
FIGS. 8A to 8C are block diagrams illustrating a structure of ONU.
Figure 8C:
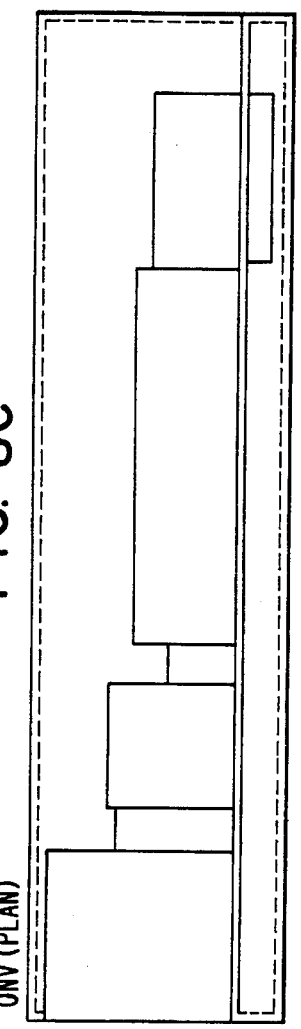
Figure 8B:
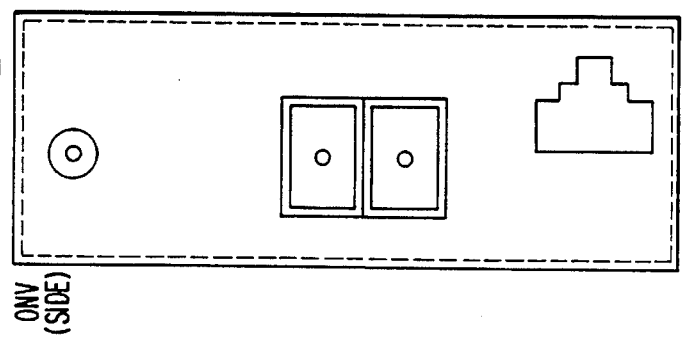

An example of a configuration of the ONU is shown in FIGS. 8A to 8C and main functions of the ONU are described in Table 2. FIGS. 8A to 8C show top, side and plan views of the ONU, respectively.

TABLE 2

| Item Number | Item | ONU1-1 | ONU1-2 | ONU1-3 |
|---|---|---|---|---|
| 1 | Available Services and Number (T Point Interface) | 2B + D (CCITT I.430) 64 Kb/s or 128 Kb/s (TTC JT-I430-8) | 2B + D × 2 (CCITT I.430) 64 Kb/s × 2 or 128 Kb/s × 2 (TTC JT-I430-8) | H11/D or $nH_0$ + mB + D ($6n + m \leq 23$) (CCITT I.431) 192 Kb/s, 256 KG/s, 384 Kb/s, 512 Kb/s, 768 Kb/s, 1024 Kb/s or 1536 Kb/s (TTC JT-I431.a) |
| 2 | Transmission System | | | |
| | Transmission Medium | Single Mode Fiber | Same as Left | H11/D or $nH_0$ + mB + D ($6n + m \leq 23$) (CCITT I.431) 192 Kb/s, 256 KG/s, 384 Kb/s, 512 Kb/s, 768 Kb/s, 1024 Kb/s or 1536 Kb/s (TTC JT-I431.a) |
| | Transmission Wavelength | 1.3 μm Band | " | H11/D or $nH_0$ + mB + D ($6n + m \leq 23$) (CCITT I.431) 192 Kb/s, 256 KG/s, 384 Kb/s, 512 Kb/s, 768 Kb/s, 1024 Kb/s or 1536 Kb/s (TTC JT-I431.a) |
| | Transmission Code | NRZ Scrambled bipolar (binary value) | " | H11/D or $nH_0$ + mB + D ($6n + m \leq 23$) (CCITT I.431) 192 Kb/s, 256 KG/s, 384 Kb/s, 512 Kb/s, 768 Kb/s, 1024 Kb/s or 1536 Kb/s (TTC JT-I431.a) |
| | Transmission Speed | 28.2624 Kb/s | " | H11/D or $nH_0$ + mB + D ($6n + m \leq 23$) (CCITT I.431) 192 Kb/s, 256 KG/s, 384 Kb/s, 512 Kb/s, 768 Kb/s, 1024 Kb/s or 1536 Kb/s (TTC JT-I431.a) |
| | Up/Down Multiplexing Method | TCM (Time compression multiplex) | " | H11/D or $nH_0$ + mB + D ($6n + m \leq 23$) (CCITT I.431) 192 Kb/s, 256 KG/s, 384 Kb/s, 512 Kb/s, 768 Kb/s, 1024 Kb/s or 1536 Kb/s (TTC JT-I431.a) |
| | Service Multiplexing | TDM | " | H11/D or $nH_0$ + mB + D |

TABLE 2-continued

| Item Number | Item | ONU1-1 | ONU1-2 | ONU1-3 |
|---|---|---|---|---|
| | Method | | | $(6n + m \leq 23)$<br>(CCITT I.431)<br>192 Kb/s, 256 KG/s,<br>384 Kb/s, 512 Kb/s,<br>768 Kb/s, 1024 Kb/s<br>or 1536 Kb/s<br>(TTC JT-I431.a) |
| | Inter-Subscriber Multiplexing Method | Up TDMA/Down TDM | " | $H11/D$ or $nH_0 + mB + D$<br>$(6n + m \leq 23)$<br>(CCITT I.431)<br>192 Kb/s, 256 KG/s,<br>384 Kb/s, 512 Kb/s,<br>768 Kb/s, 1024 Kb/s<br>or 1536 Kb/s<br>(TTC JT-I431.a) |
| | Service providing Method | 1.5 μm WDM | " | $H11/D$ or $nH_0 + mB + D$<br>$(6n + m \leq 23)$<br>(CCITT I.431)<br>192 Kb/s, 256 KG/s,<br>384 Kb/s, 512 Kb/s,<br>768 Kb/s, 1024 Kb/s<br>or 1536 Kb/s<br>(TTC JT-I431.a) |

In Table 2, the ONU1-1 offers a set of CCITT I.430, the ONU1-2 offers two sets of CCITT I.430, and the ONU1-3 provides a set of CCITT I.431.

Figure 9:
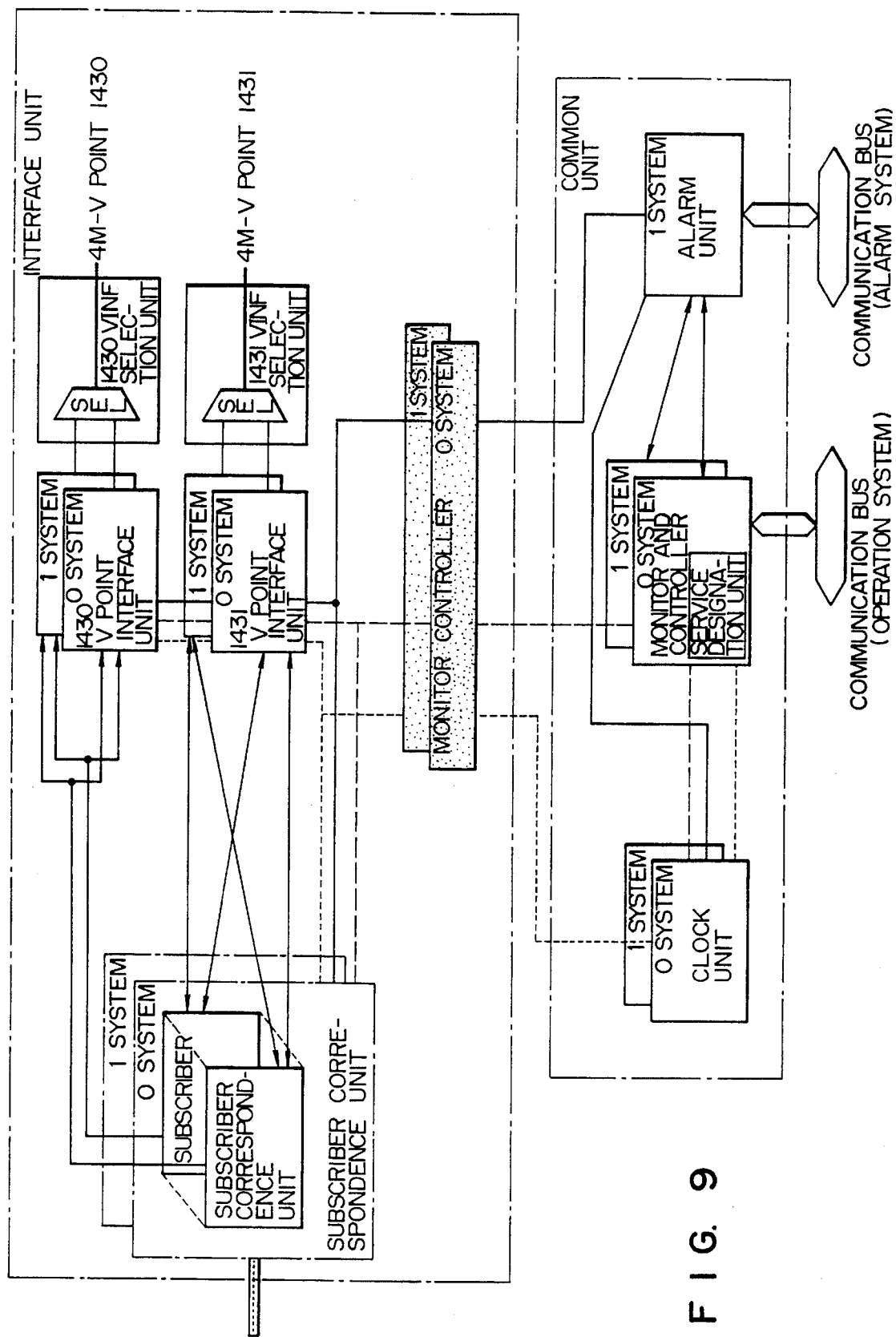
FIG. 9 is a block diagram illustrating a structure of SLT.

An example of a configuration of the SLT 61 is shown in FIG. 9 and main functions thereof are described in Tables 3 and 4.

TABLE 3

| Item Number | Item | Specification | Notes |
|---|---|---|---|
| 1 | V Point | 4 MV | |
| | Interface | 4 M PM Code<br>(4.096 Mb/s)<br>STM-1 | |
| | | 150 M<br>(155.52 Mb/s) | |
| 2 | Line | 4MV | |
| | Accommodation Capacity | 1430:16 HW/Frame (900 Subscribers)<br>1431:96 HW/Frame (480 Subscribers)<br>STM-1 | |
| | | 1 HW/SYS (75 Subscribers)<br>(In Conversion of 24B Services per Subscriber) | |
| 3 | Clock | Reception Clock 64K + 8K | |

TABLE 3-continued

| Item Number | Item | Specification | Notes |
|---|---|---|---|
| 4 | Interface Service Setting Capacity | Compound Bipolar<br>2B + D<br>(Service Setting Function by Provisions of CCITT I.430)<br>64 Kb/s or 128 Kb/Exclusive Line (Service Setting Function by Provisions of TTC JT-I430-a)<br>$H_{11}/D$ or $nHo + mB + D$<br>$(6n + m \leq 23)$ (Service Setting Function by Provisions of CCITT I.431)<br>192 Kb/s, 256 Kb/s, 384 Kb/s, 512 Kb/s, 768 Kb/s, 1024 Kb/s or 1536 Kb/s (Service Setting Function by Provisions of TTC JT-I431-a) | |
| 5 | Available Service Capacity | Per Subscriber<br>(per N-ONU1)<br>Max. 24 × B<br>Ave. 12 × B | |

TABLE 4

| Item Number | Item | Specification | Notes |
|---|---|---|---|
| 9 | Loop Test Function | Loop Back Test of Corresponding to subscriber N-ONUI Loop Back Test | (OSUI: Optical Subscriber Unit) |
| 10 | Monitoring Function of Interior of Apparatus | On-Line Test FTS Pattern Collation Vertical parity Collation | |
| 11 | Redundant Structure | Duplex and Hot Standby System 1(active) + 1(standby) a) V Point Interface Unit b) Subscriber Unit (OSUI) c) Clock Unit d) Monitor Control Unit | (OSUI: Optical Subscriber Unit) |

3. Position Registration System

The position registration system of the portable system according to the embodiment is now described.

In order to perform the call connection control (incoming call processing) to the PS1, the PS1 is required to perform detection and registration (position registration) of the current area to the network.

As described above, in the embodiment, since a unit of NRA is used as a unit of the BS group, the PS1 detects the BS 2 group which covers an area in which the PS1 is present and registers the detected BS group in the network.

Figure 10:
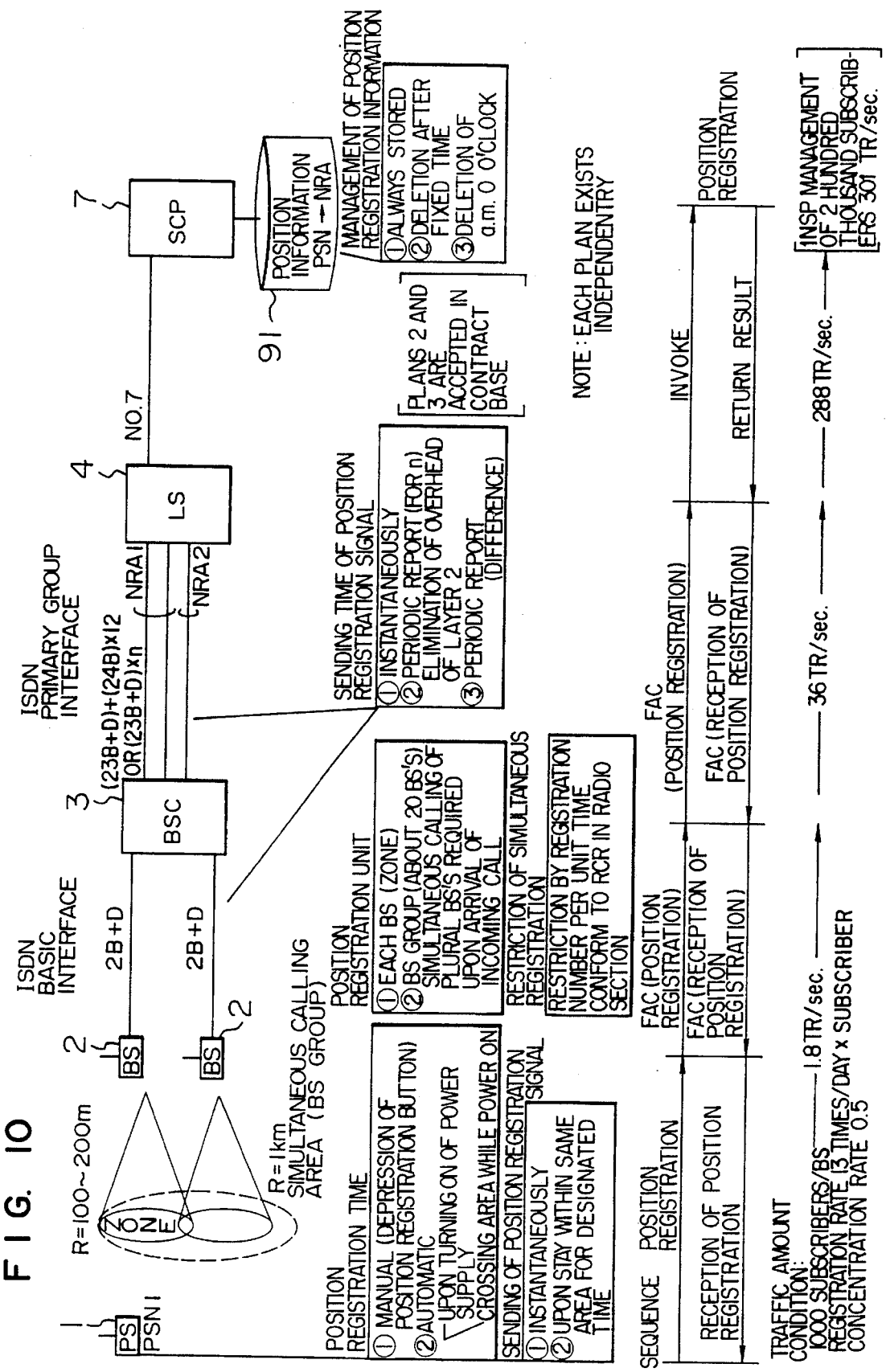
FIG. 10 is a schematic diagram illustrating a position registration system.

FIG. 10 schematically illustrates the position registration systems collectively.

In the embodiment, in the system shown in FIG. 10, the position registration unit is the BS group unit as described above. Opportunity for position registration is given manually and automatically. Opportunity of sending the position registration signal from the BSC 3 to the LS 4 is made instantaneously when the position registration is requested by the BS 2. Position information is always stored in a data base 91 of the SCP 7. Further, in order to avoid excessive concentration of the position registration, registration is simultaneously restricted on the basis of the number of registrations per unit of time.

When the position registration is made in response to manual instructions of a person carrying the PS 1, the network cannot understand the position of the PS 1 and cannot transmit an incoming call if the position registration indication is not made each time the person carrying the PS 1 changes location. Thus, it is necessary for the PS itself to detect the current area and to make the position registration request. As a system in which the PS 1 makes the position registration automatically, there is considered a system in which the PS itself makes registration automatically when a boundary of the area covered by the BS 2 group is crossed, while when the PS terminal is taken into a car and is moved at high rate of speed in the car, a frequency of crossing the boundary of the area covered by the BS 2 group is increased. When the boundary of the area covered by the BS 2 group is crossed, heavy traffic for position registration occurs in the network.

In the embodiment, the automatic position registration of the PS 1 is made by the following system.

Figure 11:
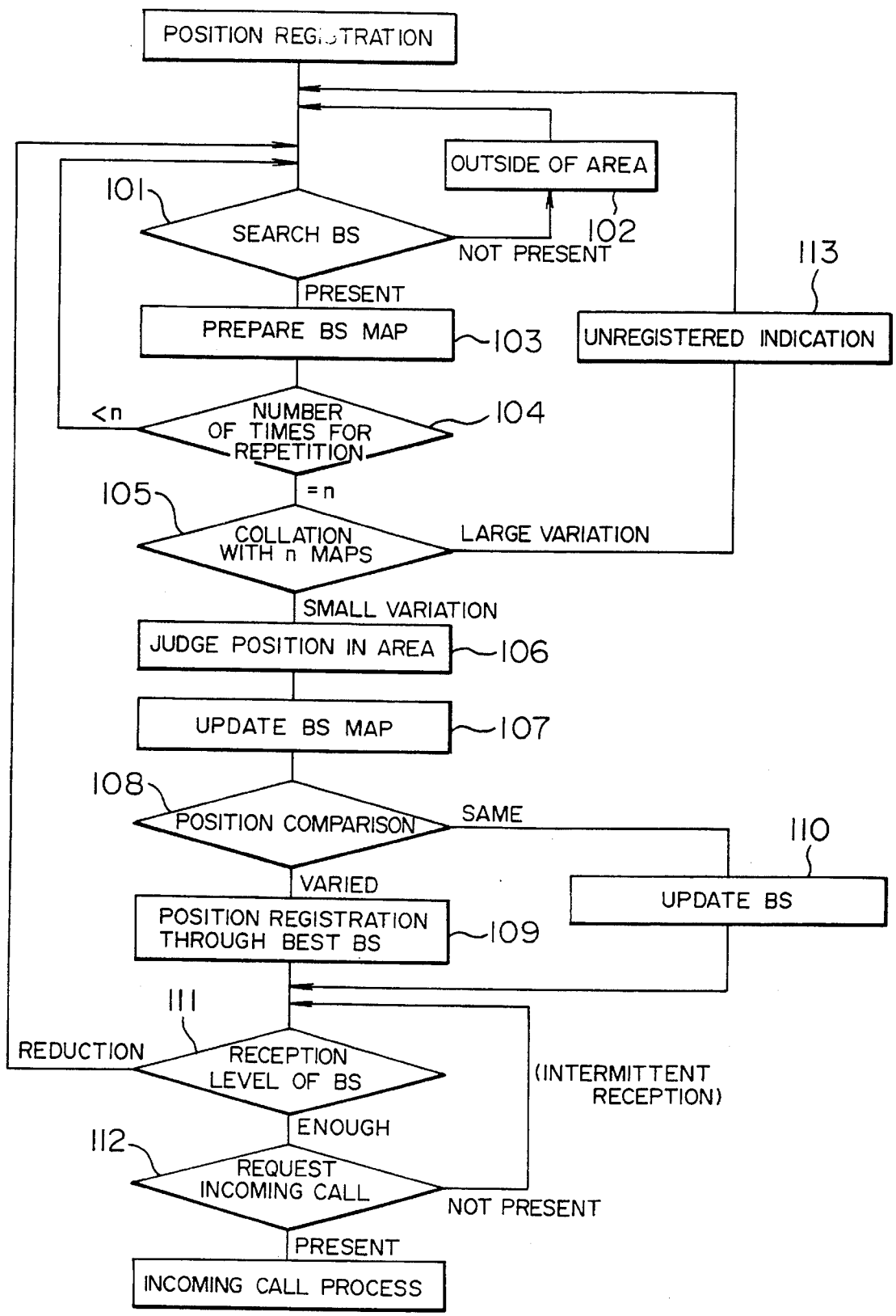
FIG. 11 is a flowchart illustrating a process procedure of the position registration process made by PS.

FIG. 11 shows the position registration procedure made by the PS 1.

The PS 1 receives BCCH transmitted by m BS's (m radio zones) in the simultaneous calling area (area covered by the BS group and corresponding to the position registration unit) and prepares a BS map (101, 102, 103). The BS map shows an arrangement of BS's which transmitted BCCH's in order of reception level of the BCCHs received by the PS 1.

After the above process is repeatedly made n times at intervals of a predetermined time, combinations of BS's in the prepared BS maps are compared. When the contents thereof are varied largely, the position registration is not made and "unregistered indication" is made (113). After a fixed time, the processes (101, 102 and 103) are resumed (105).

On the other hand, when variation of the combination of BS in the BS map is small, the simultaneous calling area in which the PS 1 itself exists is judged on the basis of the received BCCH of the BS and a final BS map is prepared (106, 107).

When the judged simultaneous calling area is different from the area registered at the last calling time, the BS having the best reception state (or BS having an idle control channel and capable of communicating with) is selected from the BS map and the position registration signal is transmitted (108, 109).

While monitoring BS selected in (109) (or monitoring BS in the map successively), an intermittent reception mode is entered to become a waiting state for a request of an incoming call. When the reception level of BS is lowered, the process returns to the processes starting from (101). The reception level of a plurality of BS's (BS in the map has preference) is monitored and collation with the BS map is made.

On the other hand, when the position in the area newly judged in (106) is identical with the simultaneous calling area registered at the last calling time in the last judgment, the position registration is not made and the BS to be registered is changed to the BS in the updated BS map to be placed in the waiting state (104).

Figure 12:
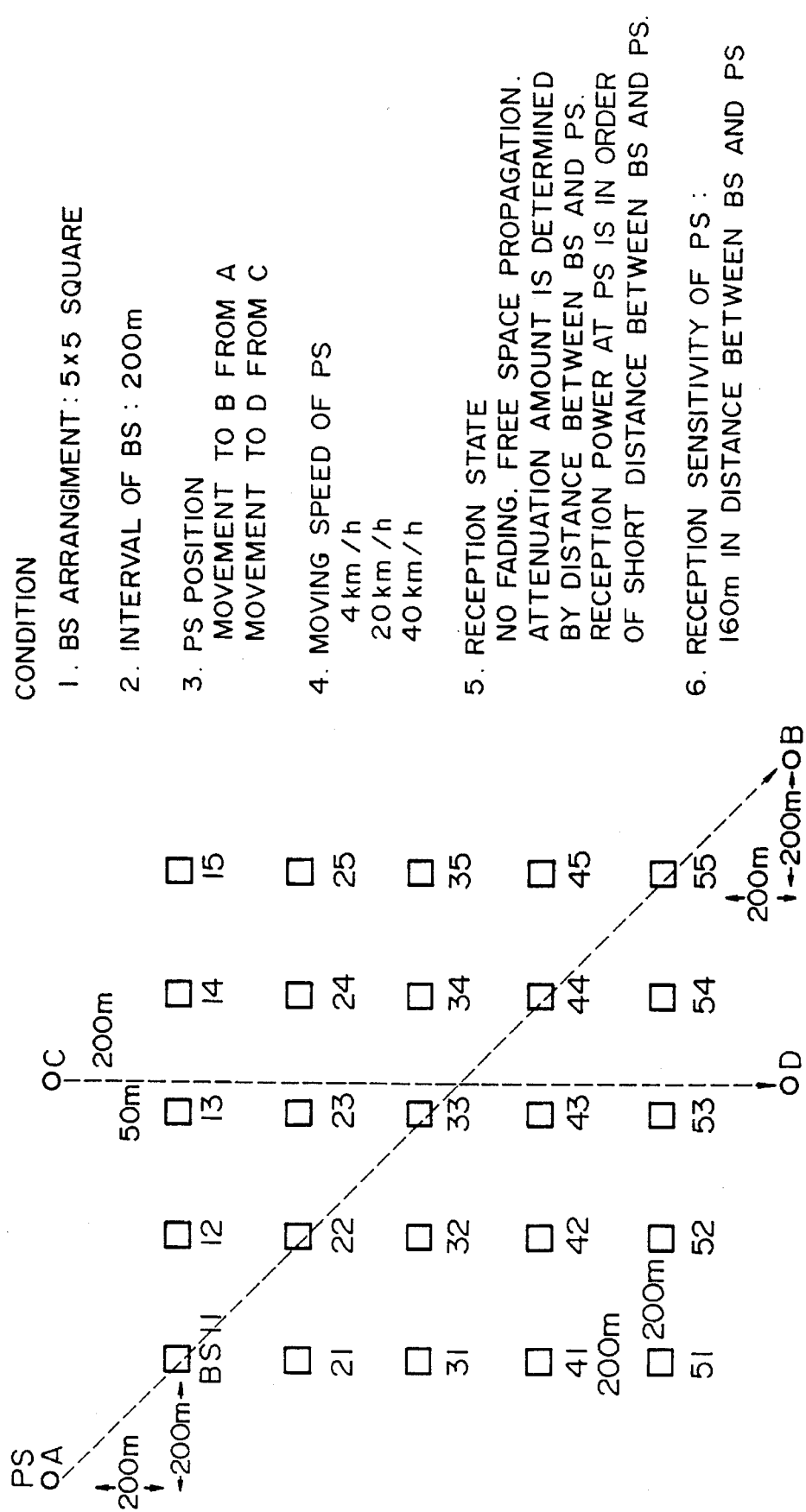
FIG. 12 is a schematic diagram illustrating an example of an arrangement of BS.

The arrangement of BS's as shown in FIG. 12, for example, is assumed by the position registration procedure. If change of the higher-rank BS's by a moving speed and a reception power (distance from BS) of the PS is received at intervals of five seconds as shown in Table 5 and the BS map is repeatedly prepared five times (n=5) in order of the field intensity, the position registration from the PS moving at a speed of 20 km/h or more can be removed from combination of the higher-rank two to three BS's. When the PS moving at a low speed enters the area (or turns on the power supply), the PS is newly registered after 25 seconds.

TABLE 5

Passing Time

| | A → B | | C → D | |
|---|---|---|---|---|
| Moving Speed | Between BS's | Area | Between BS's | Area |
| 40 Km/h | 25.5 sec. | 156.1 sec. | 18 sec. | 118.8 sec. |
| 20 Km/h | 50.9 sec. | 312.2 sec. | 36 sec. | 237.6 sec. |
| 2 Km/h | 254.6 sec. | 1560.8 sec. | 180 sec. | 1188 sec. |

A → B Combination of Higher Rank and Number of Times of Continuity

| | Measurement every 5 sec. | | Measurement every 10 sec. | |
|---|---|---|---|---|
| Moving Speed | Only Highest Rank | 1-st and 2-nd Rank *1 | Only Highest Rank | 1-st and 2-nd Rank |
| 40 Km/h | 5–6 times | 1–2 times | 2–3 times | once |
| 20 Km/h | 10–11 times | 2–3 times | 5–6 times | 1–2 times |
| 4 Km/h | 50 or more | 14 | 25 or more | 7 |

C → D Combination of Higher Rank and Number of Times of Continuity

| | Measurement every 5 sec. | | Measurement every 10 sec. | |
|---|---|---|---|---|
| Moving Speed | Only Highest Rank | 1-st and 2-nd Rank *1 | Only Highest Rank | 1-st and 2-nd Rank |
| 40 Km/h | 3–5 times | 1–2 times | 2 times | once |
| 20 Km/h | 7–9 times | 3–4 times | 3–5 times | 1–2 times |
| 4 Km/h | 35–50 times | ~20 | ~20 | ~10 |

*1 Case where order of 1-st and 2-nd rank is replaced is included. When the order is considered, the number of times of continuity is about ½.

In order to prevent the position registration during stop by a stop signal, an interval for measurement and the number of times for measurement may be increased (for example, the interval×the number of times>2 minutes), while it is desirable that the interval and the number of times for measurement and the number of BS's (m) are set in accordance with a use state of the PS and a circumferential state.

In order to avoid excessive manual registration, the position registration is not made instantaneously in response to the manual registration indication and the interval and the number of times for measurement are made smaller in response to the manual registration indication as compared with the automatic registration so that the manual registration operation is started.

In addition to the automatic position registration system according to the embodiment described above, a system provided with a function of managing position information of PS 1 in the BS 2 and attaining the position registration by polling to the PS 11 from the BS 2 is also considered.

In this manner, the position information of the registered PS 1 is managed by the SCP 7. The SCP 7 converts a routing address (NRA) in the network from PSN to PS corresponding to PSN.

There is a case where a plurality of SCP's are provided due to conditions of the process depending on an arrangement of the network.

In such a case, a system in which the whole position information is managed (duplication) by each of the SCP's and a system for unitarily managing (division) the whole position information by a specific SCP can be adopted.

Table 6 shows management information, position registration, data access, data amount, and necessity of data synchronization of a plurality of SCP's 7 in both of the systems.

TABLE 6

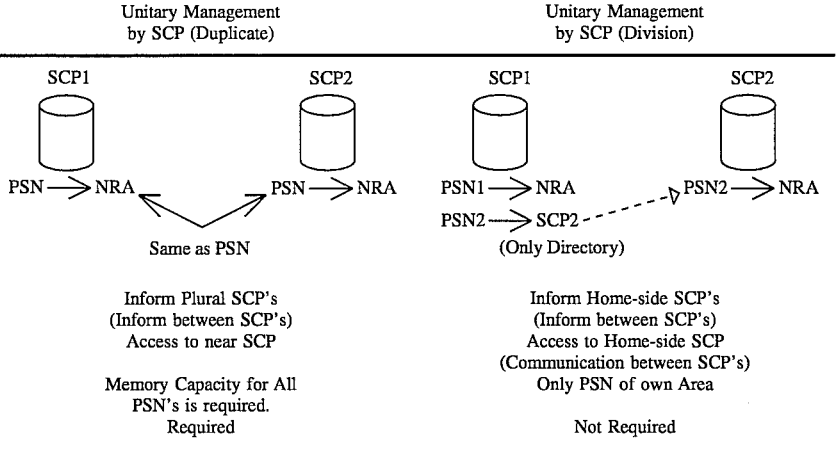

However, the moving speed and the direction of the person carrying the PS 1 is actually complex. For example, the moving speed of the PS in a car is largely varied due to signal and traffic snarls. Further, a propagation state of electric waves is varied due to fading or the like and the intensity of received electric field is varied due to the circumferential state even if the PS is stopped.

The portable telephone system according to the embodiment is required to manage data for outgoing and incoming call to the PS 1 and the authentication of terminal upon the position registration, while as the data management system, three systems of a management system by SCP 7, a management system by home BSC 3 and a management system by BSC 3 in the duplicate manner can be adopted.

TABLE 7

| Management Place | SCP Management | | Home BSC Management | | BSC Management (duplicate) | |
|---|---|---|---|---|---|---|
| | SCP | BSC | Home BSC | BSC | BSC | BSC |
| | PSN⇔WSI Conversion | PS | PSN⇔WSI Conversion | PS | PSN⇔WSI Conversion | PSN⇔WSI Conversion (PS) |
| Authentication Method | Access to SCP from BSC (via Packet/LS-Via Common Line) | | Access to SCP from BSC | | Processable by BSC's | |
| Customer Control (Service Data) | Customer ⟶ SMS ⟶ SCP | | Customer-BSC-Home BSC | | Customer-BSC-Each of BSC's | |
| Data Synchronization | Not Required (Writing to Backup NSP Required) | | Not Required | | Required to be Synchronized to Plural BSC to be Updated | |
| Signal Transfer | Common Line | | Signal Source Between BSC's (Mesh or No. 7) | | Signal Network Between BSC's (Mesh or No. 7) | |

4. Interface between BS 2 and BSC 3

An interface between the BS 2 and the BSC 3 is now described.

As described above, in the embodiment, the ISDN switching system is assumed as the LS 4.

Accordingly, the interface between the LS 4 and the BSC 3 is the I interface which conforms to the ISDN.

In the embodiment, an interface between the BS 2 and the BSC 3 is also the I interface.

4-a. Interface of Speech Data

An interface of speech data is now described.

In the embodiment, from the viewpoint of effective utilization of lines, the speech channel between the PS 1 and the BS is 32 kb/s ADPCM and B channel of 2B+D channels provided by the I interface between the BS 2 and the BSC 3 is divisionally used (32 kb/s ADPCM×2, 16 kb/s ADPCM×2+32 kb/s ADPCM×1, etc.). The speech channels having two lines or more are secured by 2B+D between the BS 2 and the BSC 3. When the service that data having low bit rate is transmitted in the end-to-end manner with the digital representation is provided, the subchannel can be used for such service.

The divisional use of the B channel is now described.

In order to make the divisional use of the B channel, it is necessary to inform the arrangement of sub-channel in the B channel between the BS and the BSC.

An identifier used for this information is now described.

As a system of designating the sub-channel in the B channel in accordance with the expansion system of CCITT recommendation Q.931, as shown in Table 8, there is considered a system (expansion of channel identifier in Table 6) in which an information element for performing indication of the divisional use and indication of identification of the sub-channel is expanded in a channel identifier in a message transmitted and received between the BS 2 and the BSC 3 and the sub-channel is designated and a system (addition of sub-channel identifier in Table 8) in which an information element for identifying the sub-channel is newly defined as a network inherent information element and the information element is incorporated in the message to be used to designate the sub-channel. However, in the channel identifier expansion system, it is necessary to modify existing information element.

TABLE 8

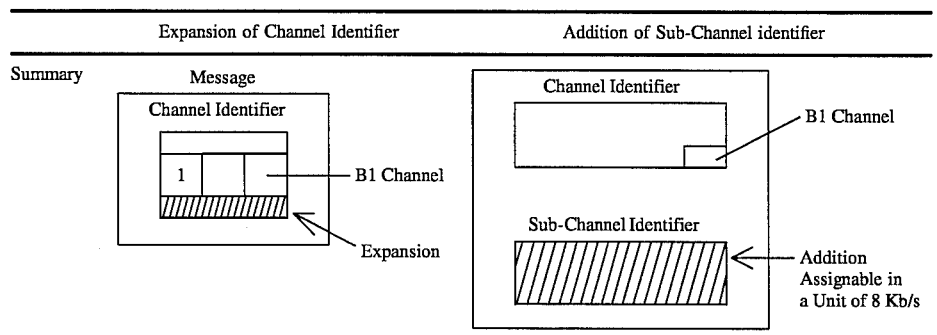

TABLE 8-continued

| Expansion of Channel Identifier | Addition of Sub-Channel identifier |
|---|---|
| Coding<br>• Expansion of Map is Required Upon Use of 23 B + D in BS | Inherent Information Element<br>• Message Length is Slightly longer than Plan 1 |

The designation sequence of the speech channel upon arrival of an incoming call is now described.

As a system of designation sequence of the speech channel upon arrival of an incoming call, as shown in Table 9, there is considered a system in which designation is made on the side of BS 2 and a system in which designation is made on the side of BSC 3. However, in the system in which designation is made on the side of BSC 3, since the channel is designated to set up the incoming call, there is a possibility that unavailable holding of the channel occurs upon simultaneous calling of BS.

sub-channel is converted into 64 kb/s bit by the speed conversion circuit 1401.

Figure 13A:
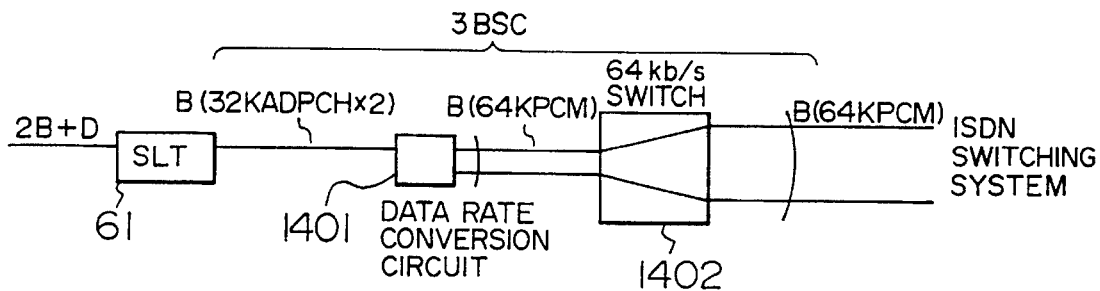
FIGS. 13A to 13C are block diagrams illustrating a configuration of a line correspondence speed conversion function portion of BSC.
Figure 13B:
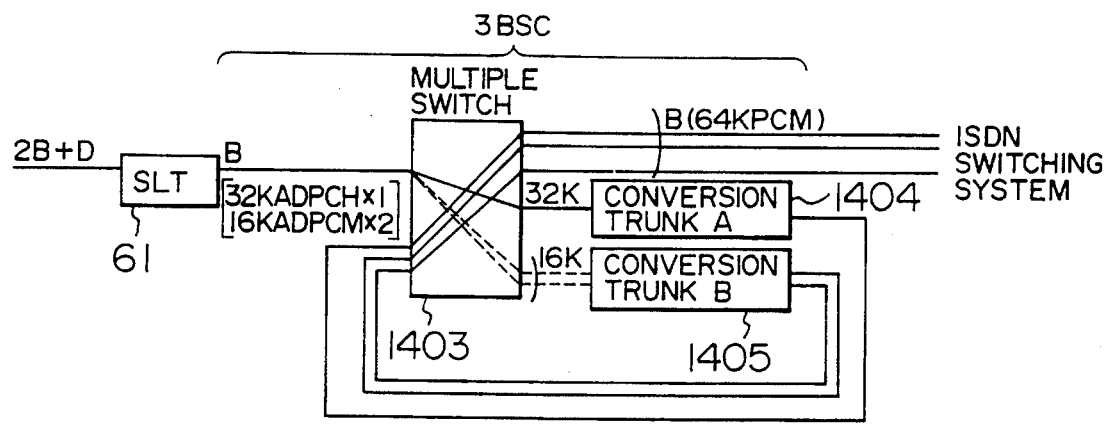

In the configuration shown in FIG. 13B, in the BSC 4, a multiple switch capable of exchange of sub-rate data of 64 kb/s or less (8 kb/s, 16 kb/s, 32 kb/s) is adopted in a digital switch 1403 and trunks 1404 an 1405 having different functions of 32 kADPCM←—→64 kPCM and 16 kADPCM←—→64 kPCM are provided behind the switch. Low-bit rate channels from the BS 2 are classified for each speed by the multiple switch 1403 to be connected to associated trunks 1404 and 1405, so that each bit rate is converted into

TABLE 9

| | Plan 1<br>BS Side Designation | Plan 2<br>BSC Side Designation |
|---|---|---|
| Sequence Upon Incoming Call | BS → BS → BSC<br>SETUP ←<br>SETUP ←←<br>CALLPRO(B1-1) →→  B1-1 busy | BS → BS → BSC<br>SETUP(B1-2) ←  B1-2 busy<br>SETUP(B1-1) ←←  B1-1 busy<br>CALLPROC → |
| Features | • Useful Utilization of B Channel is Possible | • Since Channels are Reserved and held for all BS's upon Simultaneous Calling of BS, Invalid holding of B Channel Occurs until PS Responds and Only 4 Incoming Calls can be established for one BS group simultaneously. |

The speed conversion method of B channel in the BSC 4 is now described.

In the ISDN switching system 4, since switching is made at a speed of 64 kb/s basically, it is necessary that the BSC 4 converts 32 and 16 kbs ADPCM data on the sub-channel into 64 kb/s PCM data to deliver the converted data to the ISDN switching system 4. Further, the opposite operation to this operation is also required.

When the possibility that the PS's 1 and terminals having different data rate are mixed in the same BS is considered, it is desirable that conversion of 64 kPCM and 32 kADPCM and 64 kPCM and 16 kADPCM is dynamically implemented for each call.

Figure 13C:
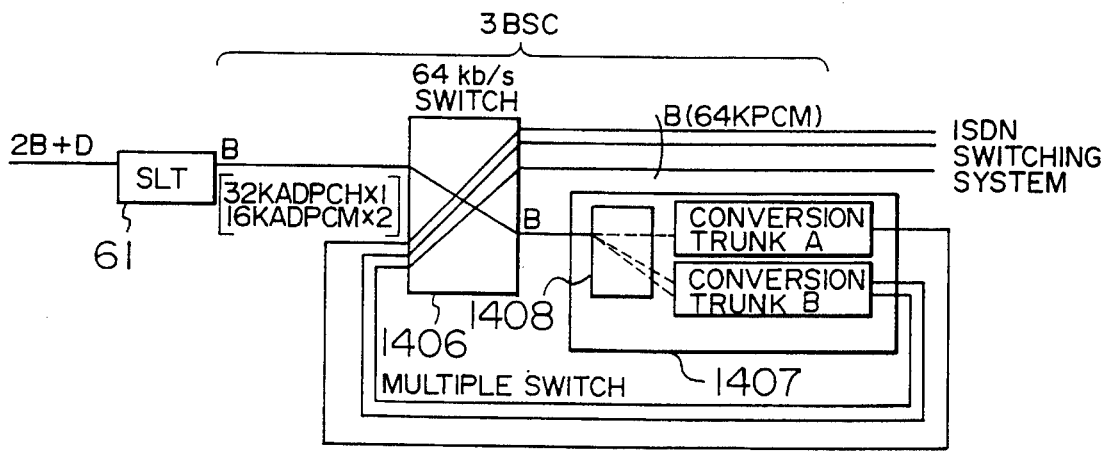

FIGS. 13A to 13C schematically illustrate three examples of line correspondence speed conversion function portion of the BSC 4.

In the configuration shown in FIG. 13A, in the BSC 4, a speed conversion circuit 1401 is provided before a digital switch 1402 of 64 kb/s for each line and data rate of each 64 kb/s and is switched by the multiple switch 1403 again to send to the ISDN switching system.

In the configuration shown in FIG. 13C, a multiple switch 1407 capable of exchange of sub-rate data of 64 kb/s or less (8 kb/s, 16 kb/s, 32 kb/s) and common trunks 1407 including various individual trunks 1409 and 1410 are provided behind a digital switch 1406 of 64 kb/s. The sub-rate exchange and speed conversion are made in the common trunk 1407 and are exchanged in the digital switch 1406 again to send to the ISDN switching system.

In the configuration shown in FIG. 13A, since it is necessary that the speed conversion portion 1401 copes with all speed conversion, the amount of hardware necessary for one line is increased. In the configuration shown in FIG. 13B, the accommodation in the multiple switch is large and a scale or structure is made large. In the configuration shown in FIG. 13C, since the multiple switch 1408 is accommodated on the side of the trunk 14078, the accommodation in the multiple switch is small and flexible process is possible.

Table 10 shows features of each of the configurations.

TABLE 10

|  | a | b | c |
|---|---|---|---|
| Switching Portion | Required for each Line Required to Attain All Switching Increased Amount of Total Hardware | Installation of Switching Portion for each Function Can Install in Accordance with Traffic Can Make Compact by Multiplexing Process Reduced Amount of Total Hardware | Addition of Multi-Switch to b Amount of Total Hardware is Medium or Small |
| Switch | Ordinary 64 Kb/s Switch | Multi-Switch Increased Amount of Hardware Expensive | Ordinary 64 Kb/s Switch |
| Flexibility for Addition of Function | Reduced Flexibility Due to Required Replacement of Switching Portion | High Flexibility by Addition of New Trunk | Same as Left |

4-b. Interface of Control Data (Use D Channel)

In the embodiment, the BS 2 is required to multiplex call processing signals/position registration signal from each of the PS's into the D channel of the I interface and communicate with the BSC 3.

As a system of multiplexing signals from the plurality of PS's into the same D channel, two systems shown in Table 11 are considered.

TABLE 11

|  | Layer 2 Multiplexing | Layer 3 Multiplexing |
|---|---|---|
| Summary | (diagram: PS-A, PS-B connected to BS with TEI 64 A, TEI 65 B) | (diagram: PS-A, PS-B connected to BS with CR L2 3 A, CR L2 4 B; CR: Call Reference) |
| Correspondence to PS Upon Large-Capacity BS (Primary Group: 23B + D) | Correspondence to TEI Not Applied due to Fixed TEI | Correspondence to CR (Calling Number) Applicable |
| Influence Range Upon Failure of Link | Only 1 PS | All PS's |

A layer 2 multiplexing system of Table 11 is a system that identifies the PS terminal by the layer 2 (TEI: terminal identifier) of the I interface. In this system, a correspondence relation between TEI and PS is managed by BS.

However, in the primary group I interface of 23B+D, since TEI is fixed and is equal to 0 (TEI=0), TEI can not be used.

A layer 3 multiplexing system of Table 11 is a system that identifies the PS terminal by the layer 3 (CR: call number). TEI between BS 2 and BS 3 is fixed and signals are multiplexed on the same layer 2 link, and the PS is identified by the call number.

5. Configuration of BS 2 and BSC 3

5-a. Redundant Configuration

In order to avoid malfunction of the system upon occurrence of failure, it is desirable that the configuration for the BS 2 and the BSC 3 is redundant.

However, since the zone of each of the BS 2 is overlapped, influence upon failure is small with respect to the BS 2. Further, since the area is small, the PS can be easily moved to an adjacent area even upon failure and recalling can be made. Accordingly, in the embodiment, redundant configuration is not taken for the BS 2. However, it is desirable that a proper redundant configuration is taken for the BS 2 covering an area requiring the reliability.

On the other hand, with respect to the BSC 3, an area covered by one BSC is broad and the hardware scale is large. Further, since the high-degree processes such as the radio access function 2 and the authentication procedure described above are required, failure tends to occur as compared with the BS 2, and its influence is large.

In the embodiment, the configuration of the BSC 3 is duplicated for reliability.

Figure 14:
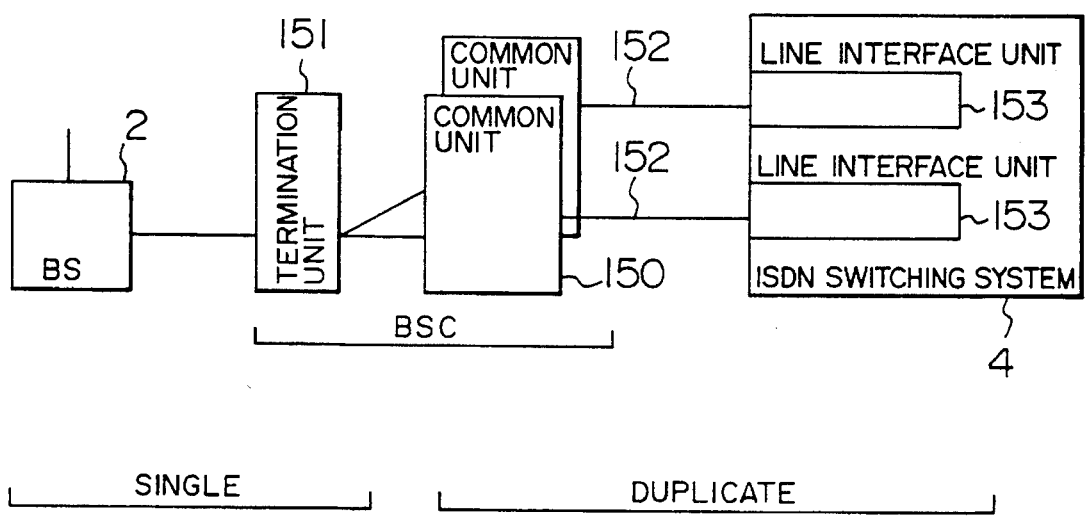
FIG. 14 is a block diagram illustrating a configuration of BSC.

FIG. 14 shows the configuration of the BSC 3.

As shown in FIG. 14, a portion for performing the radio access function 2 and the authentication procedure is duplicated as a common portion 150 except the termination portion with the BS 2. Further, the ISDN switching system connected includes two interfaces 152 and even if one of the two interfaces is cut, services can be continued.

It is desirable that line interface portions 153 connected to the termination of the two interfaces 152 on the side of the ISDN switching system 4 are connected to other unit to improve the reliability.

5-b. Synchronous Configuration between BS-BS

In the portable telephone system according to the embodiment, radio communication between the BS 2 and the PS 1 is made by ping-pong transmission (with period of 5 ms) in which transmission and reception are repeated alternately.

At this time, in order to avoid interference, it is necessary that a synchronization signal is provided between BS-BS and transmission timing of each of the BS's is synchronized with a reception timing thereof.

Two systems shown in Table 12 are considered for a transmission system of a signal for taking synchronization between BS-BS.

TABLE 12

| | BSC Distribution System | Inter-BS Distribution System (wire) |
|---|---|---|
| Configuration | (BSC connected to multiple BS via I) | (BS connected to BS) |
| Transmission Path Facilities | • Since Synchronization Signal is transmitted by I Interface, Special Transmission Path is not Required. | • Transmission Path for Synchronization Signal is Required between BS—BS |
| Redundant Structure | • Single Same Transmission Path as Information Channel. Format for Synchronization Signal is also made identical. | • Duplication Duplication for Master BS is Required. Transmission Path is also Duplicated. |

The BSC distribution system of Table 12 is a system that distributes a synchronization signal to each of the BS's from the BSC through the I interface. The inter-BS distribution system is a system that decides a master BS with respect to synchronization and distributes a synchronization signal from the master BS to other BS's by wire.

It is desirable that synchronization between BS-BS is taken not only between BS's under the same BSC 3 but also between BS's under different BSC 3. In this case, according to the BSC distribution system, synchronization is taken between BS's under different BSC 3 through a network such as LS 5. Further, since it is difficult to provide synchronization signal lines among all BS's even in the inter-BS distribution system, synchronization is taken between BS's under different BSC 3 through a network such as BSC 3.

In the inter-BS distribution system, it is necessary to provide wire for distribution of the synchronization signal to each BS, while in the BSC distribution system, the I interface connecting BSC 3 and BS 2 is used to distribute the synchronization signal. That is, the BSC 3 configures a multi-frame for prescribing CCITT recommendation I.430 on the I interface. The BSC 2 obtains the synchronization signal from the period of the multi-frame.

Figure 15:
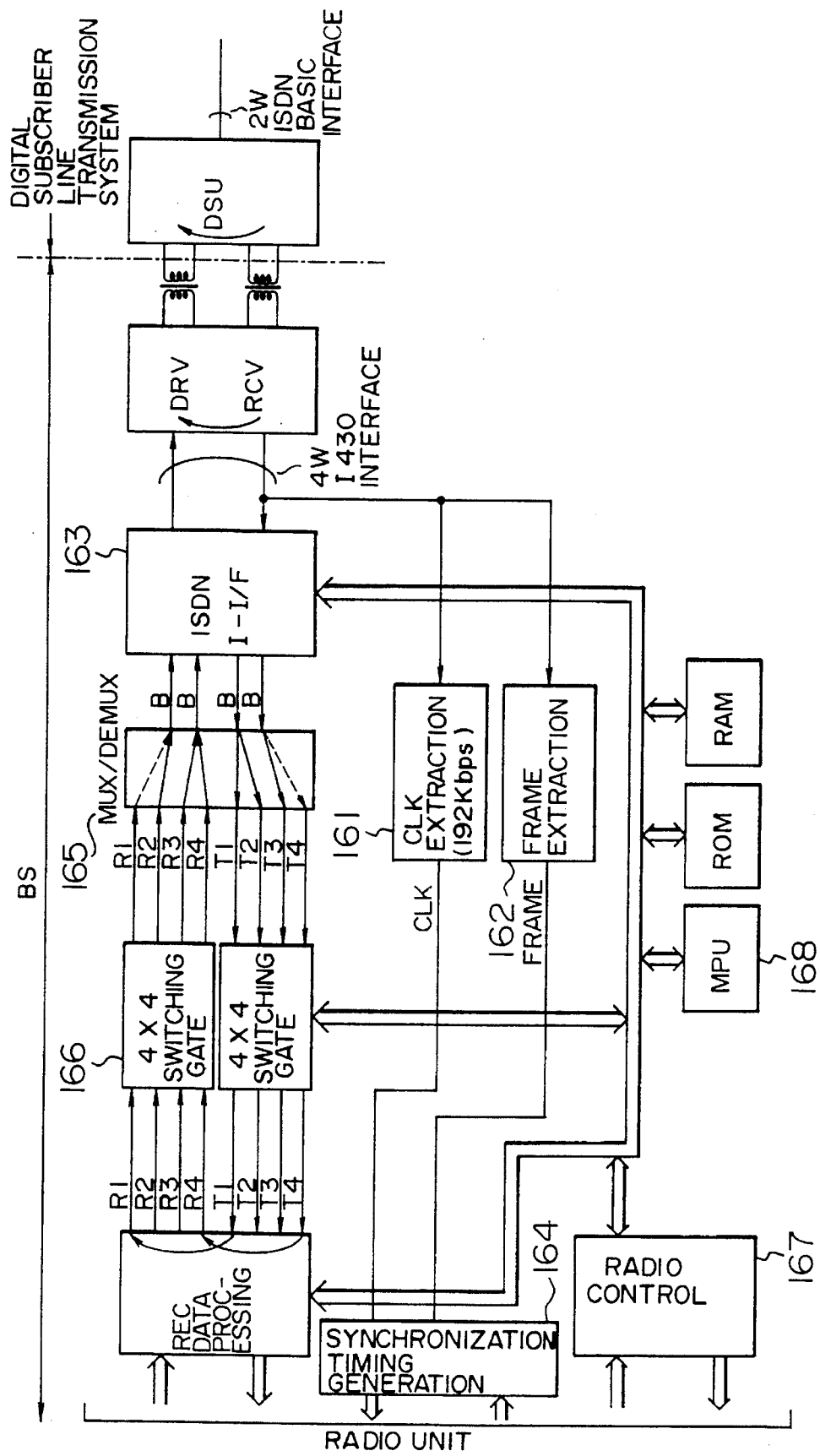
FIG. 15 is a block diagram illustrating a configuration of BS.

A configuration of the BS 2 which synchronizes with the multi-frame from the BSC 3 by the BSC distribution system is shown in FIG. 15.

In FIG. 15, numeral 163 denotes an ISDN I-I/F for implementing the I interface of the BS 2, 165 and 166 MUX/DEMUX and 4×4 switching gate for multiplexing/demultiplexing and arranging of sub-channel on the B channel, respectively, 167 a radio control for controlling a radio portion, 161 a CLK extraction for extracting a clock from the I interface, 162 a frame extraction for extracting multi-frame period from multi-frame on the I interface, and 164 a synchronization timing generation for generating various synchronization signals used in the radio portion from the clock extracted by the CLK extraction 161 and the period extracted by the frame extraction 162. The radio portion performs ping-pong transmission with the PS 1 in synchronism with the period of the multi-frame obtained through the synchronization timing generation 164.

When the BS 3 takes synchronization between BS's under different BSC 3 through the network, the synchronization signal must be transmitted and received between the BS 2 and the BSC 3 even when synchronization between BS's is taken by the inter-BS distribution system.

In this case, the BS decided as the master BS obtains the synchronization signal from the multi-frame from the BSC 3 in the same manner as FIG. 15 and distributes it to other BS 2.

Figure 16:
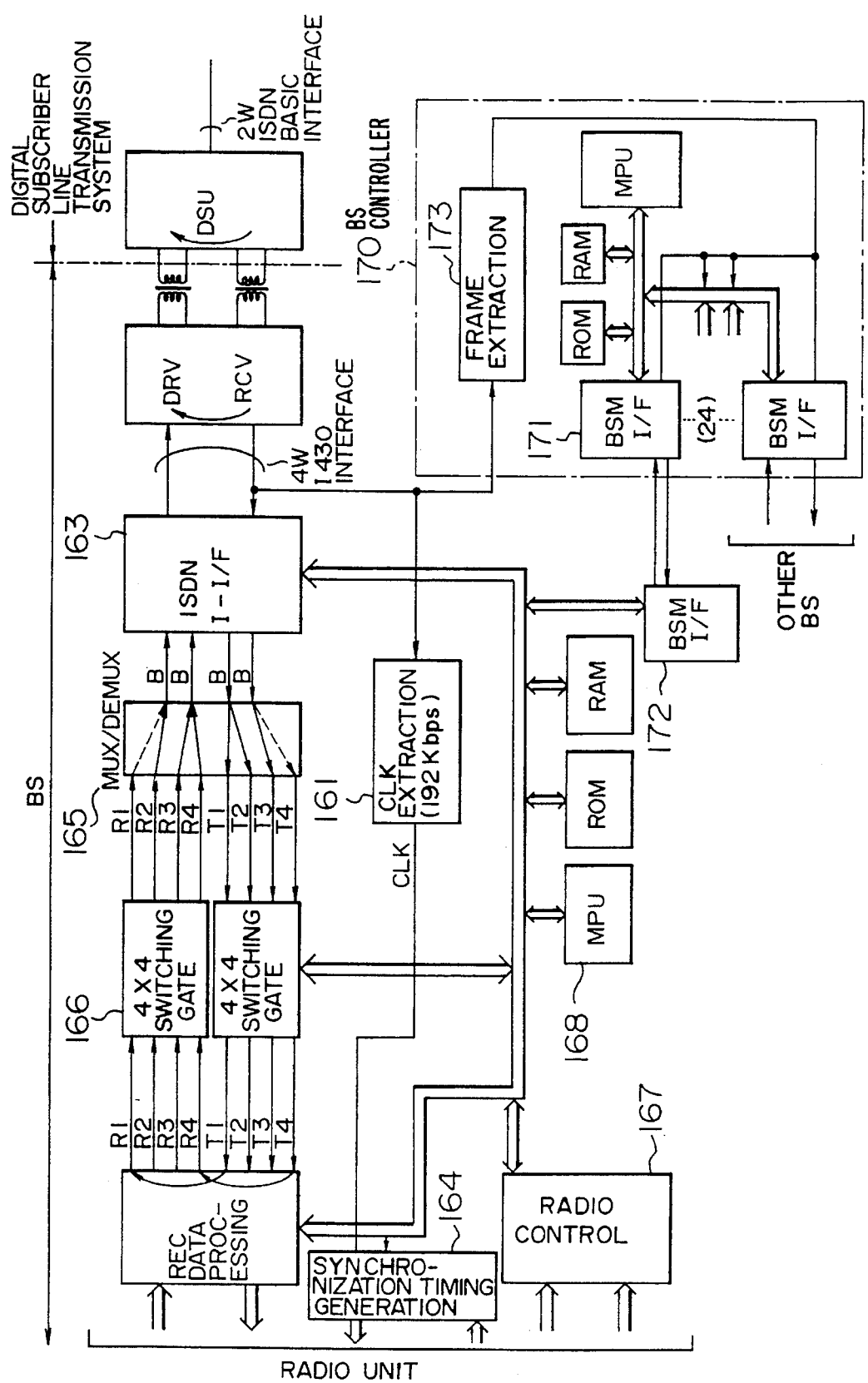
FIG. 16 is a block diagram illustrating a configuration of BSM.

A configuration of BSM in the case where a physical structure of the portable telephone system is in the form shown in FIG. 5b and in the case where the BS 3 takes synchronization between BS's under different BSC 3 through the network is shown in FIG. 16.

As shown in FIG. 16, the BSM includes a BS controller 170 having the function of controlling the BS's 2 in addition to the BS shown in FIG. 15. The BS controller 170 controls the BS's 2 through BSM I/F's 171 and 172. Further, the BS controller includes a frame extraction 173 to extract the multi-frame period, and the extracted period is transmitted to the radio portion in the BSM and transmitted to other BS's through the BSM I/F 171.

6. Protocol

The protocol of the portable telephone system according to the embodiment is now described.

Figure 17:
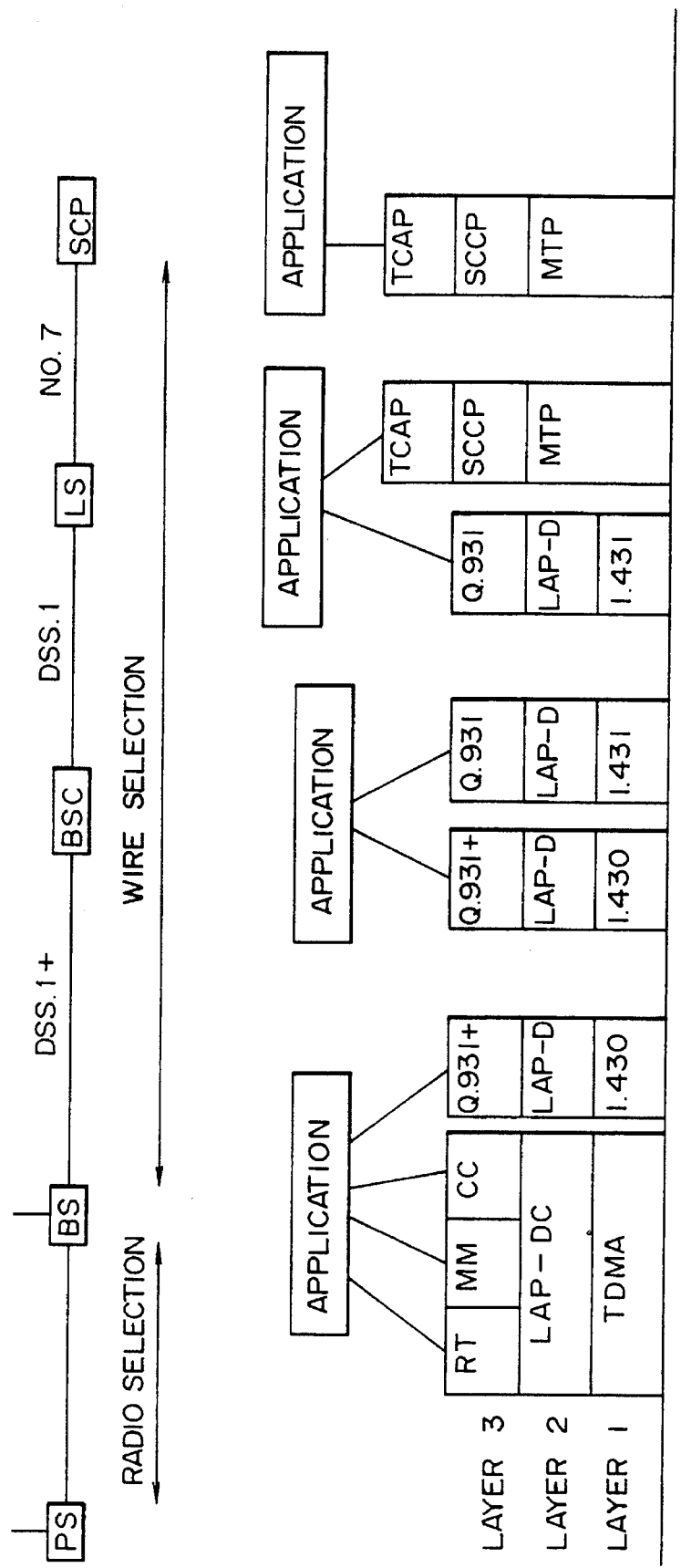
FIG. 17 is a schematic diagram illustrating a protocol conformed by the portable telephone
Figure 18:
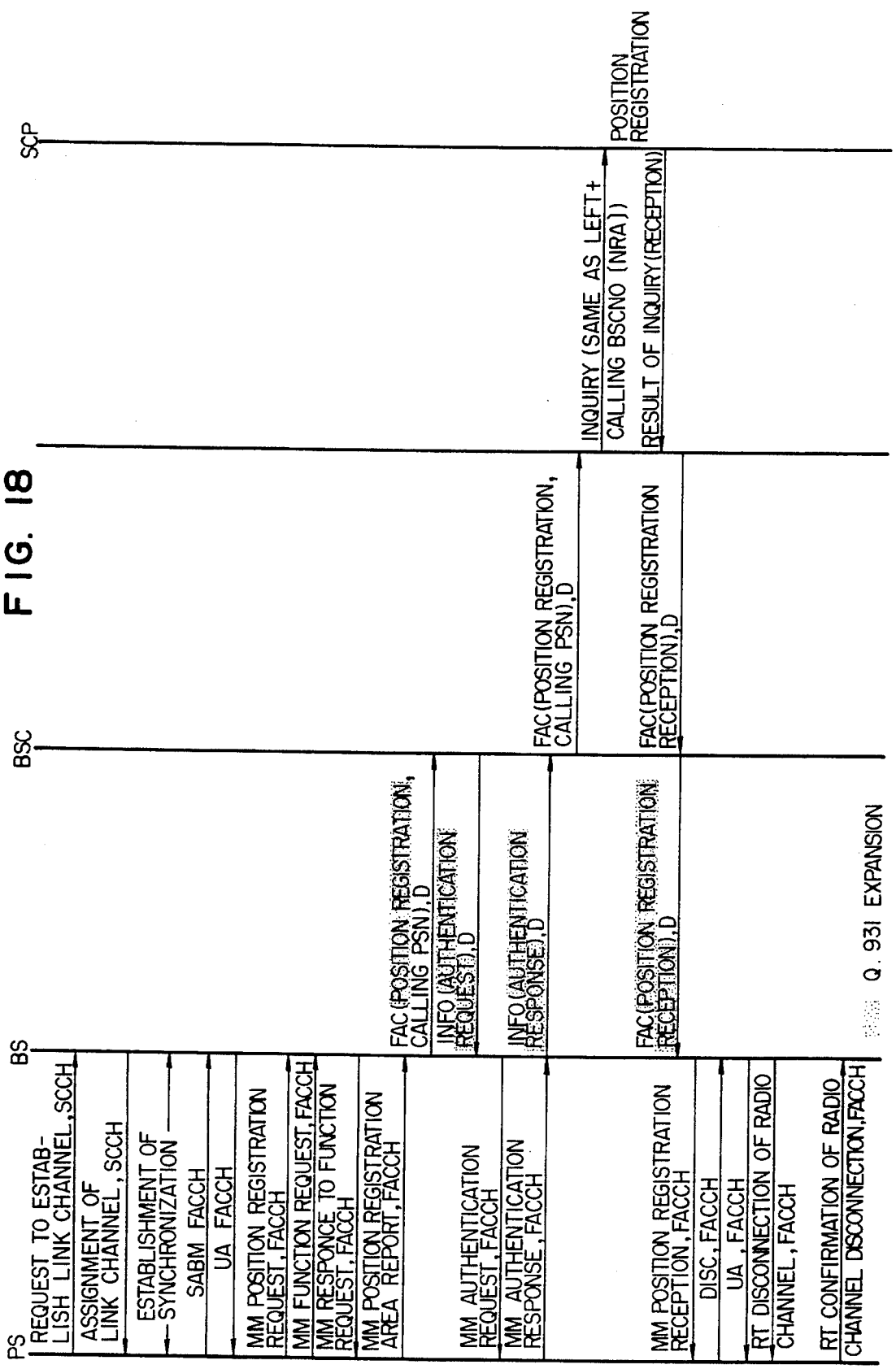
FIG. 18 is a sequence diagram illustrating a position registration sequence of the portable telephone system.
Figure 19:
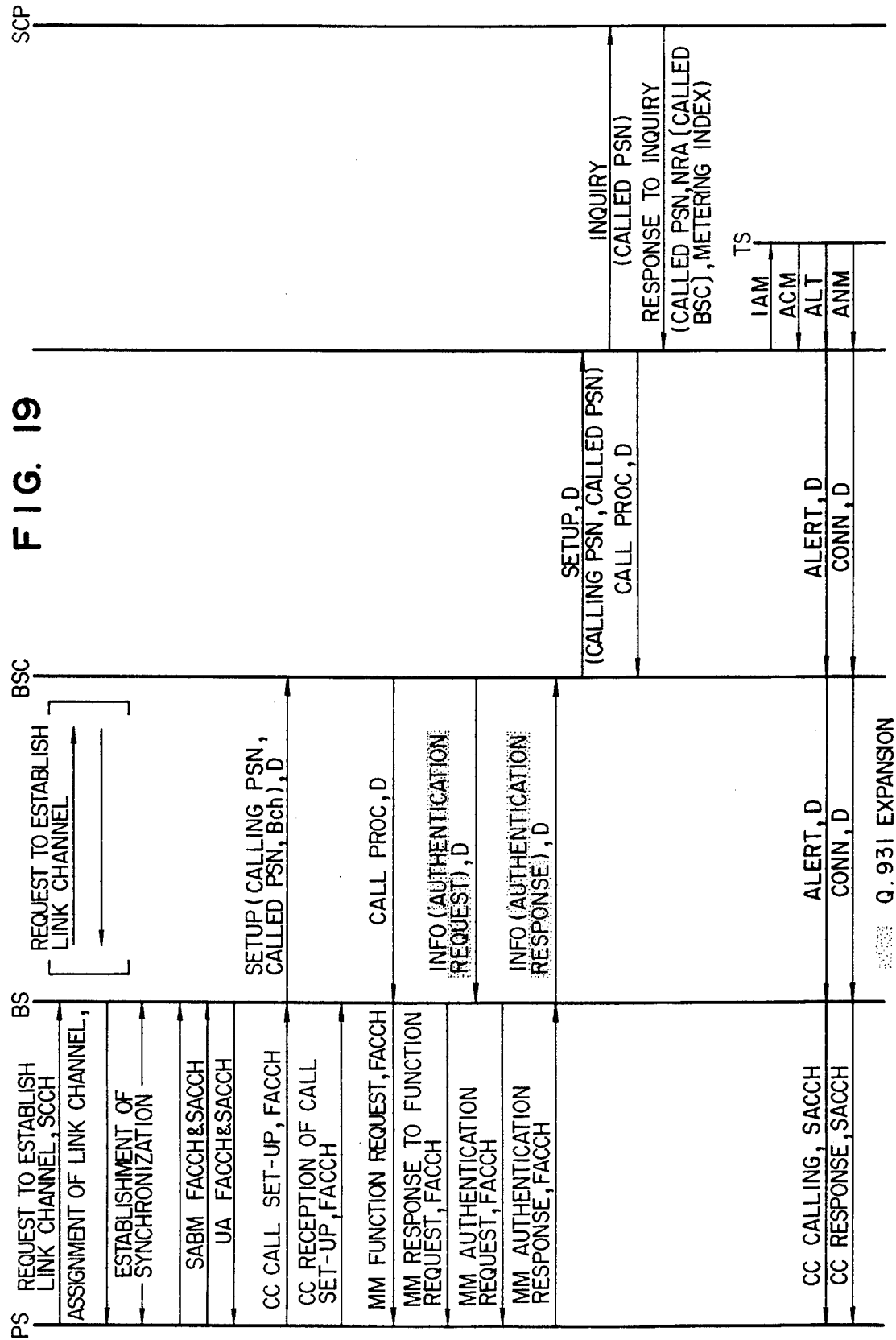
FIG. 19 is a sequence diagram illustrating a call set-up sequence of the portable telephone system.
Figure 20:
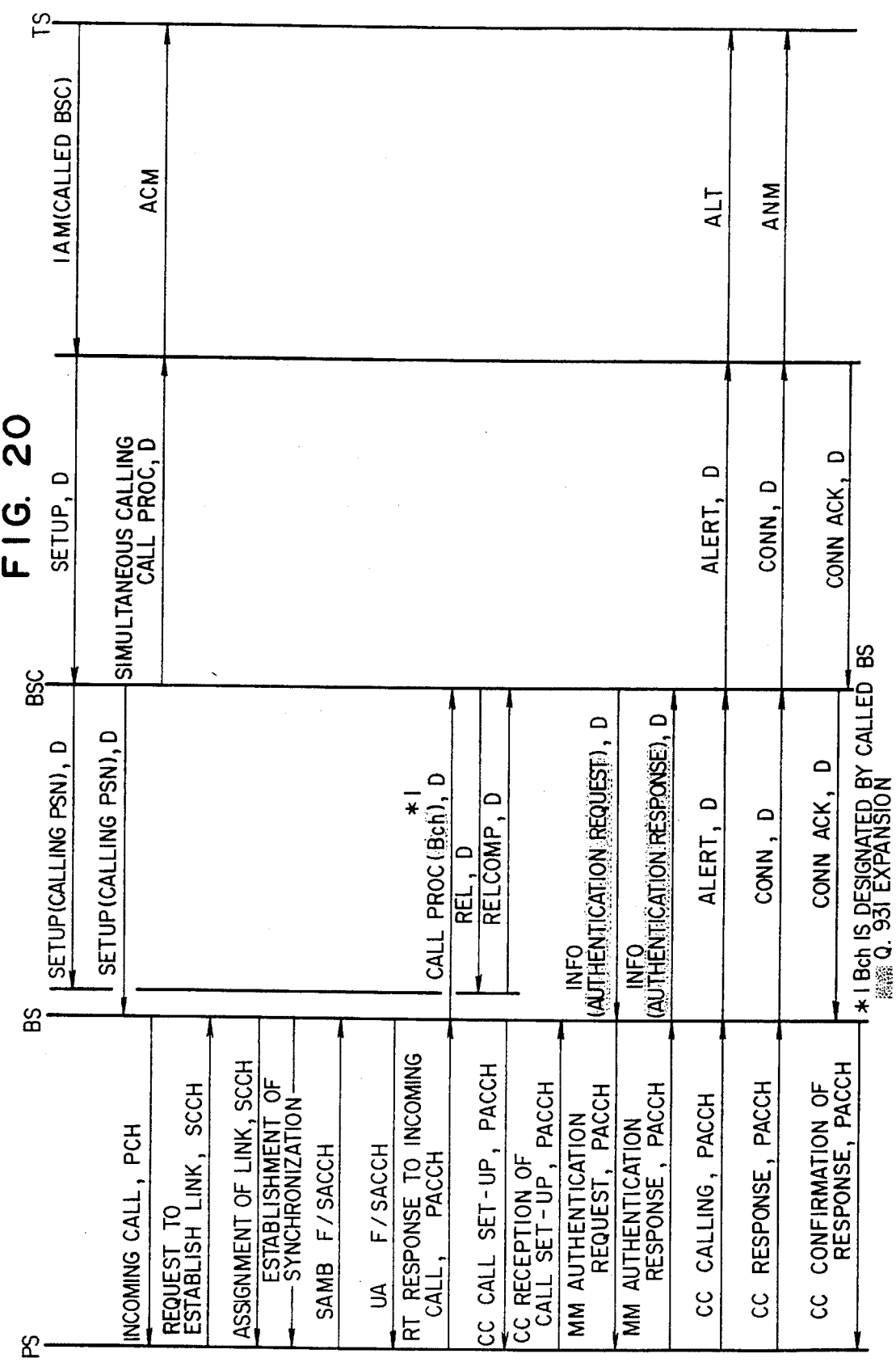
FIG. 20 is a sequence diagram illustrating an incoming call reception sequence of the portable phone system.
Figure 21:
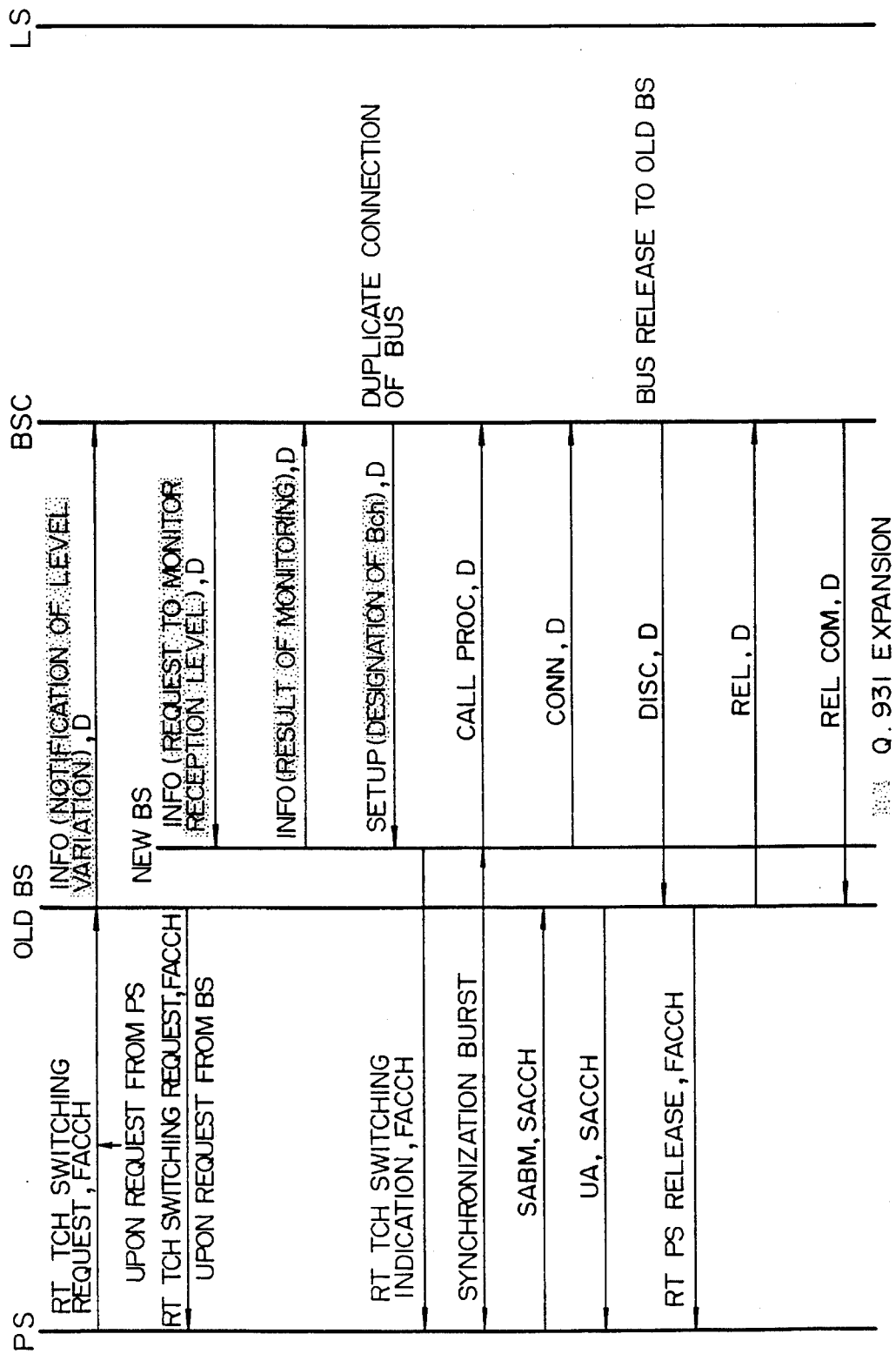
FIG. 21 is a sequence diagram illustrating a channel switching sequence of the portable telephone system.
Figure 22:
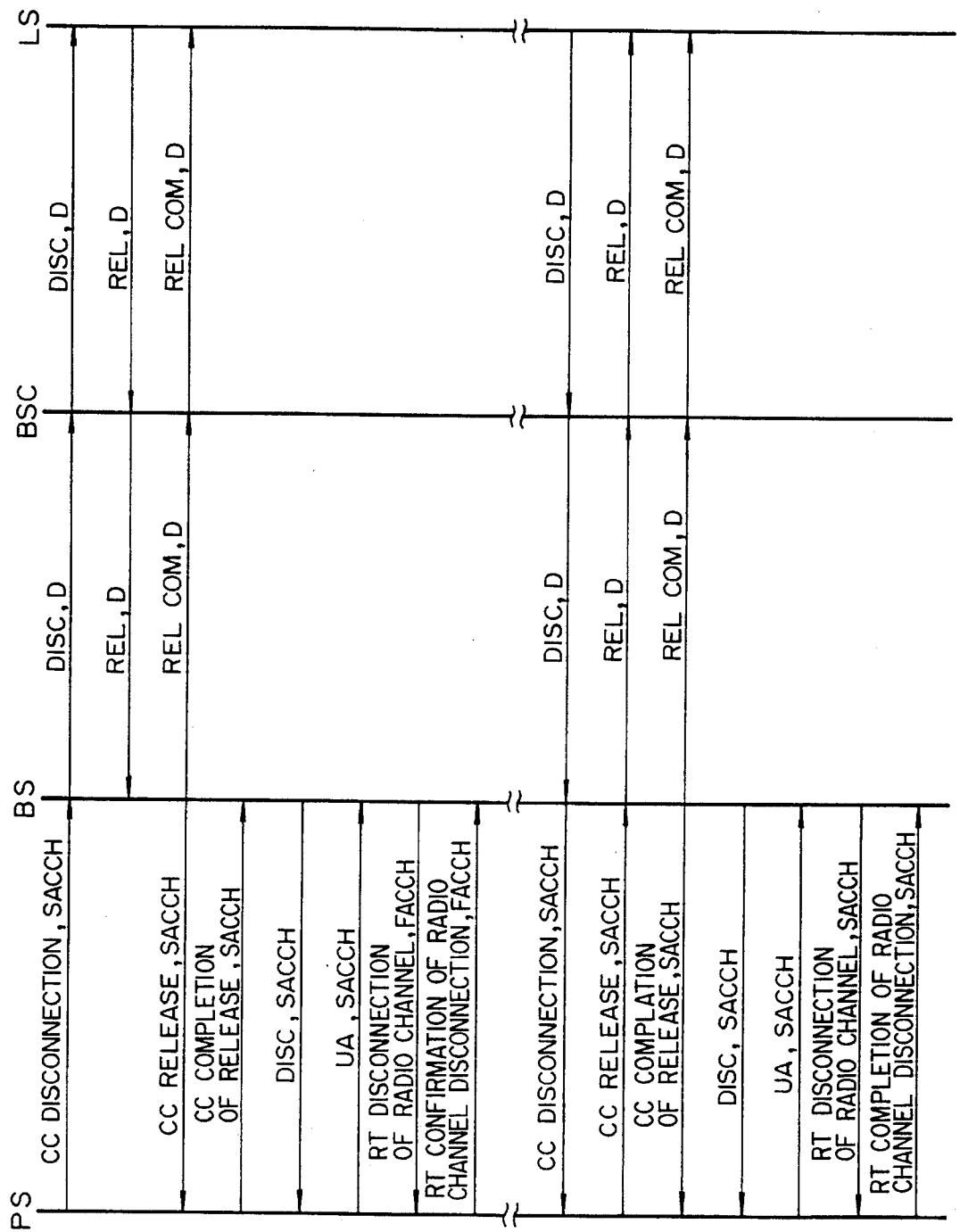
FIG. 22 is a sequence diagram illustrating a termination and disconnection sequence of the portable telephone system.

FIG. 17 shows a protocol conformed between PS1–BS2, BS2–BSC3, BSC3–LS4 and LS4–SCP7.

6-a. Basic Sequence

The position registration sequence, the call set-up sequence, the incoming call reception sequence, the busy channel switching sequence, and the termination and disconnection sequence are schematically illustrated in FIGS. 18, 19, 20, 21 and 22, respectively.

The busy channel switching is made to switch the BS 2 communicating with the PS 1 when the PS 1 is moved in the busy state, or the like.

6-b. Sequence for Special Service (1) Police and Fire Calling

The portable telephone system according to the embodiment has the following functions for calling the police and the fire station from the PS 1.

① Notification of Calling ID

The BS number and PSN are also informed in addition to the ID added to the BSC upon calling the police and the fire station. An information element for setting the BS number is added to a message between BSC-LS. The notification sequence of the calling ID is shown later.

② Recalling Function

When an incoming call is received by the police or fire station, it is necessary to maintain a channel between the calling party and the police or the fire station so that the calling party can be recalled from by the police or the fire station even if the calling party disconnects the line.

Accordingly, in the embodiment, the BS 2 has a function of holding a radio channel and a function of calling-back to the PS 1.

Figure 23:
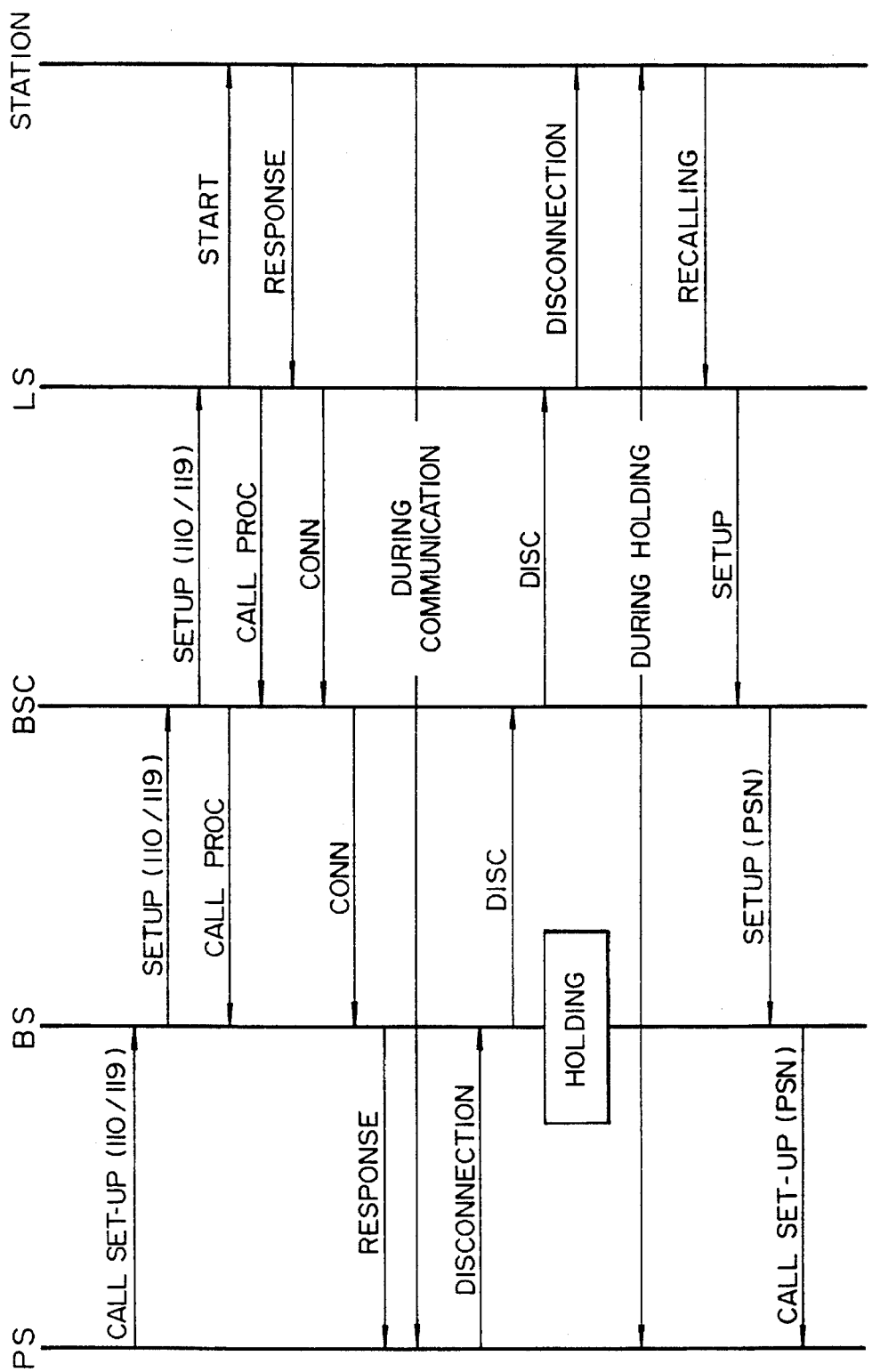
FIG. 23 is a sequence diagram illustrating a police and fire calling sequence of the portable telephone system.

FIG. 23 schematically illustrates a sequence of the police and fire calling for attaining a recall holding function.

As shown in FIG. 23, the opportunity of starting a hold is a disconnection from the PS 1 terminal after conversation with the police or the fire station. Although not shown, releasing the hold requires expiration of time timed by a holding timer and disconnection of the call to the police or fire station.

③ Display of Emergency

In the embodiment, an indication is made by an emergency display lamp or the like upon set-up of the police or fire calling to eliminate malicious or crank calls for the police and improvement of security (BS can be specified easily when a maintenance person has arrived at a field).

(2) Notification of Calling ID

Notification of the calling ID used even in processing of the police and fire calling is now described.

Such a notification of the calling ID is required to make display of a calling party to the called party upon personal communication in addition to the police and fire calling.

In the embodiment, a calling PSN is notified when both the calling and called parties are PS, a calling PSN is notified when a calling party is PS and a called party is a fixed wire terminal, and a DN of the fixed wire terminal is notified when a calling party is the fixed wire terminal and a called party is PS.

Figure 24:
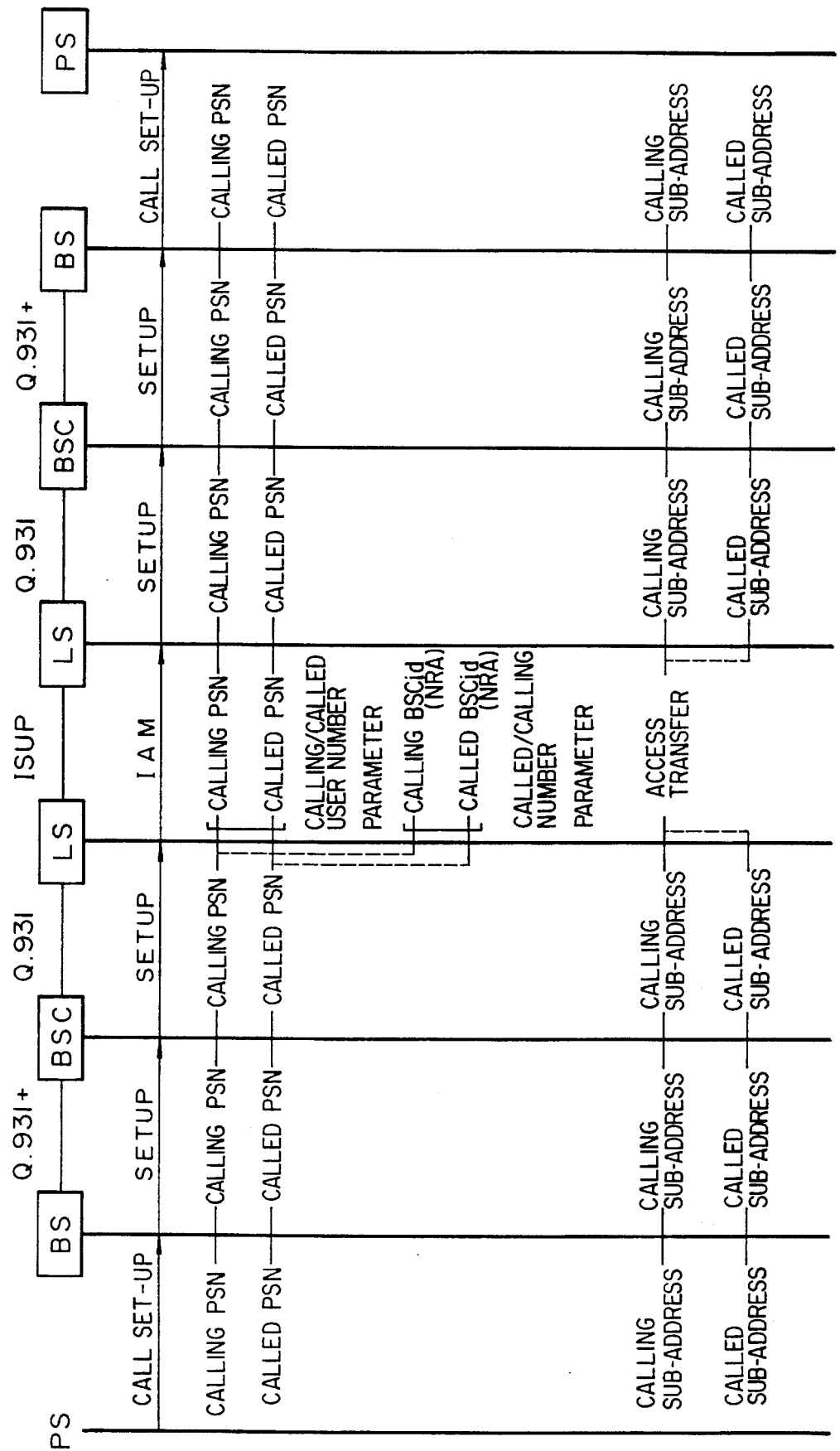
FIG. 24 is a sequence diagram illustrating a notification sequence of calling ID of the portable telephone system.

A notification sequence of the calling ID is schematically illustrated in FIG. 24.

As shown in FIG. 24, in order to display the PSN in a called terminal, there is provided a function of transferring the PSN in an end-to-end manner. Further, in order to transfer the calling ID and the called ID in the network, there is provided a function of transferring two kinds of numbers.

7. Data Communication Function

The portable telephone system has the primary object that a telephone conversation in the voice communication between the PS's is realized through the public switching network, while in the embodiment data terminals can be connected to the PS 1, so that data communication is realized through the PS 1.

Figure 25:
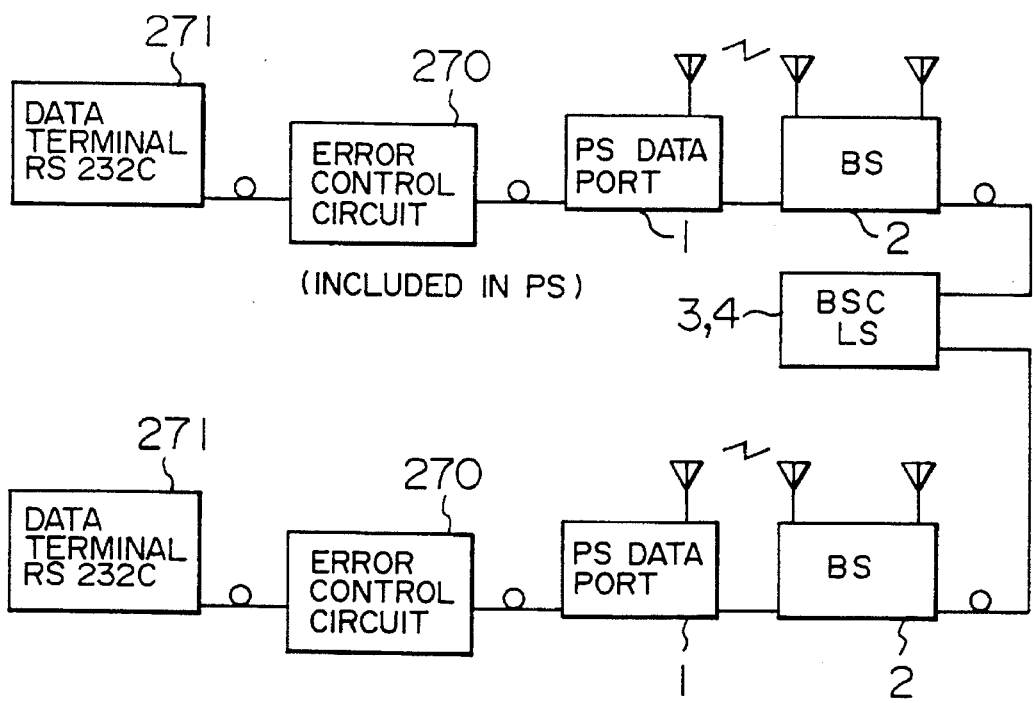
FIG. 25 is a block diagram schematically illustrating a connection form of PS and data terminal.

A connecting arrangement between the PS 1 and the data terminals is shown in FIG. 25.

In FIG. 25, numeral 270 denotes an error control circuit connected between the PS 1 and the data terminal. The error control circuit 270 may be included in the PS 1.

Examples of media communication which can be made as data communication through the PS 1 are described.

① Data Communication between Personal Computers, Word Processors and Electronic Notes The PS 1 performs digital transmission of 32 kbps per channel. Thus, when data communication is made between personal computers, word processors and electronic notes, that is, note type computers, RS232C (10.2 kbps) is used as the interface between the error control circuit 270 and the data terminal 271.

Line quality of bit error rate >10## is sufficient in the voice communication, while since better transmission error rate is required in the data transmission, redundant portion of RS232C is assigned to error control to improve the transmission error rate in a transmission error circuit.

② Communication with ISDN Terminal (G4 Facsimile, Video Telephone)

Since a transmission rate of the ISDN terminal such as a G4 facsimile, a video telephone and the like is usually 1B=64 kbps, the PS 1 performs data transmission by 64 kbps corresponding to two sets of 32 kbps channels upon data communication. The BS 2 transmits data of 64 kbps through the same B channel to the BSC 4. The BSC 4 switches this data to the LS 4.

However, when transmission error is due to slight deterioration of dot information in an image transmission, the transmission error is permissible, while it is not permissible if it is a control signal or the like. Thus, when communication with the ISDN terminal of 64 kbps is made, error correction is made by retransmission.

When instantaneous transmission is required as in a video telephone, the PS 1 may make data transmission by three or four 32-kbps channels for voice communication in consideration of redundancy by error control.

③ Communication with Radio LAN Terminal

Various radio LAN's have been proposed at the present time. It is anticipated that the transmission rate of the radio LAN terminal is greatly different from that of the PS 1. Thus, when communicating with the radio LAN terminal, a conversence function of the transmission rate is provided in the radio LAN or the network.

8. Maintenance and Operation

Maintenance and Operation of the portable telephone system according to the embodiment are now described.

In the portable telephone system according to the embodiment, five management works of fault management, performance management, configuration management, account management and security management are made for maintenance and operation of the system.

In the embodiment, the maintenance and operation system supports these works.

8-a. Arrangement of Maintenance and Operation

Arrangement of the maintenance and operation system of the portable telephone system according to the embodiment is now described.

Figure 26:
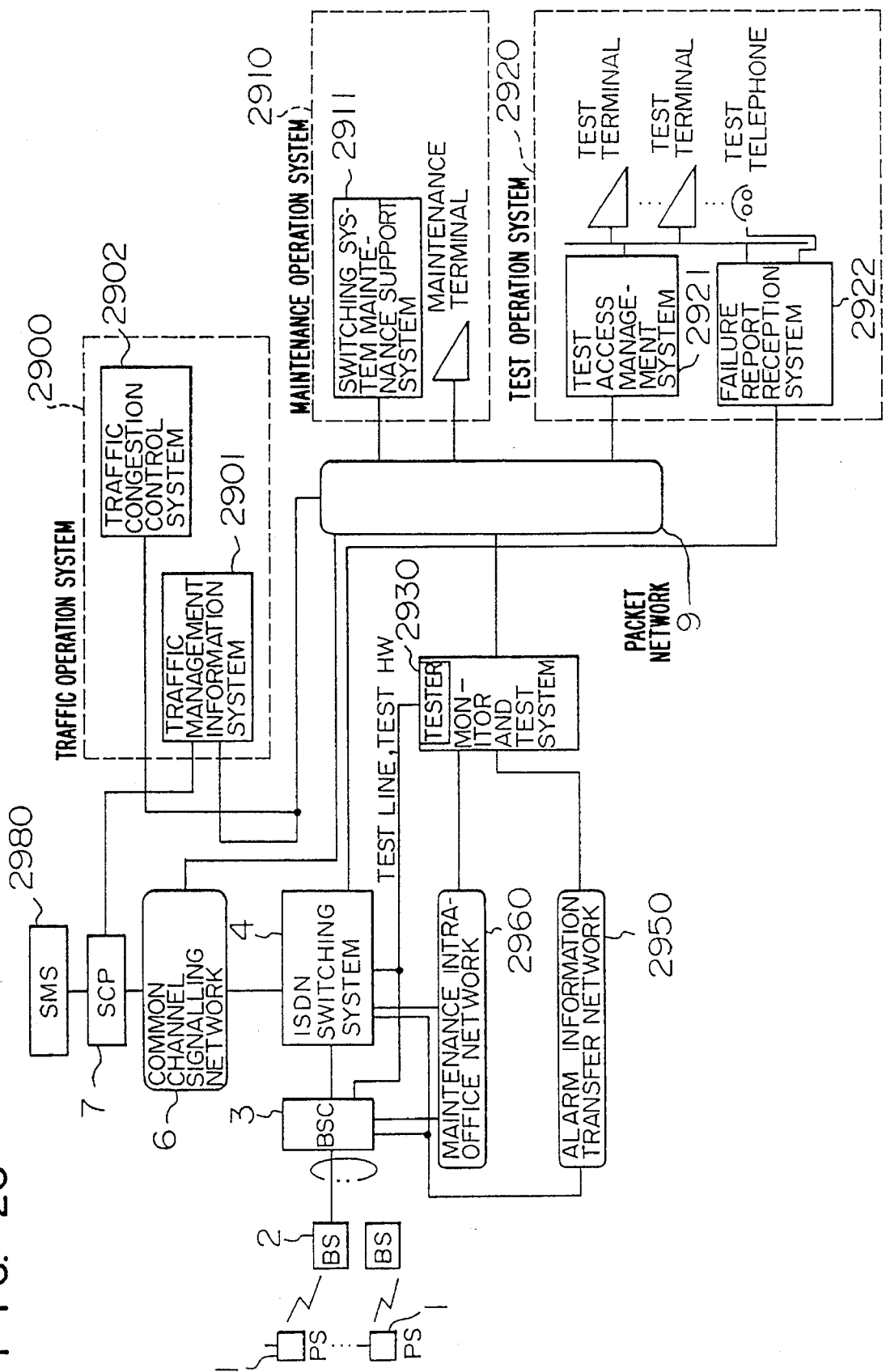
FIG. 26 is a block diagram illustrating a configuration of a maintenance operation system of the portable telephone system.

FIG. 26 is a schematic diagram illustrating the maintenance and operation system of the portable telephone system according to the embodiment.

Figure 27:
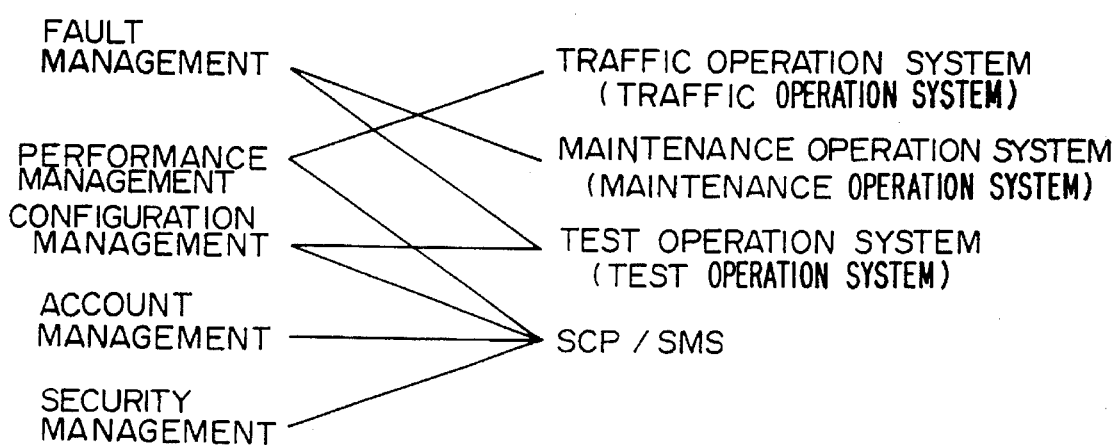
FIG. 27 is a schematic diagram illustrating correspondence of operation systems and management works.

As shown in FIG. 26, in the embodiment, there are provided a traffic operation system, a maintenance operation system and a test operation system in order to support the management works. Each of the operation systems performs the management works in correspondence relation shown in FIG. 27. Further, as shown in FIG. 27, the SCP 7 and the SMS also perform part of these management works.

In FIG. 26, numeral 2900 denotes the traffic operation system which includes a traffic congestion control system 2902 and a traffic management information system 2901.

Numeral 2910 denotes a maintenance operation system which includes a switching system maintenance support system 2911. Numeral 2920 denotes a test operation system which includes a test access management system 2921 and a failure report reception system 2922.

Numeral 9 denotes a packet network connecting these operating systems with a monitor and test system 2930 and a common channel signalling network 6. The monitor and test system 2930 is connected through a maintenance intraoffice network 2960 and an alarm information transfer network 2950 to the ISDN switching system 4 and the BSC 3.

Figure 28A:
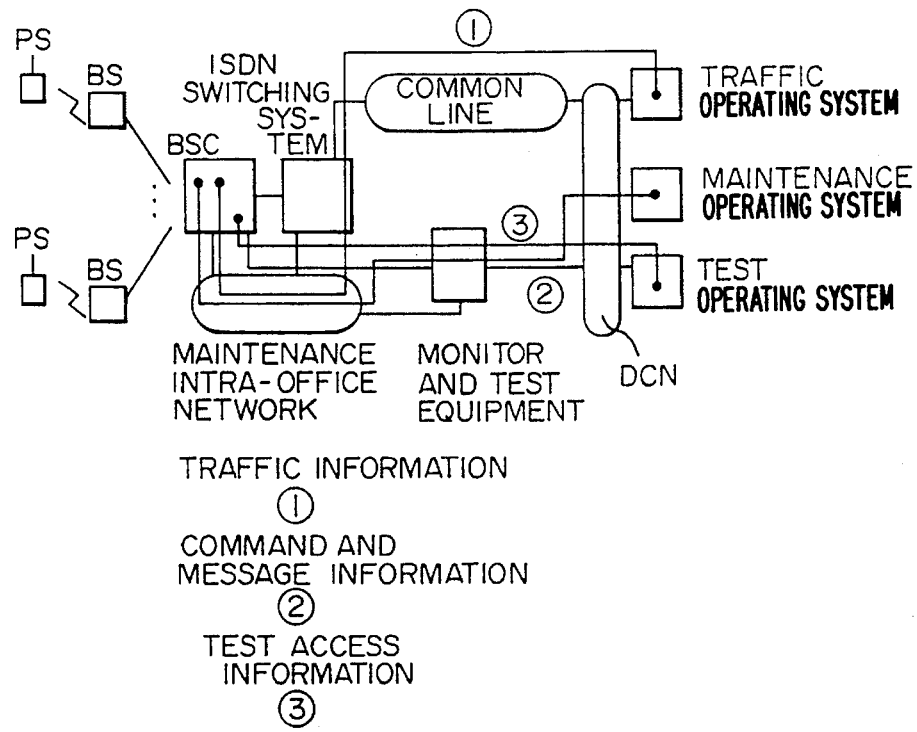
FIGS. 28A and 28B are schematic diagrams illustrating transfer systems of maintenance and operation data.
Figure 28B:
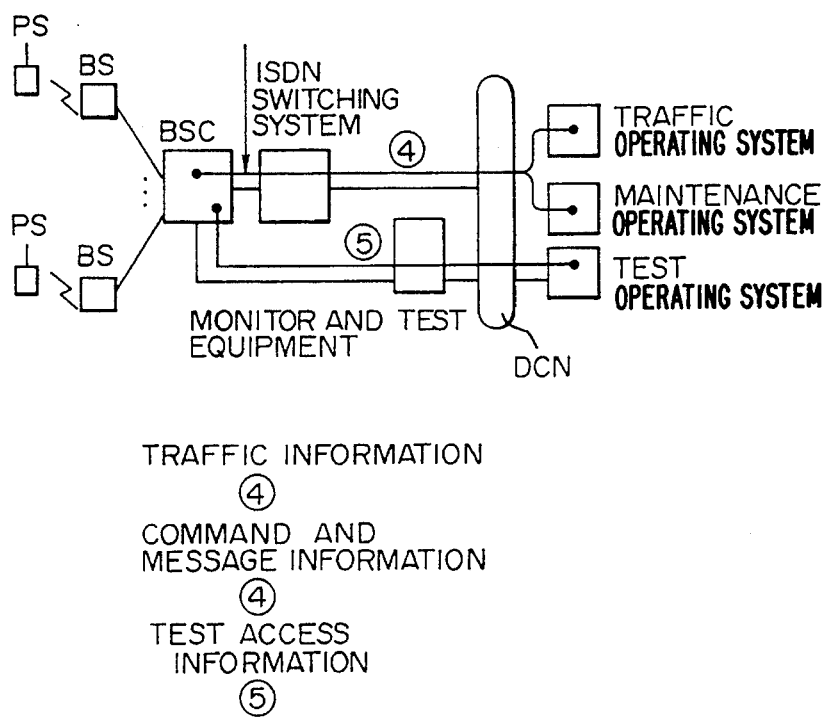

Information required to be transferred within the maintenance and operation system as maintenance information includes traffic information, command message information, test access information and the like. In the arrangement shown in FIG. 26, two systems shown in FIGS. 28A and 28B are considered as system of transferring various information. A system shown in FIG. 28B uses packet function of the ISDN switching system and makes access of interface information between the BSC directly through the packet network.

In the embodiment, for convenience of description, description is made on condition that the system of FIG. 28B is adopted. In FIGS. 28A and 28B, DCN represents a data communication network.

8-*b*. Fault Management Work

The function of the maintenance operation system supporting the fault management work is now described.

In order to support the fault management work, the embodiment provides the serveillance function and the test and diagnosis function.

8-*b*-1. Serveillance Function

The serveillance function is now described.

The function is to support a maintenance person to be able to determine the failure state of the communication facilities and further determine rapid and exact measures for the failure.

As failure portions of the portable telephone system according to the embodiment, there are considered failure of PS, failure between PS and BS, failure of BS, failure between BS and BSC, failure of BSC, failure between BSC and ISDN switching system, failure of the ISDN switching system and the like. Thus, in the embodiment, failure detection is made by the BS 2, the BSC 3 and the ISDN switching system 4. When a failure is detected in the ISDN switching system 4, failure detection between the BSC and the ISDN switching system is performed.

Figure 29:
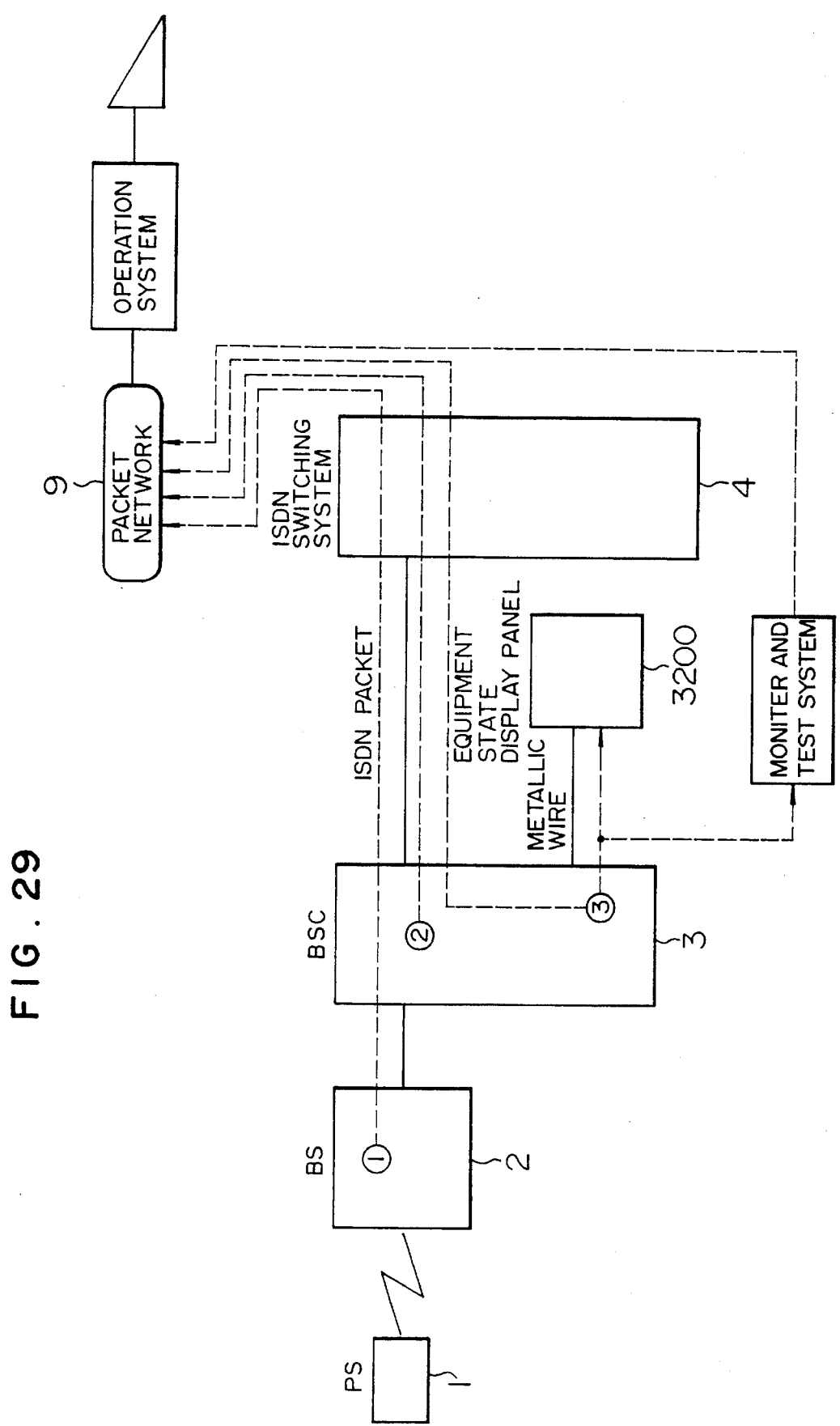
FIG. 29 is a schematic diagram illustrating transfer paths of failure information detected by BS and BSC.

FIG. 29 schematically illustrates a transfer path of failure information detected by the BS 2 and the BSC 3.

As shown in FIG. 29, failures detected in the BS 2 and the BSC 3 are collected to the BSC 3 and are then informed to a predetermined operation system.

In the embodiment, failure watch items utilized to detect failure are described.

(1) Failure Serveillance Items in BS

The failure serveillance items in the BS are described in Table 13.

TABLE 13

| Item Number | Item | Emergency Degree | Occurrence Factor | Notification Time |
|---|---|---|---|---|
| 1 | AC Power Failure | High | AC Power Failure Of BS | After Predetermined Time of BS |
|   | Function Block Failure |   |   |   |
| 2 | Radio Portion Synchronization Portion Signal Processing Portion Control Portion I Interface | High | Function Failure of BS  Detect as Layer 2 Protocol Error in BSC | More than Predetermined Times |
| 3 | Error of Communication Protocol between PS-BS | Medium | Function Error of PS or BS | More than Predetermined Times |
| 4 | Error Rate | Low | Noise Superposed on Radio | Predetermined Rate or More |

| Item Number | Notification Means to BSC | Failure Process | Reaction of Maintenance Man | Confirmation of Restoration |
|---|---|---|---|---|
| 1 | BSC Notification by ISDN Packet Signal | Notification of Failure | Examine BS Power Supply | Confirmation of Restored Message |
| 2 | Same as Above | Notification of Failure and Stop of Calling Process | Replace BS | Confirm that Failure Message is not produced |
| 3 | BSC Notification by ISDN Packet Signal | Notification of Failure | Search for Failure | Confirm that Failure Message |

TABLE 13-continued

| | | | | is not produced |
|---|---|---|---|---|
| 4 | Same as Above | Notification of Failure | Search for Failure | Confirm that Failure Message is not produced |

In Table 13, with respect to the protocol error between the PS and the BS and the error rate in items 3 and 4, since a path between the PS and the BS is a radio transmission path and the PS is moved, it is anticipated that there are many cases where states in failure of communication service cannot be reproduced. It is necessary to inform a center of stored failure information periodically with regard to the failure serveillance items in which failure information such as the protocol error and the error rate is usually issued after a predetermined number of failures have occurred in view of a memory capacity in BS and preventive maintenance of BS.

that a so-called frame relay interface is utilized to transfer without heavy load to the processor system of the BSC.

(2) Failure Serveillance Items in BSC

In the BSC, the quality of a transmission path and the communication procedure are watched or monitored with respect to the communication between the BS and the BSC.

Table 14 shows failure watch items in the BSC.

TABLE 14

| | Item | Emergency Degree | Occurrence Factor | Notification Time | Failure Process | Reaction Maintenance Man | Confirmation of Restoration |
|---|---|---|---|---|---|---|---|
| 1 | Error of Communication Protocol between BS-BS | High | Failure of LAP-D of BS or BSC | Time-Out of T203 | Notification of Failure | Separation of Return of BS | Message of Establishing Layer 2 |
| 2 | Out of Synchronization of OCU for BS Function Block Failure | Low | Noise Super-posed on Transmission Path Dis-connection of Trans-mission Medium | Predetermined Time or more | Notification of Failure | Search for Failure | Confirmation of Restoration Message |
| 3 | Synchronization Portion Signal Proces-sing Portion Control Portion I Interface | High | Function Failure of BSC | Predetermined Time or more (Detect as Protocol Error of Layer 2 in ISDN Switching System) | Notification of Failure | Replacement or PKG | Confirmation of Restoration Message |
| 4 | System Down | High | Power Failure | | Indication to Display Panel and Notification of Failure | Search for Failure | Confirmation of Normal Operation Message |

Thus, the embodiment provides the logging function of recording failure information upon occurrence of failure. The log data includes an identifier of BS, time upon occurrence of failure and failure contents.

Figure 30:
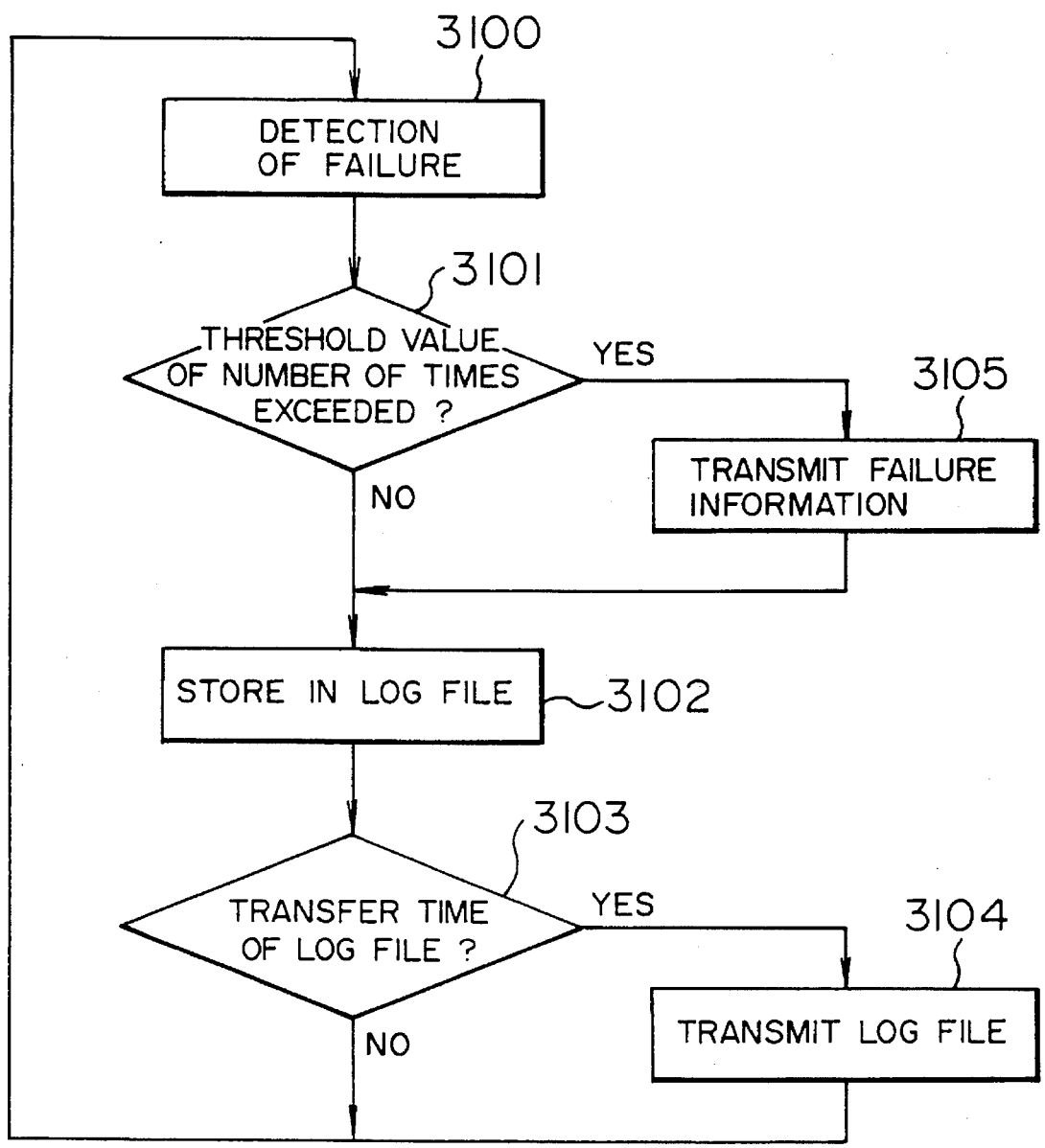
FIG. 30 is a flowchart illustrating a process performed by BS upon detection of failure.

In the embodiment, in accordance with a processing flow upon detection of failure in BS shown in FIG. 30, when the number of failure detections exceeds a fixed value (3101), the BS transmits failure information (3105) and stores the failure information in a log file. The log file is transmitted (3104) at a predetermined transfer time (3103).

As methods of transmitting the failure information to the BSC by the BS 2, there are considered a method of utilizing B channel packet on the I interface and a method of utilizing D channel packet.

In the system utilizing the D channel packet, since the D channel from the BS is terminated at the BSC once, there is a possibility that the processing load in the processor system in the BSC is increased at diffusion term so that the BSC accommodates a large amount of BS's. Thus, it is desirable Further, with regard to failure at the BSC 3, it is desirable that information relative to failure is visibly displayed in an alarm display plate in a BSC installed office indicated by numeral 3200 in FIG. 29.

8-b-2. Test and Diagnosis Function

Test and diagnosis function is now described.

The test and diagnosis function includes three periodic tests for preventive maintenance of radio line connection, a failure separating test upon failure report, and a test of various lines and terminals for confirmation of normality.

Table 15 shows a list of test items for various tests.

TABLE 15

| | Test Item | Periodic Test | Separation Test | Line and Terminal Test | Notes |
|---|---|---|---|---|---|
| 1 | Automatic Outgoing Connection Test | O | | | Use TST, Monitor and Test System Testor |
| 2 | Automatic Incoming Connection Test | O | | | Use TST, Monitor and Test System Testor |
| 3 | Manual Outgoing Connection Test | | O | | Use TST, Monitor and Test System Testor |
| 4 | Manual Incoming Connection Test | | O | | Use TST, Monitor and Test System Testor |
| 5 | Voice Channel Performance Test | O | O | | Use TST |
| 6 | Interference Wave Avoidance Test | O | O | | Use TST |
| 7 | Separation Test | O | O | O | Use TST |
| 8 | Monitor Connection Test | | | O | Speech Monitor, Dch Monitor |
| 9 | Terminal Calling Connection Test | | | O | Use PS, Monitor and Test System Testor |
| 10 | Terminal Incoming Connection Test | | | O | Use PS, Monitor and Test System Testor |
| 11 | Hand Over Test | | | O | Use PS |
| 12 | Roaming Test | | | O | Use PS |

Contents of the tests are described.

(1) Periodic Test

The periodic test is performed periodically in order to detect failure of devices, lines and line connection control function at an early stage. The test is made by opposing a tester of the monitor and test system to TST (test terminal).

In radio terminals, since the position is moved spontaneously and it is difficult to perform the follow-up study and analysis by following failure occurring situations, the periodic test is important as preventive maintenance.

The monitor and test system 2430 includes the function of preengaging the BS 2 and the radio channel used in the test and can specify the BS and the channel to be tested by specifying the BS 2 and the channel to make outgoing and incoming test with TST. Further, the loop back function of voice signals is provided in the TST to be able to confirm voice signals.

Figure 31:
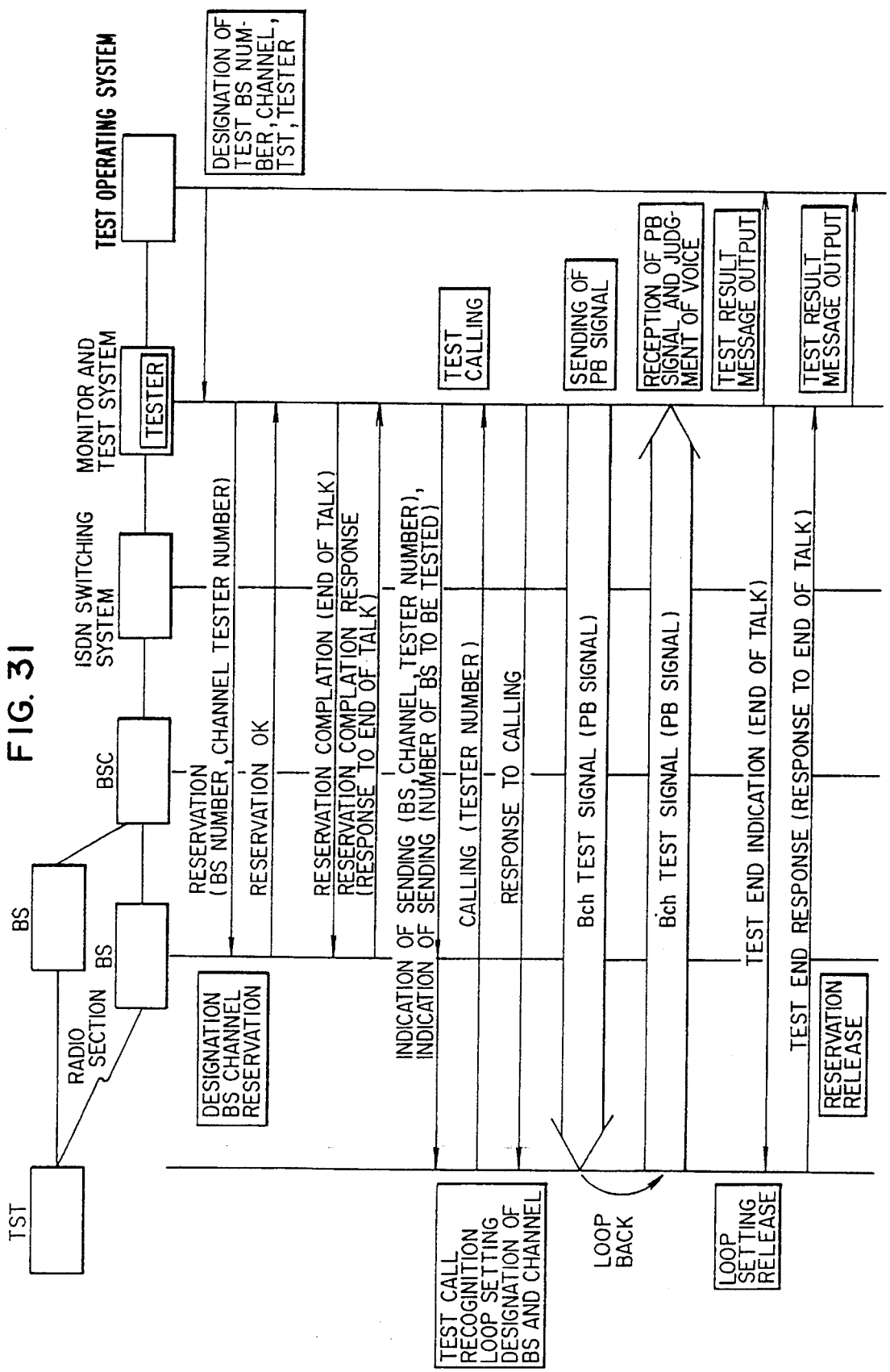
FIG. 31 is a sequence diagram illustrating a sequence of an automatic outgoing connection test.
Figure 32:
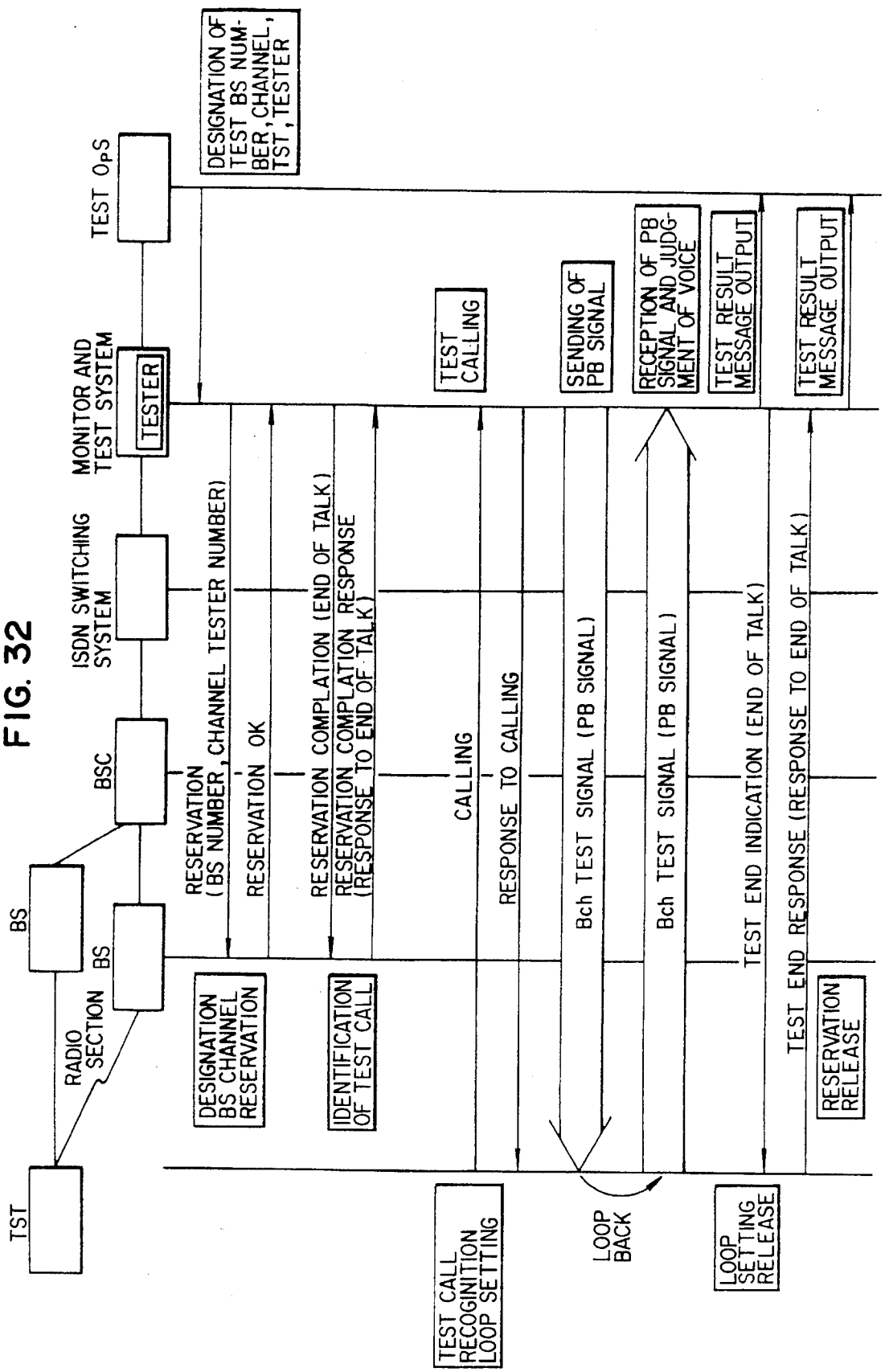
FIG. 32 is a sequence diagram illustrating a sequence of an automatic incoming connection test.

The automatic outgoing connection test shown in Table 15 is a test in which the loop back function of voice signal is used in the TST to specify the BS 2 and the channel by the sequence shown in a lower portion of FIG. 31 in the configuration shown in an upper portion of FIG. 31 to cause the TST to set up a call to examine the normality of the call set-up operation.

The automatic incoming connection test shown in Table 15 is a test in which the loop back function of voice signal is used in the TST to specify the BS 2 and the channel by the sequence shown in a lower portion of FIG. 31 in the configuration shown in an upper portion of FIG. 31 to cause the TST to receive an incoming call to examine the normality of the incoming call reception operation.

(2) Failure Separating Test

The failure separating test is a test for separating a fail portion.

The failure separating test is made when a failure report is issued by a subscriber through the network to the failure report reception system 2922 of the test operation system 2920. In this case, the connection route to the PS used for the report by the subscriber is not necessarily identical with situations upon occurrence of a failure. Accordingly, in the embodiment, a call connection route and failure information upon occurrence of a failure are stored in journal information in real time and the journal information is retrieved upon report of the failure to detect a suspected route. In the suspected route, a loop back test is made in order to separate failed portions in the following three sections:

Section of transmission path between BS and BSC

Wire section of BS

Radio section

Figure 33:
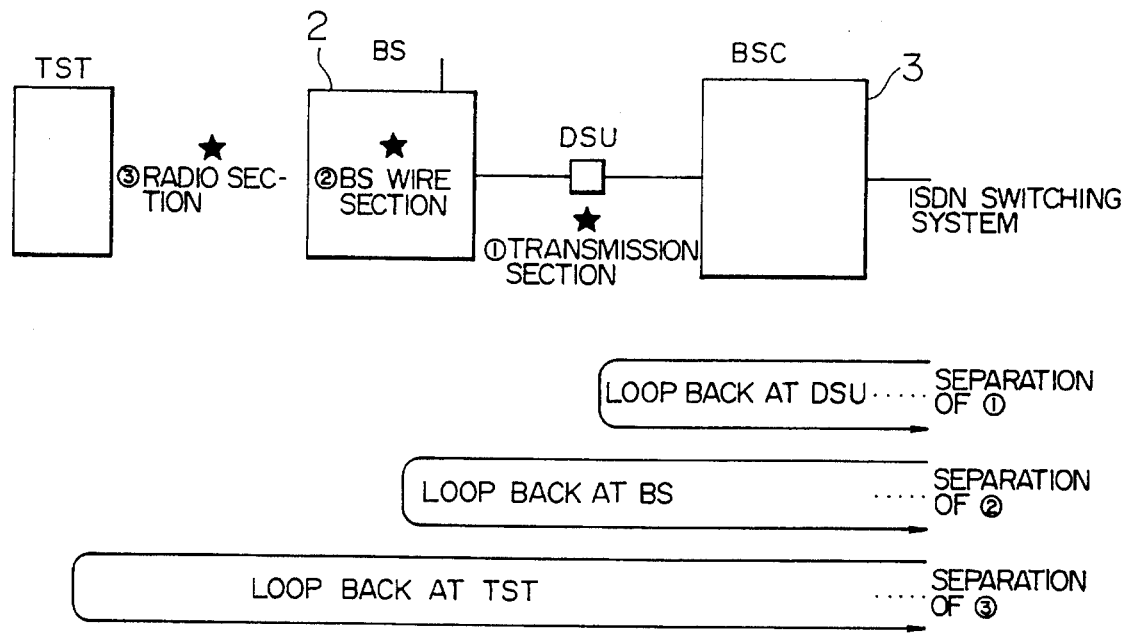
FIG. 33 is a schematic diagram illustrating a loop point in loop back test.

More particularly, as shown in FIG. 33, the transmission path is looped back in accordance with an assumed failure point and tests shown in FIG. 16 are made in accordance with the loop point.

TABLE 16

| Suspected Range | Implemented Test | Test Item | Test Contents | BS Function | TST Function |
|---|---|---|---|---|---|
| Transmission Path Between BS-BSC | DSU Loop Back | Pattern Match | Conduction Confirmation of Digital Transmission Path between BS-BSC by DSU Loop Back | — | — |
| | | Code Error Rate | Measurement of (1) Code Error Rate (2) Error Free Second by DSU Loop Back | | |
| BS Wire Section | BS Loop | Voice Signal | Signal Confirmation between Wire Section by | Voice Loop Back Reservation of | — |

TABLE 16-continued

| Suspected Range | Implemented Test | Test Item | Test Contents | BS Function | TST Function |
|---|---|---|---|---|---|
| | Back | | BS Loop Back | Designated Channel Identification of Test Call | |
| Radio Section | TST Loop Back | Manual Outgoing Connection | Confirm Normality of BS Calling Process by Calling from TST | | |
| | | Mannual Incoming Connection | Confirm Normality of Incoming process to TST by Incoming Call to BS | Reservation of Designated Channel | Voice Loop Back Identification of Test Call |
| | | Voice Channel Performance | Modify Radio Output Level of TST to Examine Error Rate | Identification of Test Call | |
| | | Interference Wave Avoidance | Idle Channel of Adjacent BS is Used to Generate Interference Wave to Examine Error Rate | | |

(3) Line and Terminal Test

In the line and terminal test, confirmation tests for various lines and terminals shown in Table 17 are made in order to confirm the normality by recovery of failure or new registration.

TABLE 17

| Classification | Test Item | Test Contents |
|---|---|---|
| Monitor Test | Speech Monitor | Designate Bch of Subscriber to be tested and Test Voice Monitor during talking |
| | Dch Monitor | Dch Monitor in Line Switching Call |
| Terminal Test | Outgoing Test | Confirm Normality of Calling Sequence by Calling from Terminal |
| | Incoming Test | Confirm Normality of Incoming Call Sequence by Incoming to Terminal |
| | Position Registration Test | Incoming Function Test Outside of Home Area |
| | Hand Over | Confirmation of Continuity of Call upon Movement of Adjacent Cell |
| | Roaming | Confirmation of Normality of Call Upon Movement of Adjacent Cell |
| | Separation Test | Confirmation of Frequency Change Over upon Detection of Interference of Electric Wave |

8-c. Performance Management Work

Functions of the maintenance operation system supporting the performance management work are now described.

In the embodiment, in order to support the performance management work, the traffic management function and the restriction and concentrated call countermeasure function are provided.

8-c-1. Traffic Management Function

The traffic management function is now described.

The traffic management function is a function to collect observation data of short-term variation and long-term variation of day, week, month and season of various traffics for each BS. The collected observation data is reflected to facilitate plans such as increasing and optimizing arrangement of BS in order to provide more efficient communication service.

Figure 34:
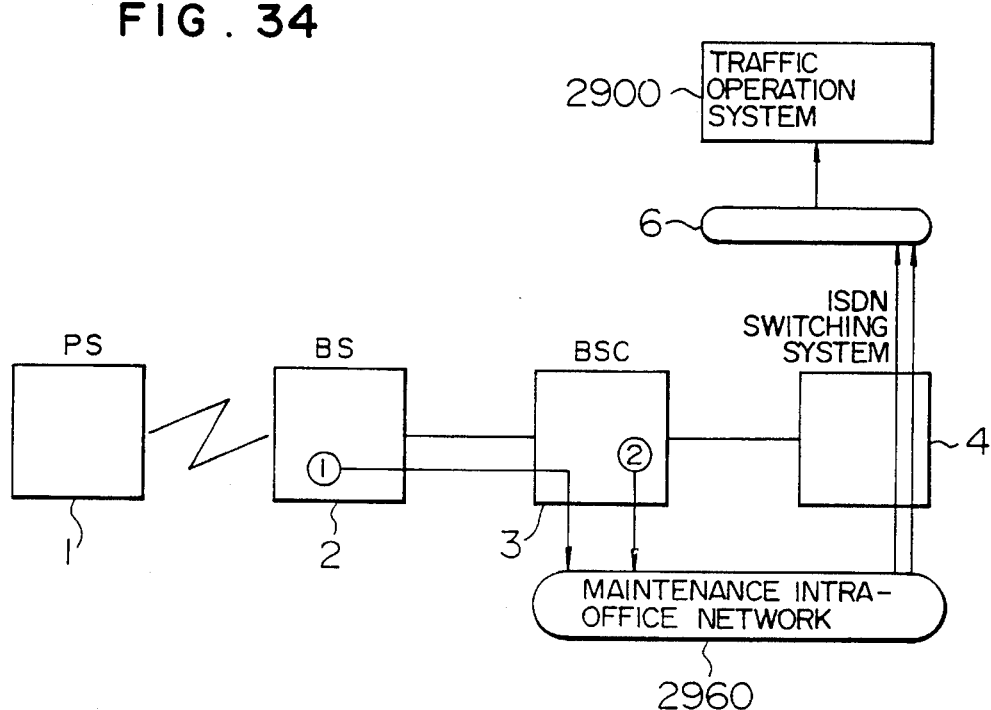
FIG. 34 is a schematic diagram illustrating observation points and transfer paths of traffic data.

FIG. 34 shows observation points (①,② and ③) of traffic data and transfer paths of data.

As shown in FIG. 34, the observation points of traffic are set outside of the BS as far as possible and a developed traffic management system and routing technique are adapted to be easily incorporated.

As shown in FIG. 34, traffic observed by the BSC is collected and managed by the traffic operation system 2900 through a maintenance intra-office network 2960. Further, traffic observed by the BS is transferred to the traffic operation system through the maintenance intra-office network 2960 to be collected and managed therein.

Table 18 shows utilization object of the collected observation data.

TABLE 18

| Measurement Item | Main Utilization Oject | Measurement Period | Measurement Point |
|---|---|---|---|
| Number of Successful Call for Each BS Number of Unsuccessful Calls for Each BS Amount of Successful Call for each BS | Study of Increase and Rearrngement of BS having Balanced Load | 60 Min. | BS (②) |
| Number of Position Registration Successful Calls for each BS Number of Position Registration | Study of Control Channel Capacity and Position | 15 Min. | BSC (②) |

TABLE 18-continued

| Measurement Item | Main Utilization Oject | Measurement Period | Measurement Point |
|---|---|---|---|
| Unsuccessful Calls for each BS | Registration Area | | |
| Amount of Position Registration | | | |
| Successful Calls for each BS | | | |
| Number of Calls for each kind of Calls (Priority Call and the like) for each BS | Improvement of Service Quality | 60 Min. | BS (① or ②) |
| Number of Switching of Slot during Communication for each BS | Study of Effective Utilization Method of Radio Channel | 60 Min. | BS (①) |
| Number of Switching of Carrier during Communication for each BS | | | |

8-c-2. Traffic Congestion Control Function

The traffic congestion control function is a function to make restricting such as calling restriction, incoming restriction and position registration call restriction in order to prevent congestion from occurring in a specific device due to system failure or other disruptive event from spreading to the whole network.

There are two primary factors as follow.

① Incoming System

② Calling/Position Registration System

Accordingly contents of restrictions for each factor are described.

(1) Congestion of Incoming System

As congestion of incoming system, there are considered congestion for a specific zone and congestion for a specific subscriber, and these congestions are treated by an incoming restriction process in the ISDN switching system.

(2) Congestion of Calling/Position Registration System

Congestion of calling/position registration system is also restricted by means of the calling restriction process in the ISDN switching system. However, the manual position registration is received even during the position registration restriction.

8-d. Configuration Management Work

Functions of the maintenance operation system supporting the configuration management work is now described.

The embodiment provides service order registration and installation test function and function of increase of BS and installation test in order to support the configuration management work.

8-d-1. Service Order Registration and Installation Test Function

The service order registration and installation or opening test function is described.

The service order registration and installation test function includes the service order registration function and the installation test function. The service order registration function is a function to newly provide a PS subscriber terminal and register and abolish a new service, and the installation test function is a function to conduct a test for verifying the normality of subscriber information set by the service order registration function.

Figure 35:
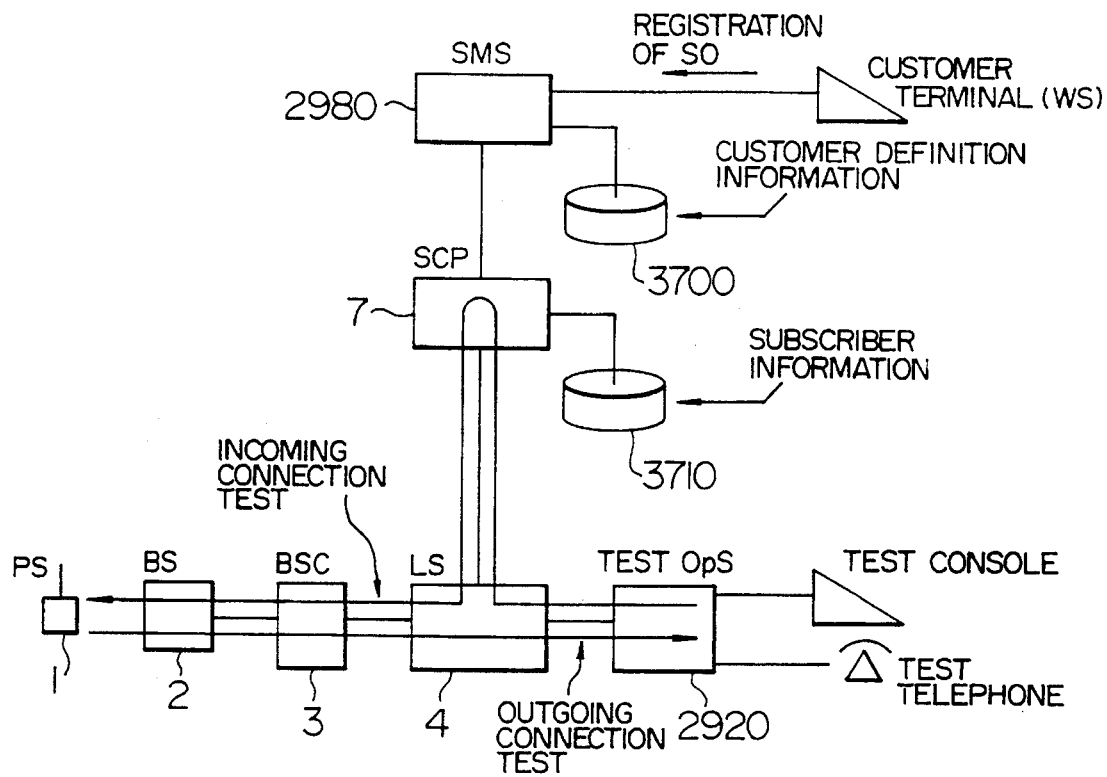
FIG. 35 is a schematic diagram illustrating operation of service order and installation test function.

FIG. 35 schematically illustrates operation of the service order registration and installation test function.

As shown in FIG. 35, the service order registration function receives a service order registration request in a service management system (SMS 2980) which performs registration and management of resources in the network.

Subscriber information of the PS subscriber terminal is input as service order registration information from a customer terminal (WS) of the SMS and is edited in the SMS 2980. The edited information is stored as customer definition information in a data base DB 3700 attached to the SMS 2980.

The customer definition information is converted into an information form utilized by SCP to prepare subscriber information and is loaded to a data base DB 3710 attached to SCP from SMS 2980.

On the other hand, the installation test function is attained by calling and conducting the incoming connection test in order to verify normality of the subscriber information set by the service order registration function.

The calling connection test determines whether a test call can be connected to the test operation system 2920 or not by dialing a specific test terminal or by dialing a special test number by an inspector on the side of a subscriber terminal to confirm the normality of the calling operation.

The incoming connection test is a test in that the PSN of a PS terminal to be tested is designated from a test console of the test operation system 2920 to test whether connection is made exactly or not to confirm the normality of the incoming operation.

8-d-2. Function of BS Provisionning and Installation Test

The function of BS Provisionning and installation test includes the function of increasing the BS and function of conducting the BS installation test. The function of increasing the BS is a function of newly incorporating BS into the network, and the BS installation test function is a function of verifying that the BS incorporated into the network is operated exactly.

The function of increasing the BS is described.

Since the BS is considered as a terminal interface as viewed from the BSC, a service order is input to the BSC 3 from the terminal WS attached to the maintenance operation system 2910 upon increase of BS so that the BS is registered in the BSC.

It is considered that the BS is required to be increased in a short time because of installation of an event or the like. In such a case, the BSC is adapted to prepare data relative to BS automatically upon spurious calling from the increased BS.

Further, there are provided the office data modification function of rewriting BS attribute data such as the kind of BS stored in the BSC on line and BS file update function of updating a BS file of various software stored in the BS in order to cope with addition of service.

The BS installation test function is described.

Figure 36:
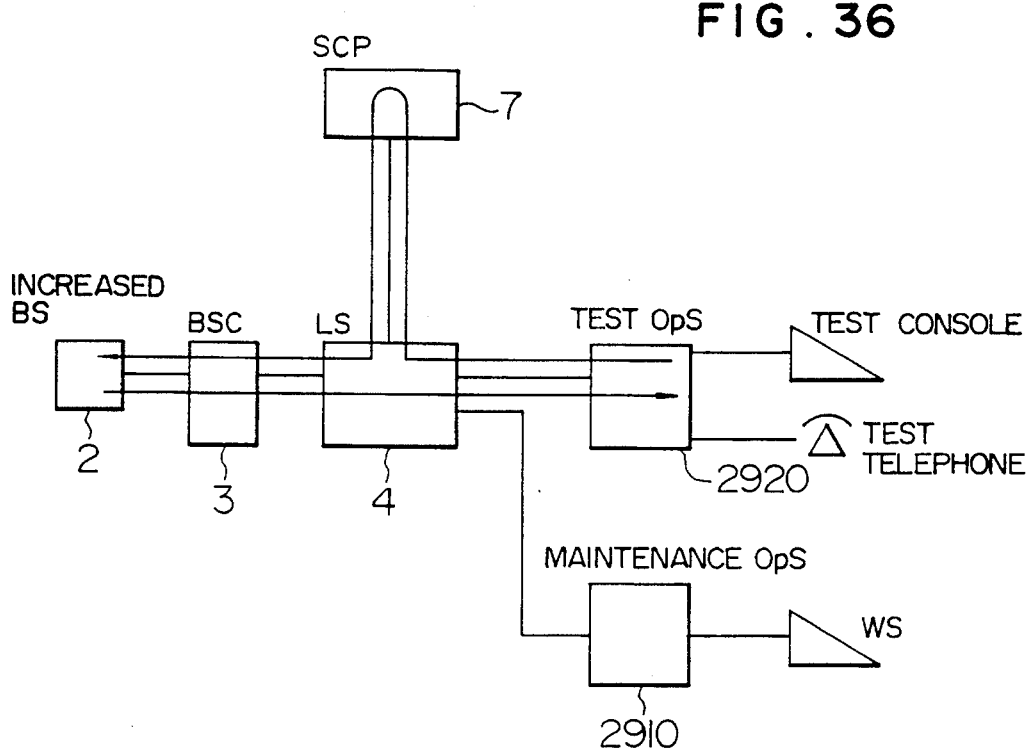
FIG. 36 is a schematic diagram illustrating operation of a BS opening test function.

FIG. 36 schematically illustrates operation of the BS installation test function.

As shown in FIG. 36, the BS installation test function is realized by making the calling connection and conducting the incoming connection test by the test operation system 2920.

As shown in FIG. 36, the calling connection test is a test that after installation of the BS to be increased, the BS 2 having a power switch turned on calls the test operation system through the network to thereby verify the normality of the calling operation.

The incoming connection test is a process started after the passing of a fixed time from the completion of the calling connection test and verifies the normality of the incoming operation by making a call to the increased BS through the network by the test operation system 2920.

The test operation system monitors a signal sequence in these tests to display detailed information of a test result to the attached terminal WS and turns on status lamps included in the BS to be tested in accordance with the test result.

Maintenance and operation of the portable telephone system according to the embodiment have been described and functions of the BS 2 for realizing the maintenance and operation functions are shown in Table 19.

TABLE 19

| Function | Applications | | Notes |
|---|---|---|---|
| Data Transmission Function (BS → BSC) | Automatic Service Order Registration | Send Data (BS Type, BS Capacity, etc.) Indicative of Attribute of Increased BS to BSC upon False Calling | |
| Data Reception Function | Modification of Software Included in BS | Receive Down Date by utilizing Bch at night from BSC in order to cope with Addition of Service and Modification of Protocol | However, it is necessary to consider Bch in Call Process during Use of Bch |
| | Modification of Office Data | Rewrite BS Variable Data as follows: Radio Carrier Management Data Peripheral BSID Management Data Type of BS (Outgoing Only, Incoming Only, General) BS Capacity | |
| BS State Display Lamp Turned On | Installation Test | Turn On State Lamp to Display Test Result in response to Indication from Test OpS. | |

9. Form and Mounting Form of BS 2

Figure 37:
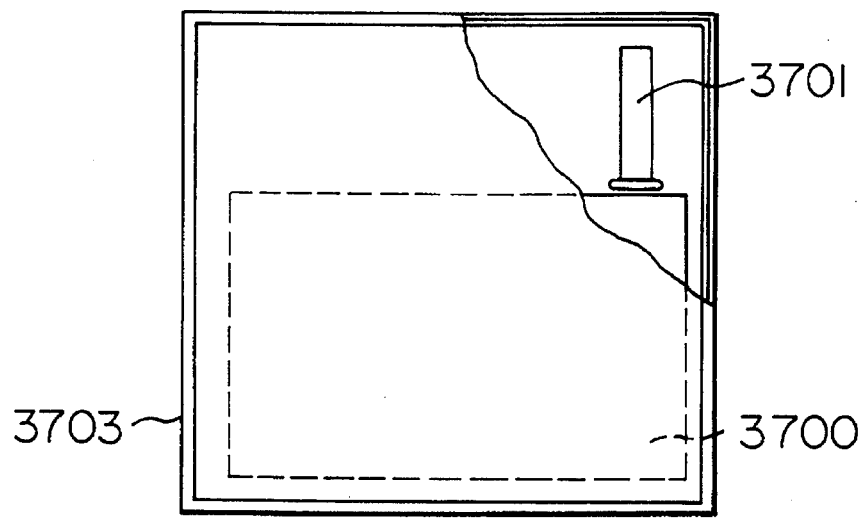
FIG. 37 is a schematic diagram illustrating a form of radio base station.

FIG. 37 shows a first form of the BS 2 according to the embodiment.

The BS 2 shown in FIG. 37 is attached to a wall surface of a building or the like and includes a package 3703 having waterproof characteristics and protection characteristics against heat and cold and in which a BS body 3700 and an antenna 3701 are accommodated.

Figure 38B:
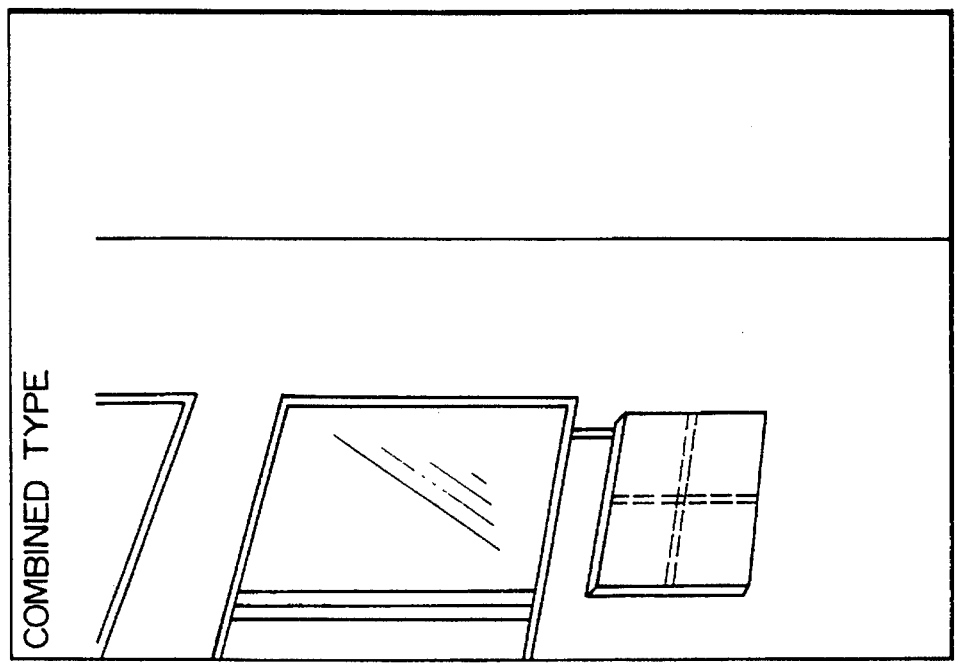
FIGS. 38A and 38B are schematic diagrams illustrating mounting forms of radio base stations.
Figure 38A:
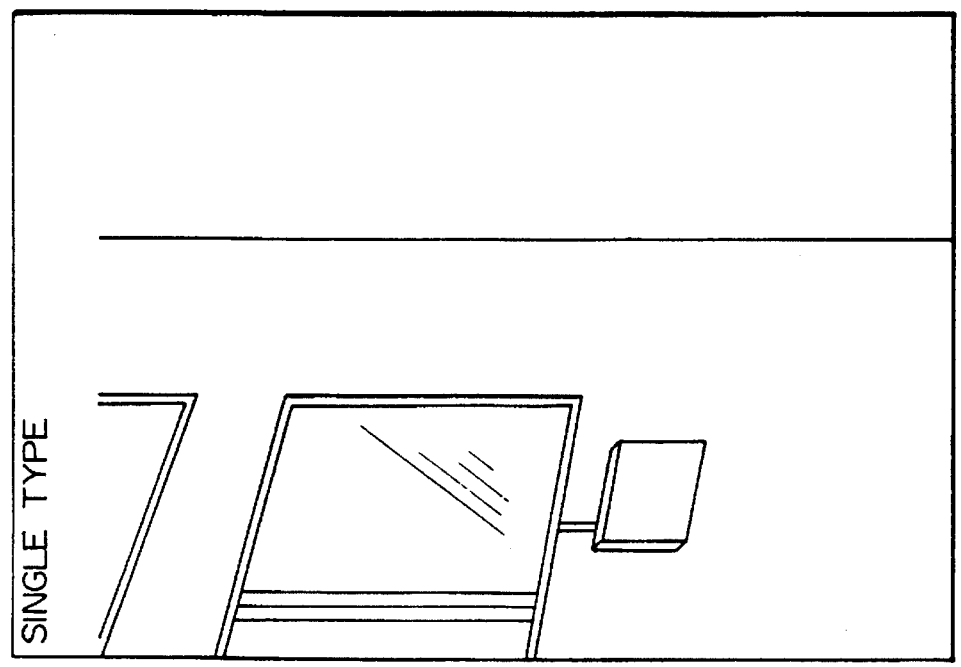

FIGS. 38A and 38B show the BS 2 attached to a wall surface. FIG. 38A shows a single type of BS 2 and FIG. 38B shows a combined type of BS's 2. Both of types are available.

Figure 39:
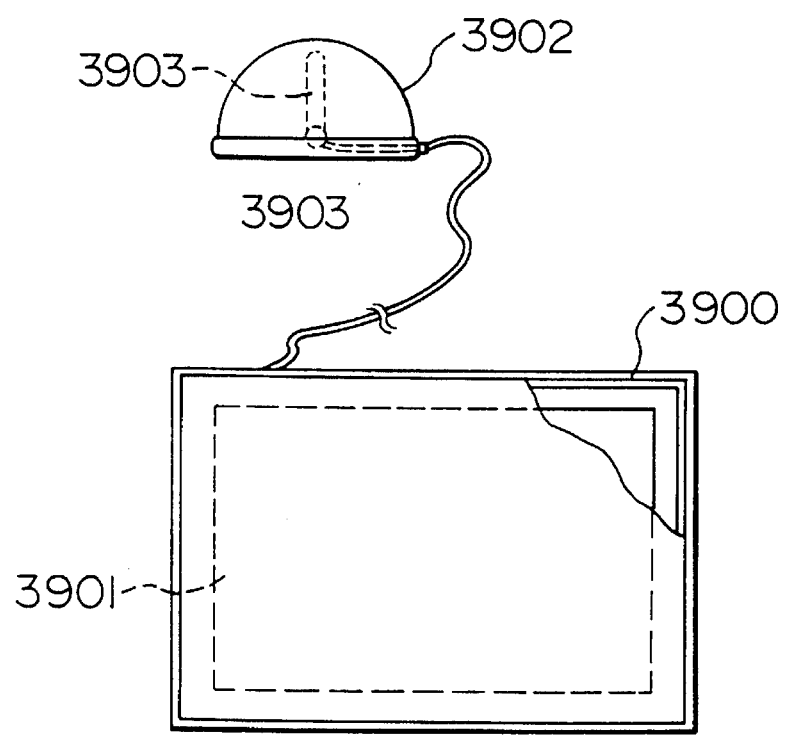
FIG. 39 is a schematic diagram illustrating a form of a radio base station.

FIG. 39 shows a second form of the BS 2 according to the embodiment.

The form shown in FIG. 39 is attached to a telephone box and an antenna 3903 and a BS body 3901 are separately provided to be accommodated in packages 3902 and 3900 having waterproof characteristics and protection characteristics against heat and cold, respectively. Particularly, in order for the user to recognize the installed BS 2, the package 3900 accommodating the antenna is in the shape of transparent dome. The transparent dome-shaped package 3902 can include an indication for indicating state of the BS 2.

Figure 40B:
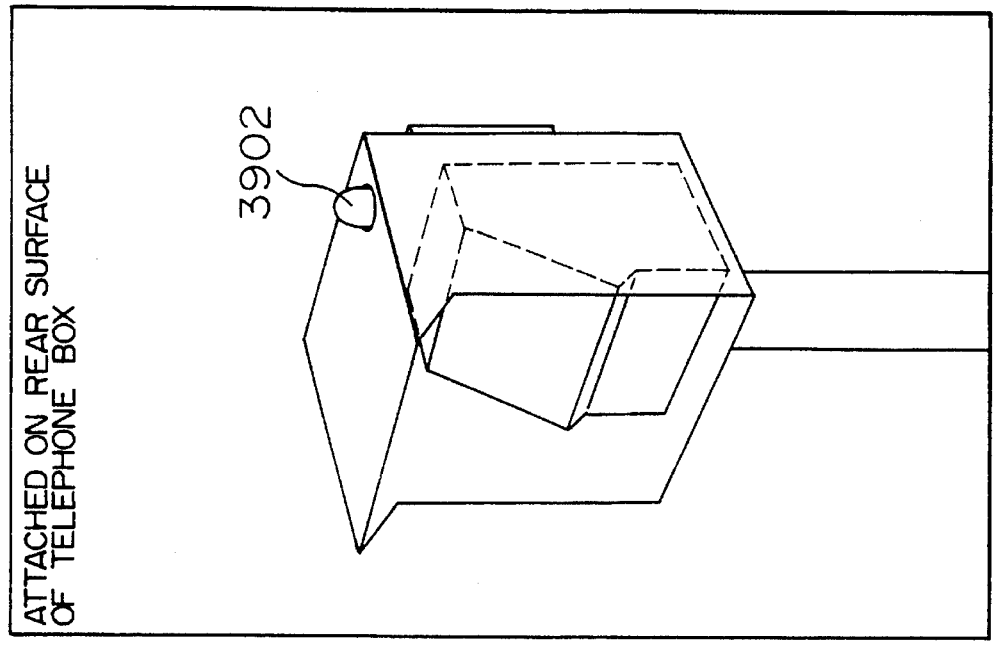
FIGS. 40A and 40B are schematic diagrams illustrating mounting forms of radio base stations.
Figure 40A:
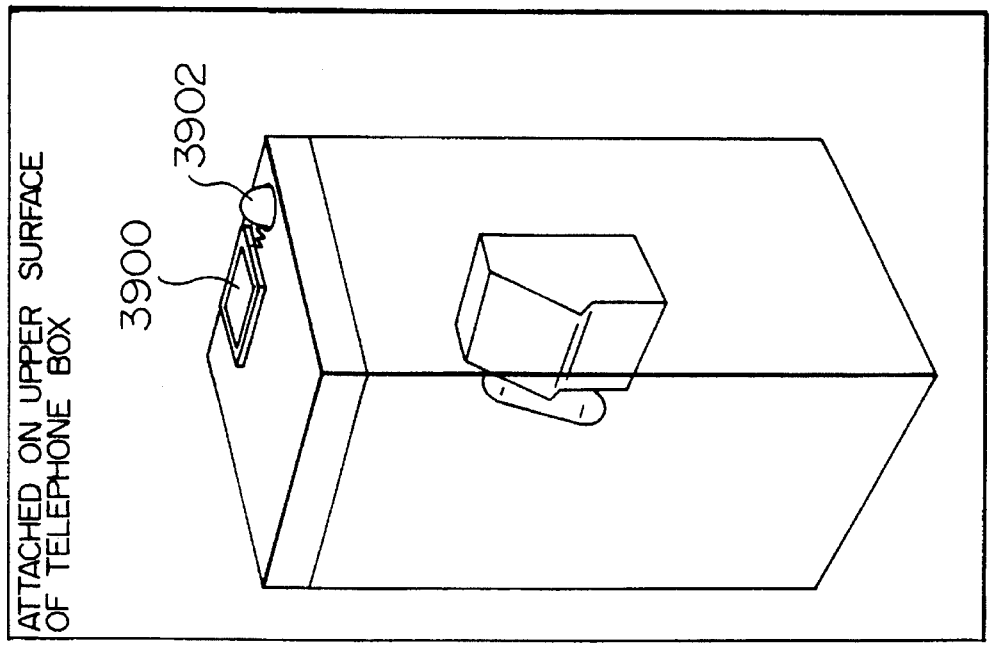

FIGS. 40A and 40B show the BS 2 attached to a telephone box. The BS 2 is attached on an upper surface of a box-type telephone box. In an open-type telephone box, the package 3900 for the body is attached on a rear surface of the telephone box. In any case, the package 3902 accommodating the antenna 3903 is mounted on an upper surface of the telephone box to ensure the radio sensitivity and arouse user's attention.

Figure 41:
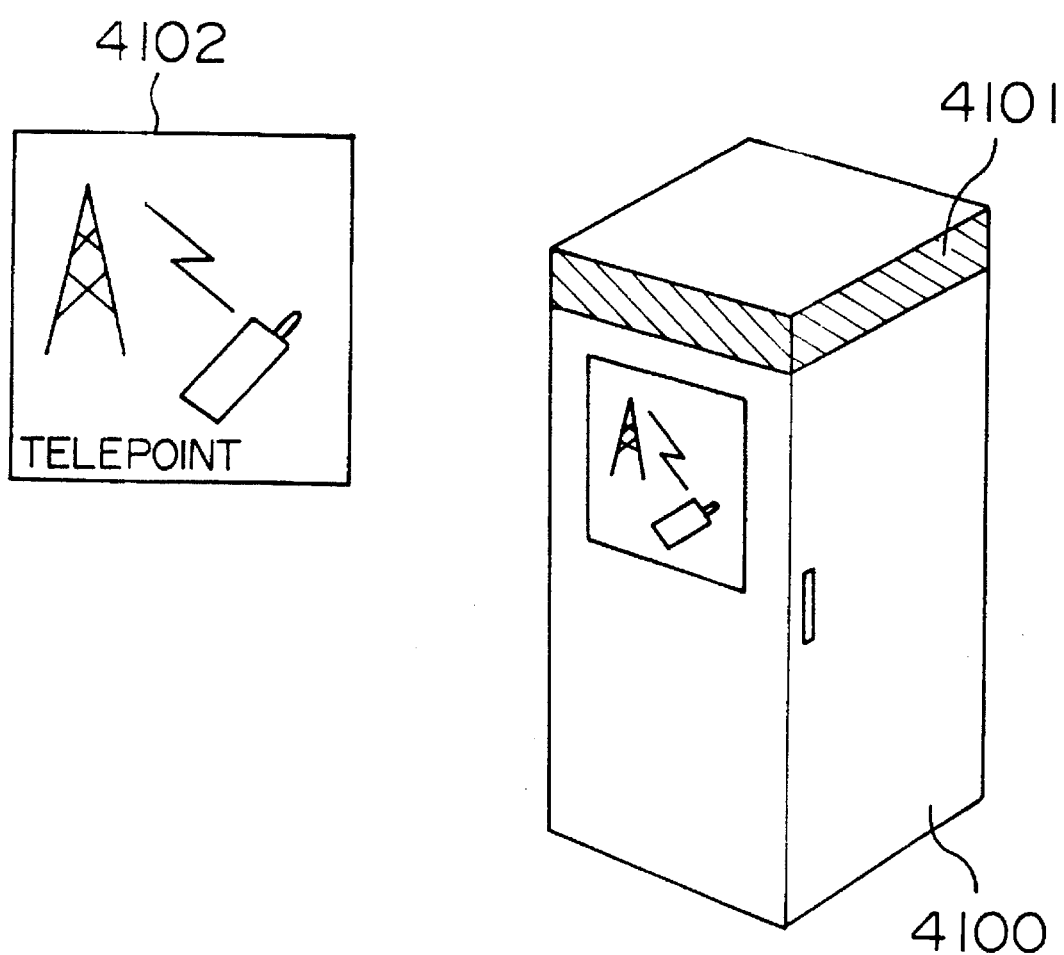
FIG. 41 is a schematic diagram illustrating mounting form of a radio base station.

FIG. 41 shows a telephone box to which the BS 2 is mounted. In order to indicate that the BS is mounted, an upper portion of the telephone box is colored. Further, a sticker indicating that the BS is installed is affixed on the side of the telephone box.

10. Services that the Portable Telephone System Provides to Subscribers

According to the portable telephone system according to the embodiment described above, the portable telephone system can realize various services.

These services are now described.

Figure 42:
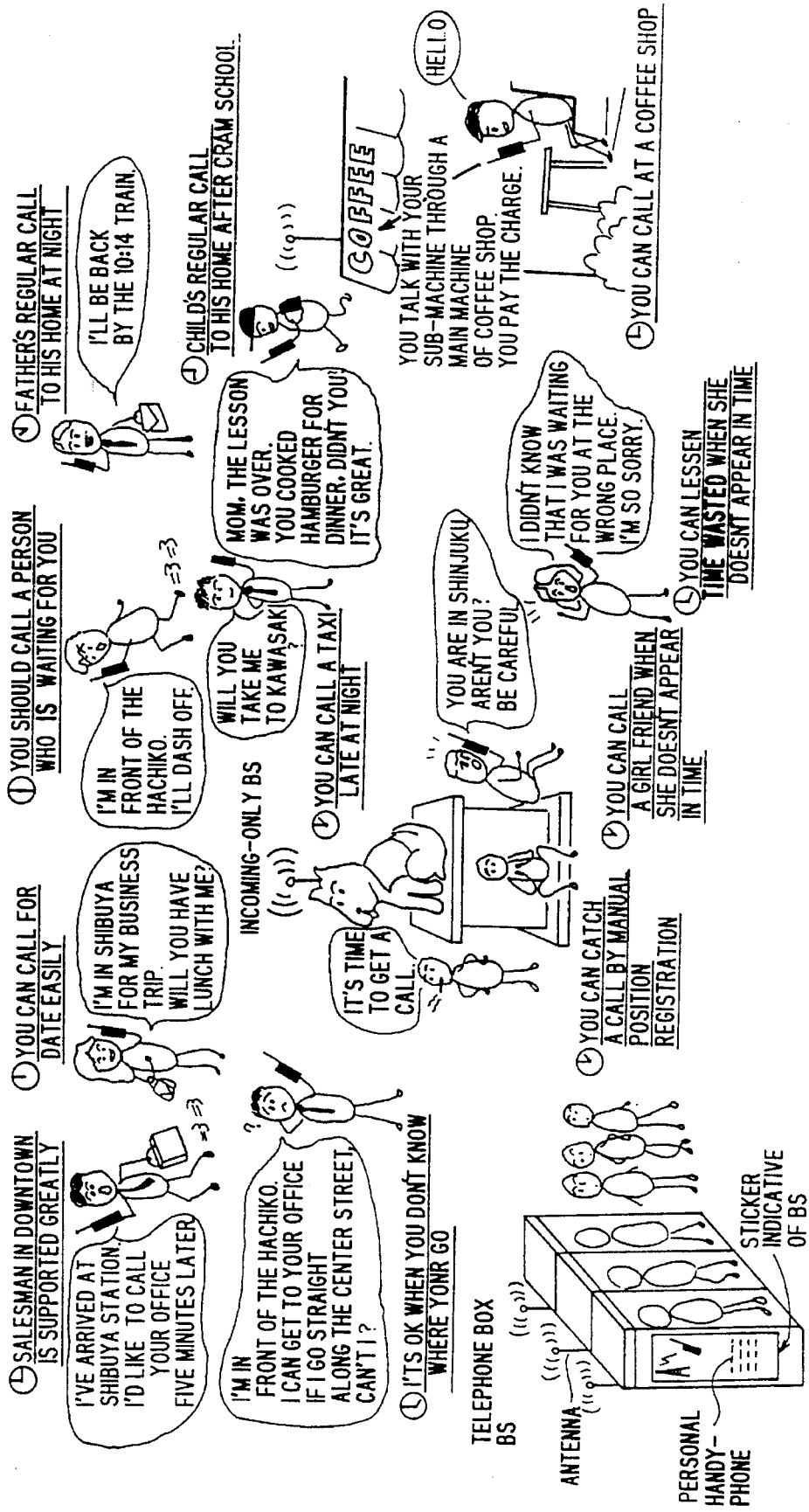
FIG. 42 is a schematic diagram illustrating services provided by the portable telephone system to a user.

FIG. 42 schematically illustrates services which the subscriber can receive upon waiting by way of example.

As shown in FIG. 42, the subscriber can communicate in a waiting place in the same manner as by ordinary telephone by means of the PS 1.

Further, provision of a reception-only BS for a waiting person in a place where congestion is anticipated can politely inform the waiting person of his/her lateness. An incoming call to the waiting person can be given preference to a subscriber to which the BS 2 performs the manual position registration.

Further, if a main machine having a broad propagation range of electric wave is placed in a restaurant, a coffee shop or the like and subscribers therein utilize the PS 1 as a sub-machine through the main machine, the PS 1 can be utilized without hindrance even if the BS 2 is not installed in the vicinity thereof.

Figure 43:
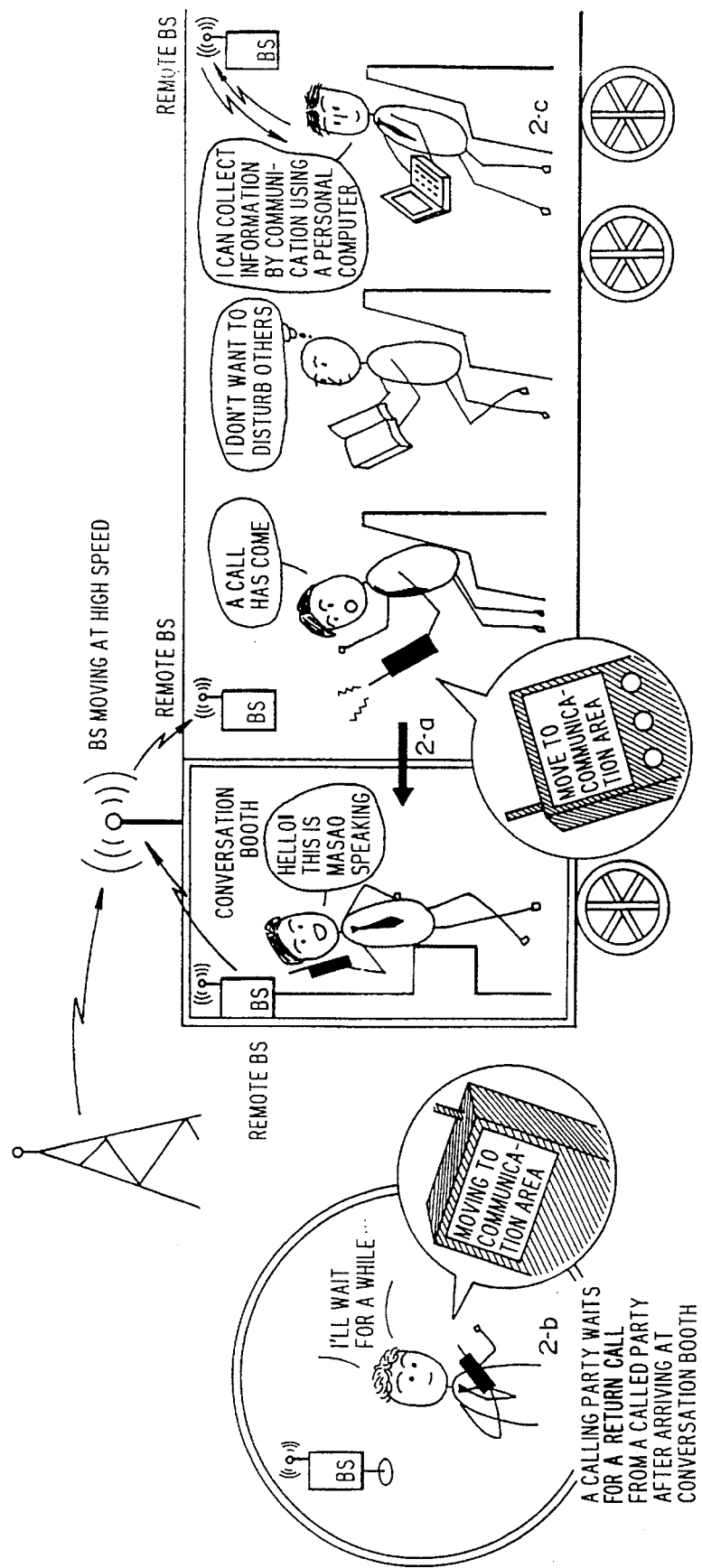
FIG. 43 is a schematic diagram illustrating services provided by the portable telephone system to a user.

FIG. 43 schematically illustrates services which the subscriber can receive calls in a moving vehicle such as the Shinkansen (subway) by way of example.

As shown in FIG. 43, by installing a remote BS 2 connected to the network by radio in the moving body, the subscriber can communicate in the same manner as by ordinary telephone by means of the PS 1.

Further, the provision of a conversation booth makes it possible to make conversation in a way that other passengers are not troubled. When the remote BS 2 informs a passenger in a train of an incoming call, the BS 2 displays an indication for urging movement to the conversation booth in the PS 1. The BS 2 requires display of an indication of movement to the conversation booth in the PS 1 of a calling party, so that the conversation booth can be utilized for the incoming call to the passenger in the train without hindrance. As described above, data communication can be made by means of the BS 2.

FIG. 44 schematically illustrates services which the subscriber can receive in daily life by way of example.

As shown in FIG. 44, the subscriber can make communication in the same manner as the ordinary telephone in daily life by means of the PS 1.

A communication received by a telephone at home can transfer to the PS 1 carried by the subscriber being out. Such a transfer function can provide in LS 4, BS 3 and BS 2 in accordance with an area to which the call is transferred. A call to a door-phone placed at an entrance of home is transferred to be connected to the PS 1 carried by the subscriber being out through the PS 1 provided at home, so that the subscriber being out can respond to the call. The switching function for such a call may provide in the BS 3 and the BS 2 in accordance with an area in which the call is issued. Similarly, if a home automation apparatus is adapted to be connected to the PS 1, the home automation apparatus is controlled from the outside and communication from the home automation apparatus can be received. Further, a service channel for communication in a town-block association or advertisement in a supermarket may be opened in the BS 2 in the area. This service channel is set as an exclusive radio channel and the PS 1 of the user may be adapted to receive the exclusive radio channel by reception indication of the service channel of the person carrying the portable telephone. The service channel may be opened only to the calling PS in response to a calling operation in a particular PTN.

FIG. 45 schematically illustrates services which the subscriber can receive in a department store by way of example.

As shown in FIG. 45, the subscriber can communicate in the department store by means of the PS 1 in the same manner as the ordinary telephone. A service channel may be opened in the BS 2 in the department store for utilization of the subscribers in the department store.

FIG. 46 schematically illustrates services which the subscriber can receive calls in a recreation ground or a theme park by way of example.

As shown in FIG. 46, the subscriber can make communication by means of the PS 1 in the same manner as the ordinary telephone.

A leader of a group can communicate with members of the group at once by providing a simultaneous calling function of 1 to N in the BS 2. In the simultaneous calling function of 1 to N, a group PTN or a representative PTN is previously set and when a calling issued to the PTN, all of PS's set as sub-PTN's thereof may be adapted to be called. In this case, the BS 2 receives information from a member of the group and contents of the information from the member may be displayed in the PS 1 of the leader.

Further, a service channel may be opened in the BS 2 in a park for utilization of the subscribers in the park.

Figure 47:
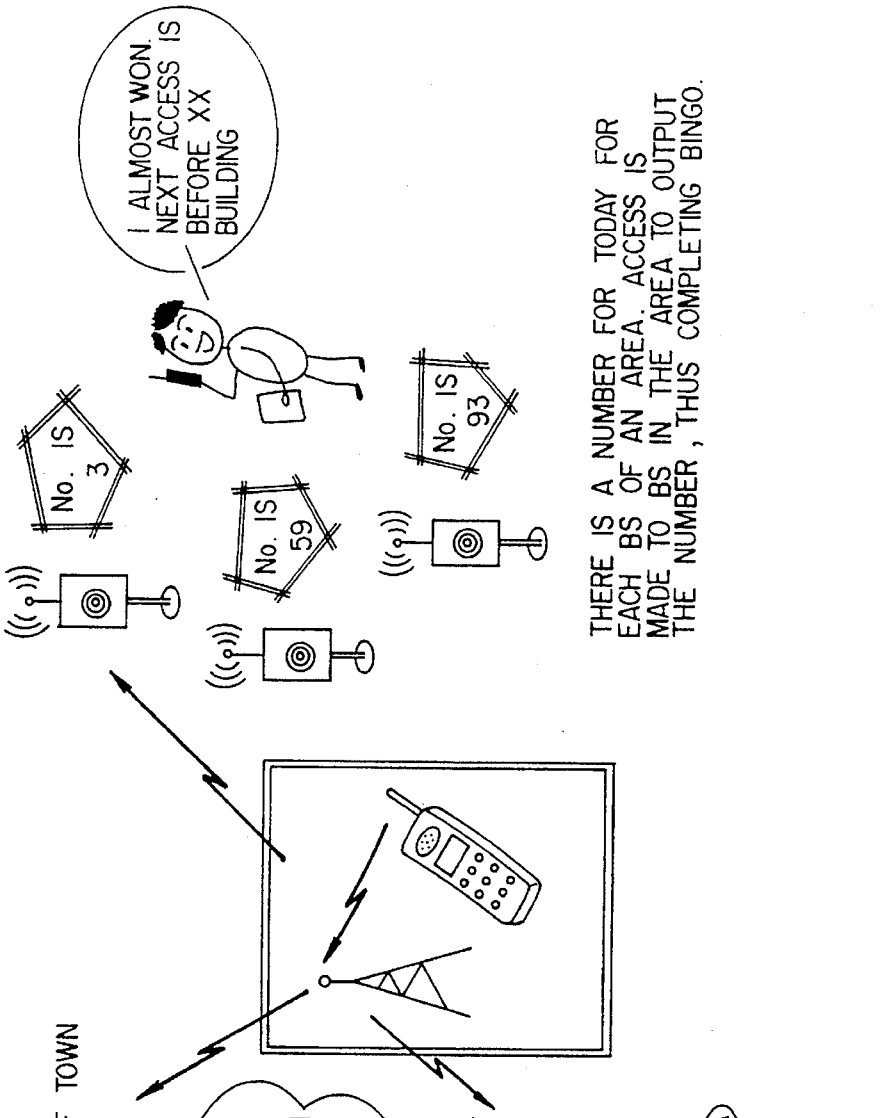
FIG. 47 is a schematic diagram illustrating services provided by the portable telephone system to a user.

FIG. 47 schematically illustrates other services which the subscriber can receive.

As shown in FIGS. 48A and 48B, the BS 2 installed outdoors desirably makes display so that current use situations are understood.

It is desirable that the BS 2 being in a busy state receives a reservation for calling from the PS 1 of the subscriber and receives the calling from the PS 1 from which the reservation is received preferentially in order of the reservation. At this time, the BS 2 desirably controls so that the persons who call, from whom the reservation is received, is displayed in the PS 1 from which reservation is received.

According to the portable telephone system including a switching system, a plurality of radio base stations for n-th route installed in each area and connected through n-th (where n is a natural number satisfying $k \neq n \cap m \geq n \geq 1$) duplicate optical fiber transmission path different from k-th (where k is a natural number satisfying $k \neq n \cap m \geq n \geq 1$) duplicate optical fiber transmission path, of k-th to m-th (where m is a natural number satisfying $m \geq 2$) routes, and portable telephones connected to the radio base station through radio transmission path, the radio base station for n-th route being arranged in an area adjacent to a radio base station of a route different from the n-th route, a distance between the switching system and the radio base station is long but since transmission therebetween is made by the duplicate optical fiber transmission paths, the reliability of transmission is improved. Further, even if failure occurs within one route, the portable telephone system for other route can be utilized by an adjacent area.

As described above, according to the present invention, the portable telephone system capable of providing various services advantageously can be provided.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A portable telephone system, comprising:

a plurality of radio base stations, each installed in a respective area;

a portable telephone connected to said radio base stations through corresponding radio transmission paths;

a network service point for registering position information of said portable telephone in response to a position registration request transmitted from said portable telephone and for managing the position information of said portable telephone; and a switching system connected to said radio base stations through said transmission paths for switching a call of said portable telephone through said radio base stations in accordance with the position information of said portable telephone managed in said network service point, wherein said portable telephone includes means for determining whether or not said portable telephone is moving at a high rate of speed in accordance with the reception state of electromagnetic waves from said radio base stations collected for a predetermined term, and means for suppressing transmission of the position registration request to said network service point when the determining means determines that said portable telephone is moving at a high rate of speed.

2. A portable telephone system, comprising:

a switching system;

a plurality of radio base stations, each of said radio base stations respectively mounted on a public telephone booth to be installed in a respective area, and said radio base stations being connected to said switching system through transmission paths;

a portable telephone connected to said respective ones of said base stations through corresponding radio transmission paths; and means for allocating an arbitrary number of time slots on said transmission paths to each of said radio base stations, and for remotely changing the allocation of the time slots to each of said radio base stations.

3. A portable telephone system as set forth in claim 2, wherein each of said radio base stations respectively mounted on corresponding public telephone boxes are waterproof, weather resistant and include properties so as not to interfere with radio wave transmission.

4. A portable telephone system as set forth in claim 2, wherein said radio base stations include reception-only radio base stations for transmitting messages to said portable telephone.

5. A portable telephone system as set forth in claim 4, wherein said reception-only radio base stations are disposed in high-traffic volume areas.

6. A portable telephone system, comprising:

a switching system;

a plurality of radio base stations, each of said radio base stations respectively connected to said switching system through transmission paths in respective areas;

a portable telephone connected to a corresponding one of said radio base stations by means of a part of a plurality of channels on said radio transmission paths, wherein each of said radio base stations includes a display device for displaying a usage status of said plurality of channels so as to be indicated on the exterior of said corresponding radio base station; and means for reserving a specific channel for subsequent use when said display device indicates that the specific channel is currently in use.

7. A portable telephone system, comprising:

a switching system;

a plurality of first radio base stations respectively connected to said switching system through transmission paths in respective radio base station areas;

a plurality of second radio base stations connected to said switching system through radio transmission paths and installed in moving bodies; and a plurality of third radio base stations respectively installed in said moving bodies and connected to one of said plurality of second radio base stations through said radio transmission paths;

a portable telephone connected to said second radio base stations through radio transmission paths.

8. A portable system as set forth in claim 7, further comprising a conversation booth having a base station connected thereto, via said switching system through a radio transmission path, disposed in the moving bodies.

9. A portable telephone system as set forth in claim 8, wherein said conversation booth includes a display indicating an incoming call.

10. In a portable telephone system comprising a plurality of radio base stations, each of said radio base stations installed in a respective area, a portable telephone connected to said radio base stations through radio transmission paths, a network service point for registering and managing position information indicating an area to which said portable telephone belongs, and a switching system connected to said radio base stations through transmission paths for switching a call of said portable telephone through said radio base stations in accordance with the position information of said portable telephone registered and managed in said network service point, a position registration method comprising the steps of:

in said portable telephone, repeatedly receiving a reception state of electromagnetic waves from each of said radio base stations for a predetermined period of time;

determining a change in the reception state of electromagnetic waves collected for each period of time;

determining an area in which said portable telephone is positioned, when the determined change in reception state is smaller than a predetermined reference amount; and requesting, from said network service point through a radio base station located in a corresponding area as said portable telephone, registration of position information representing the determined area, when the determined area is different from an area determined in the previous period of time.

11. In a portable telephone system comprising a plurality of radio base stations, each of said radio base stations installed in a respective area, a portable telephone connected to said radio base stations through radio transmission paths, a network service point for registering and managing position information representing an area to which said portable telephone belongs, and a switching system connected to said radio base stations through transmission paths for switching a call of said portable telephone through said radio base stations in accordance with the position information of said portable telephone registered and managed in said network service point, a position registration method comprising the steps of:

assigning each of said plurality of radio base stations to a respective area;

in said portable telephone, repeatedly receiving a reception state of electromagnetic waves from each of said radio base stations for a predetermined period of time;

determining a change in the reception state of electromagnetic waves collected from said radio base stations for each passing period of time;

determining an area in which said portable telephone is positioned, when the determined change in reception state is smaller than a predetermined reference amount;

requesting, from said network service point, through a particular one of said radio base stations at which reception sensitivity is most satisfactory according to the collected reception state of electromagnetic waves, registration of position information representing the determined area, when the determined area is different from an area determined in the previous period of time; and in said switching system, exchanging a call made to said portable telephone to a plurality of said radio base stations which belong to the area in which the called portable telephone is positioned, in accordance with the position information of the called portable telephone registered and managed in said network service point.

12. A portable telephone system, comprising:

a switching system;

a plurality of first radio base stations respectively connected to said switching system through transmission paths in respective areas and located on public transportation vehicles;

a plurality of second radio base stations installed in said vehicle and connected to one of said plurality of first base stations through radio transmission lines; and a portable telephone connected to said second radio base stations through radio transmission paths.

13. A portable system as set forth in claim 12, further comprising a conversation booth having a base station connected thereto, via said switching system through a radio transmission path, disposed in the moving bodies.

14. A portable telephone system as set forth in claim 13, wherein said conversation booth includes a display indicating an incoming call.

15. A portable telephone system, comprising:
a switching system;
a plurality of radio base stations, each installed in a respective area and connected to said switching system through duplicate optical fibers;
a portable telephone connected to said radio base stations through corresponding radio transmission paths; wherein
each of said plurality of radio base stations is connected to an optical branch device which is disposed in the respective radio base station area or in the vicinity thereof to branch signals from said duplicate optical fibers which are connected to a switching system; and
means for allocating an arbitrary number of time slots on said optical fibers to each of said radio base stations and for remotely changing the allocation of the time slots to each of said radio base stations.

* * * * *